United States Patent
Witek et al.

(10) Patent No.: US 6,253,188 B1
(45) Date of Patent: Jun. 26, 2001

(54) AUTOMATED INTERACTIVE CLASSIFIED AD SYSTEM FOR THE INTERNET

(75) Inventors: Anthony L. Witek, Ridgefield; Elaine B. Cristiani, Stratford; Patrick C. Helbach, Wilton, all of CT (US); Stanley J. Wang, White Plains, NY (US)

(73) Assignee: Thomson Newspapers, Inc., Stamford, CT (US)

(*) Notice: Subject to any disclaimer, the term of this patent is extended or adjusted under 35 U.S.C. 154(b) by 0 days.

(21) Appl. No.: 08/717,164

(22) Filed: Sep. 20, 1996

(51) Int. Cl.$^7$ .................................................. G06F 17/60
(52) U.S. Cl. ..................... 705/14; 705/1; 705/26; 705/27; 705/28; 705/29; 705/34; 705/37
(58) Field of Search .................................. 705/1, 14, 26, 705/27, 28, 29, 34, 37

(56) References Cited

U.S. PATENT DOCUMENTS

| | | | |
|---|---|---|---|
| 5,283,731 | * 2/1994 | Lalonde et al. | 705/1 |
| 5,745,882 | * 4/1998 | Bixler et al. | 705/26 |
| 5,799,284 | * 8/1998 | Bourquin | 705/26 |
| 5,799,285 | * 8/1998 | Klingman | 705/26 |
| 5,819,092 | * 10/1998 | Ferguson et al. | 395/701 |
| 5,940,806 | * 8/1999 | Danial | 705/26 |

OTHER PUBLICATIONS

Caragata, Warren, "News, one byte at a time", McClean's v109, Issue 5, Jan. 29, 1996.*

Harper, Christopher, "Online Newspapers: Going somewhere or going nowhere", Newspaper Research Journal (INRS), v17, n3/4, p2–13, Jun. 1996.*

* cited by examiner

Primary Examiner—Vincent Millin
Assistant Examiner—Jagdish N Patel
(74) Attorney, Agent, or Firm—Paul C. Scifo

(57) ABSTRACT

A system and method for providing classified ads over the Internet. The system includes a plurality of regional newspaper World Wide Web servers, and associated newspaper classified ad generators; a central classified ad information collection and distribution facility, and a central World Wide Web application server facility, all connected to the Internet such that Internet users can connect to the Newspaper Web server and central Web application server facility to search for and obtain classified ads. The Web application server facility includes one of more application servers and one or more newspaper classified ad database servers. The system apparatus features elements which enable Internet users to enter the system at the newspaper Web server and subsequently search for classified ads held in the ad databases at the database servers thorugh the application servers at the central Wed application facility. Additionally, the system features elements to enable users to search for the newspaper classified ads at the database servers using a client-server method that includes a common gateway interface procedure. Additionally, the system ad generator includes elements for automatically generating ad records for inclusion at the database servers of the central Web application facility which are derived from the newspaper print ad feed. Still further, the system includes elements at the collection and distribution facility for automatically collecting ads produced at the newspaper ad generators and providing them to the database servers on a scheduled bases. The method features steps for supporting the common-gateway-interface searching procedures which can be carried out in multiple stages. Additionally the method features steps for automatically generating classified ad record information in substantially numerical form which is pre-sorted to support improved speed in search the ad record databases.

30 Claims, 18 Drawing Sheets

INTERNET CLASSIFIEDS  134

CATEGORY; REAL ESTATE SALES
SUBCATEGORIES:

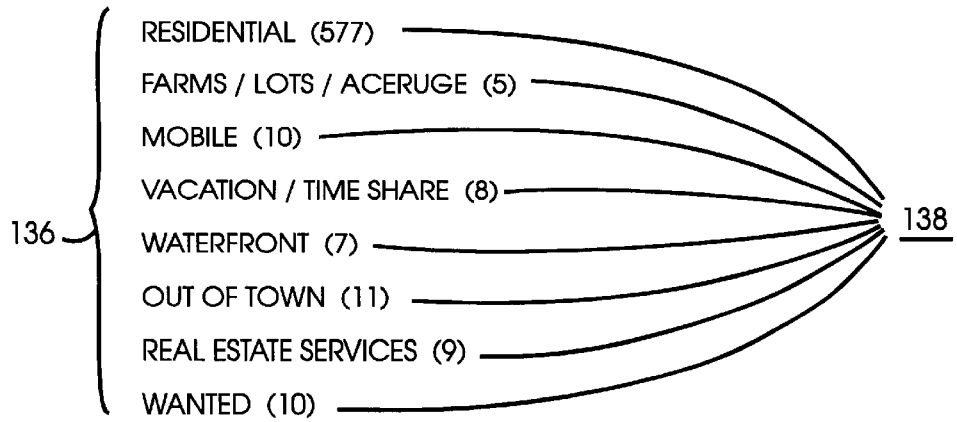

136 {
- RESIDENTIAL (577)
- FARMS / LOTS / ACERUGE (5)
- MOBILE (10)
- VACATION / TIME SHARE (8)
- WATERFRONT (7)
- OUT OF TOWN (11)
- REAL ESTATE SERVICES (9)
- WANTED (10)
} 138

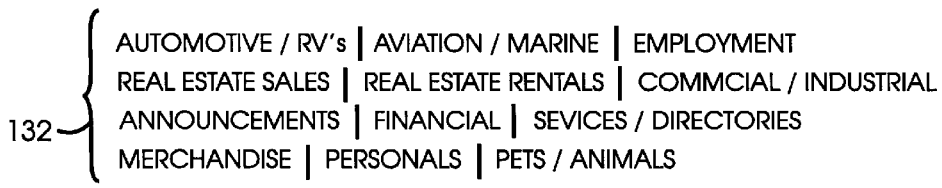

132 {
AUTOMOTIVE / RV's | AVIATION / MARINE | EMPLOYMENT
REAL ESTATE SALES | REAL ESTATE RENTALS | COMMCIAL / INDUSTRIAL
ANNOUNCEMENTS | FINANCIAL | SEVICES / DIRECTORIES
MERCHANDISE | PERSONALS | PETS / ANIMALS
}

FIG.9

INTERNET CLASSIFIEDS      140

CATEGORY:      REAL ESTATE SALE
SUBCATEGORY:      RESIDENTIAL
SELECTION FEATURES:

156 — THERE ARE (577) ADS IN THIS CATEGORY / SUBCATEGORY
HOW MANY WOULD YOU LIKE TO SEE    [50] — 154

VIEW ADS FROM    Mo [JAN]   DAY [1]
158    160

TYPE
☐ CO-OPS; CONDOS    ☐ HOUSES

142 — LOCATION

TOWN
[▼]    ☐ MIN PRICE    ☐ MAX PRICE
     ☐ MIN BEDS    ☐ MAX BATHS

☐ FIREPLASE   ☐ FARMILY ROOM   ☐ EATIN KITCHEN   ☐ FORMAL DINNING ROOM    146
☐ GARAGE   ☐ CUL-DE-SAC   ☐ POOL   ☐ YARD
144 — ☐ BY OWNER

FIND ALL MATCHES INCLUDING THE KEY WORDS
[_____] 148

FIND ALL MATCHES HAVING
150 — ☐ ALL FEATURES / TEXT (AND)
152 — ☐ AT LEAST ONE OF THE FEATURES / TEXT (OR)

[SEARCH] 162

168 — ○ SUBCATEGORY

132 — { AUTOMOTIVE / RV's | AVIATION / MARINE | EMPLOYMENT
REAL ESTATE SALES | REAL ESTATE RENTALS | COMMCIAL / INDUSTRIAL
ANNOUNCEMENTS | FINANCIAL | SEVICES / DIRECTORIES
MERCHANDISE | PERSONALS | PETS / ANIMALS }

FIG.10

AUTOMATED INTERACTIVE CLASSIFIED AD SYSTEM FOR THE INTERNET

FIELD OF INVENTION

This invention concerns a computerized, interactive classified ad system and method of operation for use on the Internet, the system and method featuring simple access, rapid response, and automated updating. Particularly, the system and method include elements and steps for maintaining the ad system database during operation in predominantly numeric form disposed in RAM of a database server which an Internet, World Wide Web user can interrogate with a preparatory, category/subcategory, pre-selection designation, the pre-selection designation narrowing the range of records to be examined, and a subsequent ad record selection sequence undertaken with a user-initiated, simplified message-based query. Yet additionally, the system and method of operation further feature elements and steps for interrogating the originally placed classified ad text feed to automatically build database records that can be transported over the Internet to update the ad database.

BACKGROUND OF INVENTION

Classified ads commonly appearing in local newspapers have long been the average person's first stop in attempting to satisfy just about any need that arises. Whether it be a matter of buying or selling, the "classifieds" not only provide a broad range of goods and services, but also, make the existence of the items they concern known to the public at ad costs which, typically, are at least reasonable. When looking to buy, classifieds with their broad range, enable one to find things as trivial as another putter to replace the one recently turned into a pretzel because of a triple bogey, or as important as a new house, job, or the right person to share them with. Additionally, in those situations where one wants to sell goods or services, classifieds can be the most economical and efficient way of letting others know what one has to offer.

Regrettably, however, conventional, newspaper, print classified ads can be difficult and time consuming to work with. Ads when published are often numerous, invariably in small print and commonly lacking in uniform descriptions. Accordingly, the ads become difficult to throughly search. Because of their small type, invariably items or their features are overlooked. Additionally, the newspapers, typically, are incapable of doing anything more than providing minimal classification for the items advertised. As a result, it becomes necessary to wade through many ads which, though in an appropriate category, lack one or more features required to make the thing advertised suitable for the desired purpose. Still, further, because of the need to maintain preparation cost low, classified ads tend to exhibit limited item-description standards, newspapers being unable to expend significant resources in preparing the ads in order to preserve narrow profit margins. As a result, item descriptions tend to vary depending on the particular person placing the ad and the newspaper representative taking it.

As yet another problem, if on looking for an item of interest, one is unable to find it on the first day of search, if the search is continued into the next day, all the ads for the second day, including those previously appearing, will likely be reviewed, thus duplicating a substantial portion of the prior days work, there typically being no way to distinguish one days ads from the next.

Still further, once ads of interest have been identified, it becomes necessary to either check or otherwise highlight them in the newspaper or prepare a list from which "follow-ups" can be undertaken to see if the items found appealing are still available and whether agreement on their sale can be reached.

These requirements and shortcomings affect not only the people who must wade through the ads to select those of interest, but also, the people who place the ads and who worry over whether they will be seen and responded to. Still further, these same requirements and shortcomings affect the newspapers that offer the classifieds, as the money newspapers are able to generate from them will depend on both the size and satisfaction of the audience that reads the classifieds and the audience that places them.

While in the recent past, a number of automated classified ad systems have been proposed to ease some of these requirements and problems, the systems recommend not only continue to exhibit difficulties previously known, but also, present entirely new problems not found with conventional, newspaper print classified ad systems.

As an illustration, in U.S. Pat. No. 5,283,731, issued to Lalonde et al., Lalonde et al. propose a hybrid, computer-telephone system that permits a would-be seller to call in a sell ad that will be loaded to a computer database and subsequently computer searched by the system; as for example, using Standard Query Language (SQL), against want ads previously loaded. In the event of one or more matches, the system subsequently performs a "call back" to the seller in which voice synthesis is used to relay the match information, the seller prompting playback of the match information with telephone keypad entries. Additionally, the system permits a would-be buyer to call in a want ad which, likewise, would be loaded in the computer database, but here, searched against sell ads. As in the case of sell ads, in the event of one or more matches, the system performs a call back to the buyer in which voice synthesis is used to relay the match information in response to the buyers prompts entered at the telephone keypad.

As proposed by Lalonde et al., in accord with their design, receipt of the sell or want ads is preferably undertaken with a human operator who loads the respective ad information to the computer database in accord with screen-driven database menus. Lalonde et al., however, suggest that the ads may also be taken with computerized voice-recognition equipment that may be optionally included in their system.

Regrettably, though the Lalonde et al. system addresses some of the shortcoming associated with print ads searching, a number of new problems are presented, and, certain of the old problems remain. Specifically, though Lalonde et al. would appear to reduce the burden of manual ad searching, it does so at the cost of a number of advantages associated with traditional print ad classifieds. By virtue of the reliance on automated telephone ad information entry and reporting equipment, the Lalonde et al. system has the tendency to be impersonal and restrictive. Further, the Lalonde et al. system discourages buyer browsing by compelling would-be buyers to be sufficiently certain about what they are looking for as to provide specifications. Additionally, because buyers do not see listings of ads, the opportunities for associated or alterative buyer selections are substantially reduced.

Yet further, by virtue of the Lalonde et al. system's use of operators for receiving and entering ad information, uncertainty is presented as to language standards and the subsequent relevance of reported match information. Yet further, though system call backs create the impression match information will lead to satisfaction of a placed ad, still follow-up calls are required with the attendant uncertainty of item availability. And, to the extent sellers are required to make calls to potential buyers, not only is the seller placed in an awkward bargaining position, but, the potentials for adding to the seller's costs with unsuccessful follow-up calls and associated disappointments are increased.

Additionally, because the Lalonde system relies on conventional database search techniques, the search process can be time consuming and expensive to perform, particularly as the size of the ad database is increased. And, still further, the Lalonde et al. system has the added disadvantage of requiring usage of sophisticated and expensive voice recognition and synthesis equipment, the convenience, reliability and public acceptability of which have yet to be confirmed in practice.

Yet another example of an automated classified ad system is presented in U.S. Pat. No. 4,429,385 issued to Cichelli et al. In their patent, Cichelli et al. describe a propriety system for broadcasting classified ads to the public. In accord with their design, Cichelli et al. require that for the sake of speed and simplicity, information be communicated in only one direction; i.e., non-interactively, from their system transmitter to a special, computerized reception system which the user who seeks to read the ads must maintain.

As required by Cichelli et al., since in accord with their design, information is communicated in only one direction, search requests can not be received from the user. As a result, the Cichelli et al. classified ads must be arranged in a sequential database, so that the entire content of the database can be streamed past the user's reception system and desired ad records pulled from the transmitted information each time the user seeks to undertake an ad search. More specifically, whenever a user desires to undertake a search for ads, he must navigate through a sequence of hierarchical menus presented at his reception system in which lists of various characteristics of the item searched for are presented. Following designation of the item characteristics in the sequence of menus, the user's reception system generates a recognition code that configures the user's reception system so as to capture select ads as they stream past in the transmitted ad broadcast.

As is immediately apparent, though the Cichelli et al. system provides some relief for the drudgery of ad searching, it does so at a substantial cost in flexibility and equipment expense.

While navigation of hierarchical menus provides an attractive alternative to manual searching for the identification of ads of interest, the Cichelli et al. approach, however, requires newspaper and user to make substantial investments in proprietary, limited purpose transmitting and reception equipment necessary for the Cichelli et al. design. Still further, as is also apparent, because the Cichelli et al. system is unidirectional and requires use of a sequential database which must be continuously recycled to enable search of all ad records, search response time must increase as the size of the database is increased. Accordingly, there comes a point where increases in database size needed to generate revenues sufficient to offset operating and equipment costs and maintain profit margins are foreclosed because of user dissatisfaction with unacceptable increases in system response time.

Still further, since the Cichelli et al. system is only broadcast, it is completely non-interactive. Accordingly, the user is not able to use his proprietary system to enter ads. Rather, where the user desires to enter an ad, a separate and independent telephone call must be made to the database broadcaster. As well, because the Cichelli et al. system requires navigation of multiple menus to formulate each search query and cycling of the database for search results, the system has the potential for being sluggish, thus discouraging ad browsing and diminishing the opportunity for associated or alterative ad selection.

Finally, a still further approach to automated classified ad systems is presented in U.S. Pat. No. 4,645,873 Chomet. As explained in his patent, Chomet proposes the public telephone network and personal computers be used for connecting to a proprietary host computer at which a plurality of resources can be provided, among which is included a computerized classified ad system. As taught by Chomet, the user is required to dial up the central host over public telephone network with a personal computer and modem, and once connected, enter an access code. Thereafter, and upon validation of the user's access code, the user is presented with menus having a variety of service, among which are included e-mail, catalogue purchasing, classified ads and gatewaying to third-party databases.

Upon electing the classified ad service, the user is prompted to indicate whether he is interested in entering an ad or viewing existing ads. Where the user elects to view ads, he is subsequently required to enter an ad category as might commonly be used in connection with print classified ads, and thereafter, is presented in newspaper fashion with ads in accord with the ZIP code associated with his access code. Subsequently, and as proposed by Chomet, the user's viewing of classifieds would be timed and charges applied based on the amount of ad viewing time consumed.

Alternatively, where the user upon being prompted as to whether he wishes to enter an ad, elects to do so, he is merely asked to enter the category and ZIP code for the ad and the ad text.

On review of the Chomet teaching, it is clear that by proposing use of an interactive, computer network for presenting classified ads Chomet has suggested a system that provides greater ease for presenting and viewing ads. However, it is also apparent from the description of his system that much of the search difficulty arising from limited ad organization and lack of standardization of item description associated with traditional classified ads remains in the Chomet system. Additionally, it is also apparent that because Chomet relies on conventional techniques for searching the ad database; for example SQL, his system is susceptible to time consuming and costly search processes which can become objectionable to users, particularly as the size of the ad database is increased. Still further, it is also apparent that in view of his suggestion that users be required to have access codes and be charged for ad viewing time, Chomet has proposed a system that departs from the long established and widely accepted practice of not charging for classified ad review beyond the cost of the newspaper that presents them.

SUMMARY OF INVENTION

Accordingly, it is an object of present invention to provide an interactive classified ad system and method of operation which integrate advances made in automated classified ad systems, while overcoming associated shortcomings previously encountered.

Additionally, it is an object of present invention to provide an interactive classified ad system and method of operation which reduce the burden of manual ad searching commonly associated with print classified ads.

Further, it is an object of the present invention to provide an interactive classified ad system and method of operation which provide rapid response to search queries.

Yet additionally, it is an object of the present invention to provide an interactive classified ad system that may be automatically updated.

Still further, it is an object of the invention to provide an interactive classified ad system and method of operation which is simple to use.

Yet additionally, it is an object of the present invention to provide an interactive classified ad system and method of operation that provide uniformity in the description of items advertised.

Additionally, it is an object of this invention to provide an interactive classified ad system and method of operation which are capable of receiving both requests to view classified ads and requests to place classified ads.

And, yet further, it is an object of the present invention to provide an interactive classified ad system and method of operation that is accessible and open to use by the public without need for proprietary equipment.

Briefly, the classified ad system in accordance with the present invention achieves the above and other objectives by including apparatus elements and method steps for permitting the system to be offered in either wide-area or local-area, interactive computer networks such as the Internet or intranets.

Particularly, the classified ad system and method of operation include and support:

One or more computer terminals at which, respectively, a user can request the selection of classified ads, view the ads selected, and/or additionally, request placement of classified ads authored by the user;

One or more computer application servers arranged to receive user requests for classified ads, return the classified ads selected to the user, and/or receive user requests for placements of classified ads;

A network for operationally connecting the user terminals to the application servers;

One or more databases including classified ads;

A record request message generator located at each of the application servers for generating classified ad request messages responsive to a user's ad selection desires for forwarding to the respective database at which the ads records are provided;

A search processor associated with the respective database at which the ad records are provided for receiving the request message and locating the desired ad records and returning them; and A report generator at the respective application server that originated the request, for reporting the results of the database ad search back to the user.

Additionally, the system and method of operation include and support:

An ad generator for each of the respective databases for receiving classified ad text and automatically creating classified ad database records from the text for the respective ad databases;

A collection server for receiving the ad database records created; and

A distribution processor for sorting and organizing the database records created and making them available to the respective ad databases.

In preferred form, the classified ad system of the present invention is adapted for use on the World Wide Web (Web) of the Internet and supports an international classified ad system specialized for regional markets. In this form, the system includes a plurality of classified ad databases maintained for a plurality of regional newspapers located throughout the world. In accordance with this arrangement, each regional newspaper maintains an Internet Web site having a home page listing its classified ad service and a Hypertext Markup Language (HTML) linking to a central, application Web server facility at which all the respective regional newspaper classified ad databases for the system are kept. In preferred form, the application Web server facility includes multiple application servers and multiple ad databases, the application servers and databases, respectively, including redundancy to provide improved functional reliability and allow for load balancing. In operation, users interested in viewing the classified ads of a particular regional newspaper anywhere in the world connect to the Internet in conventional fashion and navigate with their Web browser to the newspaper's home page. On arrival, the user selects the classified service from the newspaper's home page and undertakes a two-part record search process. In accordance with the invention, the two-part search process includes a first phase in which the user navigates in Web fashion to a category menu at the newspaper Web site, where the user enters a record-narrowing, pre-selection subject-matter designation, followed by a navigation to a subcategory menu at the system application server where the user can enter a further subject-matter designation to additionally narrow the range of records to be reviewed. Additionally the search procedure includes a second search phase in which a record-request message is generated based on ad selection parameters entered by the user, the request message being submitted to the ad database for retrieval of the desired records which are subsequently reported to the user.

Also in preferred form, and relative to the method aspect of the invention, in order to effect rapid search of the respective ad databases so as to maintain system response time low in light of the time consuming nature of Internet communication, the respective ad databases are designed to have a substantially numeric form and be retained in RAM of the respective database server. Additionally, the respective databases are also designed to have field lengths for the ad record variables equal to the word length of the processing equipment so that field value comparisons undertaken during search steps can be executed in a single machine cycle.

Additionally, to further reduce search time and reduce machine resource overhead, the database query is undertaken as a message request to the respective databases rather than a conventional database query effected; as for example, with Standard Query Language (SQL). This has the effect of transforming the ad selection process into a client-server event rather than a resource-intensive database search event.

Still further, in order to further speed and simplify the ad record search process, the respective ad databases are divided into two principal parts. A first part including ad record category and subcategory identifier tables and a second part including tables having ad record identifiers associated with the field values for the respective ad database records. In preferred form, the record category/subcategory identifiers are indexed to the start and stop values for the ad record identifiers and associated field values. Accordingly, when records are searched for, the system performs a pre-selection designation of the category/subcategory in order to identify a much smaller work portion of the database which is defined by the record identification start-stop values for the records on which the record selection query will be performed.

Yet additionally, in the preferred form, the system includes elements and steps for providing and supporting automated ad record generation to both speed the database creation and update process and provide for uniformity in the ad item descriptions. Specifically, the system includes a parser located at each of the regional newspapers for receiving a feed of proposed classified ad text together with overhead information. Once initialized with data including configuration and ad text recognition information specific to a respective newspaper, the respective parser establishes a set of processing tables for the specific newspaper and compares the ad text to the tables in accordance with predetermined parsing rules to convert the ads operative terms into a set of standard field values which the parser uses to create a substantially numeric database record information.

Also in preferred form, each regional newspaper ad generator includes an Internet server for receiving the database record information created by its respective parser. The respective ad generators are connected to the Internet in conventional fashion and make the parsed ads available for Internet pickup and/or delivery.

Still further, the system in preferred form also includes a collection server connected to the Internet for collecting the newly created parsed ad records from the respective regional newspaper ad generator servers using a conventional Internet FTP/IP process.

Finally, the system yet further includes a distribution processor which in preferred form is locally connected to the collection server for transferring by means of an FTP/IP process the collected new ad record information and arranging it in a current-day directory of a multi-day directory system provided at the distribution processor for the respective newspapers. Following placement in the current-day directory, the ad record information is sorted by: category; subcategory; predetermined preferences; and a predetermined sort order for the ad selection parameters to create the respective database ad records. Thereafter, the sorted ad records are forwarded to the respective database servers which separately maintains the respective regional newspaper classified ad databases for access by the respective application servers.

BRIEF DESCRIPTION OF THE DRAWINGS

The above and other objects, features and advantages of this invention will become apparent upon reading the following detailed description with reference to the accompanying drawings in which:

FIG. 9 is a schematic diagram illustrating the search process subcategory designation menu for the classified ad system in accordance with this invention.

FIG. 10 is a schematic diagram illustrating the search process record selection menu for the classified ad system in accordance with this invention.

DETAILED DESCRIPTION

As noted above, while classified ads are an exceedingly valuable and helpful public resource, significant problems are associated with their use when in conventional, newspaper, print form. Due to their usually substantial numbers, lack of descriptive uniformity and generally poor classification layout, print classifieds are difficult and time consuming to work with and, in particular, a problem to search. While, computerization has made some progress in dealing with certain of these shortcomings, the systems thus far proposed, have failed to resolve a number of the traditional difficulties, and as noted, have introduced a whole series of new ones.

The system of the present invention, however, changes that, and for the first time offers an approach that simplifies and speeds the process of searching classified ads, and further, provides a facility for automatically creating and organizing classified ads and providing them with a more uniform set of searchable item descriptions. In accordance with the present invention, the design of the current system achieves this by integrating the convenience and international scope of the Internet's World Wide Web, the flexibility of a specially adapted classified ad database, the speed of a simplified database search protocol, and the uniformity associated with automated creation and supply of the ad database records.

SYSTEM OVERVIEW

Figure 1:
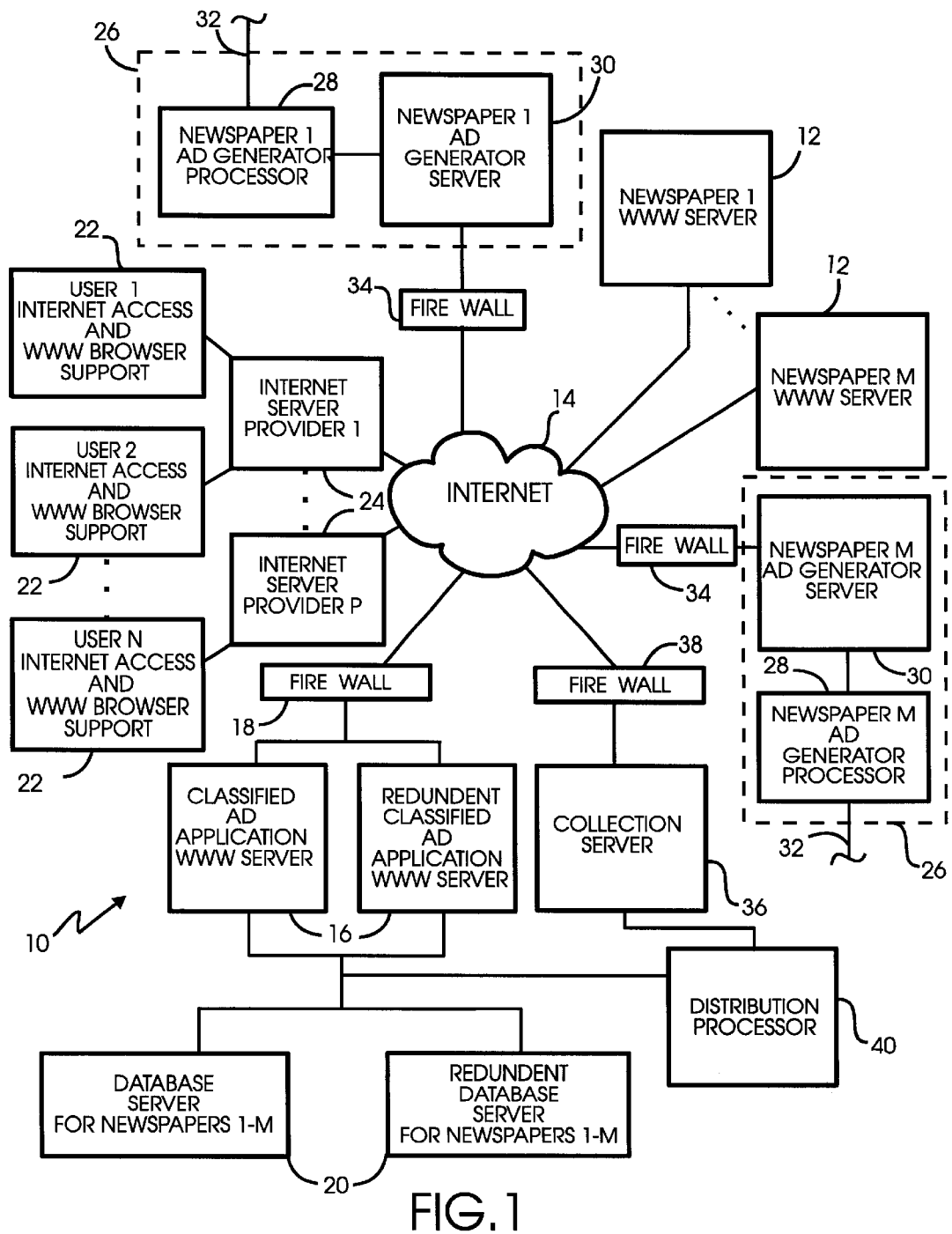
FIG. 1 is a schematic block diagram of the international classified ad system in accordance with this invention.

More specifically, the classified ad system in accord with the present invention designated by the referenced numeral 10 is shown schematically in a first preferred form in FIG. 1. With reference to FIG. 1, ad system 10 is preferably configured for world-wide operation and includes a plurality of regional newspaper servers 12 shown differentiated one from another by indexing 1 to M. As illustrated, each of the newspaper servers 12 are respectively connected in conventional fashion, as for example, with dedicated telecommunication data lines, or dial-up telephone lines to the Internet designated 14. As will be appreciated, newspaper servers 12 may be located anyplace in the world where connection to the Internet may be effected. In accord with the invention, servers 12 are conventional Internet, World Wide Web (Web) servers, and thus, support the hypertext markup language (HTML) and the hypertext transport protocol (HTTP). Accordingly, in preferred form, servers 12 support client terminals equipped with a conventional Web browser; as for example, Navigator® available from Netscape Communications, Inc., or Moasic® from Spyglass, Inc., or the Web browsers respectively provided by certain of the propriety, commercial services such as the Prodigy® Network, and others. In preferred form, newspaper servers 12 are preferably able to provide access to the classified ad service as well as other newspaper on-line features and, accordingly, should be capable of supporting multi-processing and be able to manage on the order of a thousand concurrent users.

Continuing, ad system 10 is also seen to include a central ad application server 16 also connected in conventional fashion to the Internet 14. As shown, in the case of ad application server 16, a firewall 18 is provided at server 16's connection to the Internet to prevent unauthorized entry and to secure the application server environment. Like newspaper servers 1 to M, application server 16 also supports the HTML, HTTP protocols and clients running suitable Web browsers such as Navigator, Moasic, and others. In view of the capacity of the respective newspaper servers, application server 16 should also be capable of supporting multi-processing and able to manage at least several thousand concurrent users. Further, in preferred form, system 10 is seen to include an additional equivalent application server 16 to provide redundance for purposes of improving system operational reliability and to enable user load balancing. Still further, and as will be appreciated by those skilled in the art, where system reliability and user loading demands require, yet additional application servers 16 could also be provided.

As further shown in FIG. 1, system 10 also includes two, redundant newspaper ad database servers 20 for providing classified ad records on request to application servers 16.

In first preferred form, to provide backup for the ad record information, each of the two database servers 20 are the same and include an ad record database for each of the newspapers 1 to M carried by system 10. Additionally, while each database servers 20 is maintained active during operation of system 10, to minimize the adverse impact on performance, only complementary halves of the full set of newspaper databases are accessed by each server during normal operation. In the event of failure at either database server 20, the other assumes the burden of providing ad record information for all of the newspaper databases to application server 16.

As an alternative approach to improving load balancing and reliability, each of the database servers 20 may be arranged to have all its databases active, and the application servers permitted to access either of the databases as desired to distribute user request load.

And, as a yet further alternative, dedicated pairs of application servers 16 and multiple-newspaper database servers 20 could also be provided, and user load distributed between the two pairs in conventional manner to effect load balancing.

Continuing with reference to FIG. 1, a multiplicity of user terminals designated 22 and differentiated from one another by indexing 1 to N are additionally shown connected to Internet 14. However, in accord with practices currently prevailing, members of the public; i.e., "users", typically do not directly access the Internet. Rather, because of the prohibitive cost associated with maintaining personal, direct Internet connection, users commonly group their access by relying on Internet service providers 24, such as the Prodigy Network; Pipeline, Inc., etc., differentiated in FIG. 1 by indexing 1 to P, who offer and maintain Internet access along with other on-line information services such as e-mail, FTP/IP, Gopher and others for a nominal, monthly fee. As will also be appreciated by those skilled in the art, users terminals 22, like servers 12 may be located anyplace in the world were Internet connection can be effected.

In preferred form, user terminals 22 are conventional personal computers having sufficient resources; e.g., processor type, RAM, disk storage, and data communication facilities; e.g., a modem, for supporting the communications software supplied by their Internet service provider 24, and a Web browser such as Netscape for accessing Web newspaper servers 12 throughout the world.

Continuing with reference to FIG. 1, system 10 is also seen to include an ad generator 26 for each of the newspapers differentiated by indexing 1 to M. As shown, each newspaper ad generator 26 includes an ad generator processor 28 and an ad generator server 30. In accord with system design, each processor 28 includes a feed 32 for receiving classified ads from the respective newspapers. In accord with the preferred embodiment, in order to simplify support of system 10 for the newspapers, the ad files are fed to processor 28 in the same form as used by the newspaper in creating print classifieds. Further, each generator 28 includes elements for automatically transforming the newspaper ad feed into database record information having a primarily numeric form which may be thereafter, collected, sorted and converted into database records for supply to database server 20 for searching.

Still further and in accord with the invention, generators 26 also includes a server 30 for providing the newspaper ad information over the Internet to the rest of system 10. Ad generator servers 30 are connected to Internet 14 in conventional fashion; for example, preferably with dedicated telecommunication data lines or with dial-up lines, and, need only be able to support the Internet file transport protocol; i.e., FTP/IP, ad generator servers 30 not being available to the public for browsing and not a part of the Web. In this regard, it is to be noted that ad generator servers 30 also include fire walls 34, respectively, to prevent unauthorized access to ad generator 26 and secure its environment.

With continuing reference to FIG. 1, System 10 is additionally seen to include a collection server 36 connected to Internet 14. In accord with system design, collection server 36, as its name implies is provided to collect the classified ad database record information for the respective newspaper ad generator 26. Collection server 36 is again connected to Internet 14 in conventional fashion, but, is not available to the public for browsing, and as a result, need not be a part of the Web. Rather, server 36 is intended to be dedicated to the collection of classified ad database record information files by means of Internet 14, and need only support the TCP/IP protocol used to communicate files from ad generator servers 30 to collection server 36. Accordingly, collection server 36 is also provided with a fire wall 38 to prevent unauthorized access to collection server 36 from Internet 14 and provide security for the collection environment.

System 10 is yet further seen to include a system distribution processor 40 which manages supply of the collected ad database record information. As shown, distribution processor 40 is connected to and networked with system collection server 36 and the newspaper databases 20. In accord with system design, and as will be described in further detail below, distribution processor 40 receives the collected ad database record information of the respective newspapers 1 to M from collection server 36, arranges the record information by date in a specially provided directory system and sorts the record information by category and subcategory, predetermined preferences and by a predetermined sort order based on ad selection parameters to create the ad records. In this regard, the predetermined preferences typically provides for placement of ads at the beginning of any ad listing supplied to the user as a result of the party placing the ad having paid a premium or special fee for listing preference. In accordance with the invention, the predetermined sort order for the ads is established by the newspaper to provide a preferred fixed listing of ads presented to a user. For example, in the case of ads concerning real estate sales, the newspaper may wish to present properties listed in ads by type; for example, houses, and then by local and price, to simplify the user's review. Or, in the case of ads concerning automobiles, the newspaper may wish to present ads in the order of make, model and year to simplify user review.

Ad Searching

Record Structure and Organization

Figure 2:
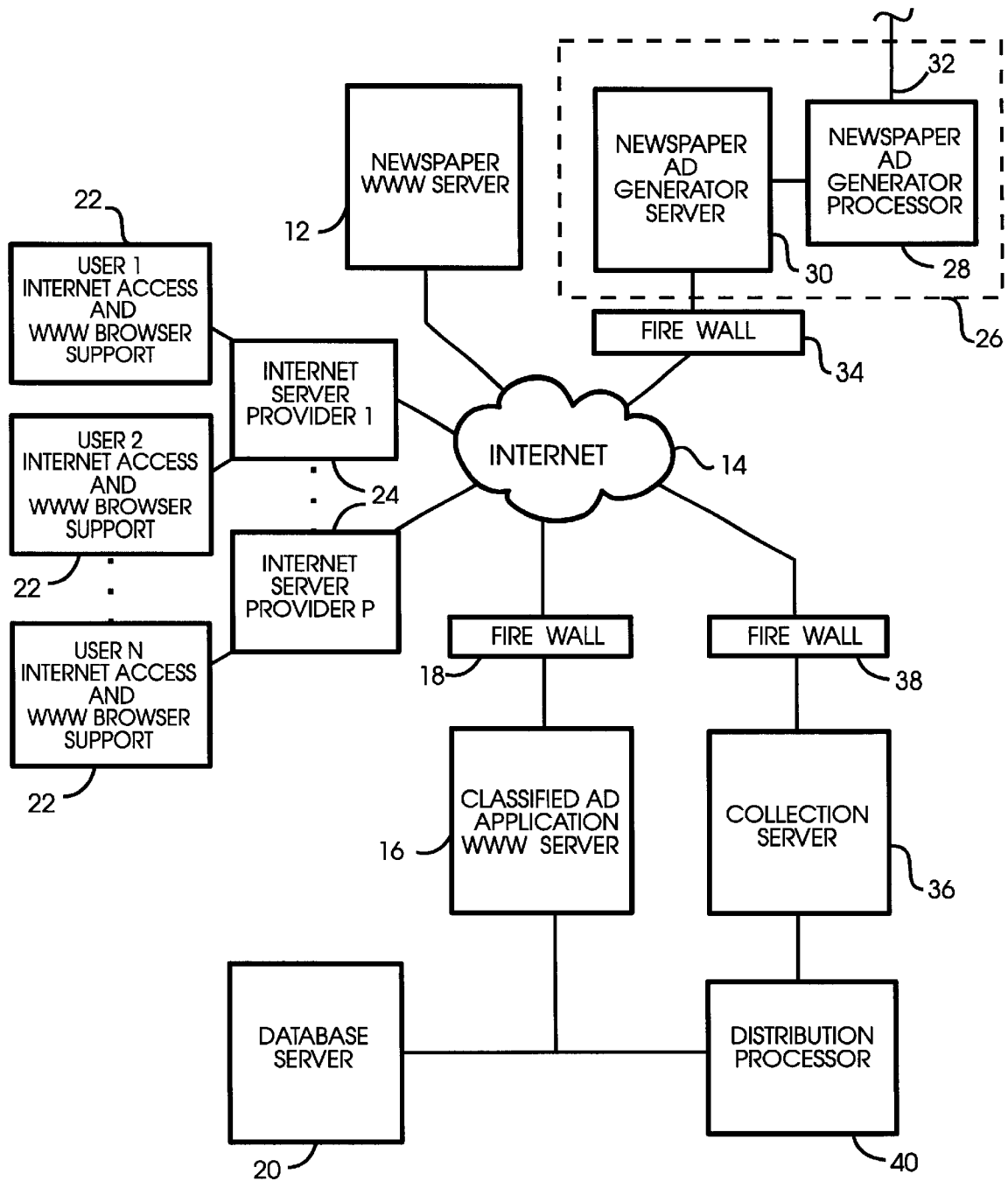
FIG. 2 is a simplified schematic diagram of the classified ad system for a single ad source in accordance with this invention.

To facilitate explanation and understanding of the record search process, system 10 is presented in simplified form in FIG. 2, like elements being designated with like references numerals.

More specifically, in FIG. 2, system 10 has been re-drawn to illustrate the case of a plurality of users accessing the classified ads of a single newspaper. In this simplified form, a single newspaper server 12 is shown connected to Internet 14 along with classified ad application server 16, application server 16 being connected to Internet 14 through fire wall 18. As shown, a single newspaper ad record database server 20 is connected to application server 16 and users 22 are connected to Internet 14 through a plurality of respective Internet service providers 24.

For the following discussion, the focus will be on the ad search process. However, for sake of completeness, brief reference is made to the system ad generation and database management elements also shown in FIG. 2. Specifically, and as illustrated, in the case of a single newspaper classified ad source, system 10 includes ad generator 26 having ad processor 28 and ad generator server 30 connected in conventional fashion to Internet 14 through fire wall 34. Additionally, collection server 36 is seen connected to Internet 14, also in conventional fashion, through fire wall 38. Still further, system distribution processor 40 is shown connected to collection server 36 and database server 20.

Before describing the details of the search procedure, it may be helpful to provide a brief overview of that process. In accord with the present invention, to simplify and speed the search for and retrieval of classified ad records from the respective newspaper database servers 20, the search process, database structure, and the classified ad subject matter have been specially designed and organized.

To accelerate and simplify the search for ad records, the process is divided into two principal parts: a first, system entry and pre-selection designation sequence, and a second, record-selection sequence. Once the user has initialized his terminal 22 and establishes a communication session with system 10, a pre-selection sequence is begun which progressively leads the user to a point where specific ads of interest can be requested. As the user progresses from entry, the pre-selection sequence begins and continues to narrow the range of records eligible to be searched, thereby, immediately truncating the full ad database, so that when the user arrivers at the point of entering parameters for ads to view, only a small percentage of the ad database records need be accessed. As will be appreciated, this truncation of the number of records to be queried substantially reduces the machine resources and time required to search for and retrieve the ad records desired to be viewed.

More specifically, when the user first enters the system, he is able to specify the category of classified ads to be searched; for example, "real estate", "jobs", "personals", "vehicles", etc. Thereafter, as the user navigates to the respective selected category, he is further able to specify the subcategory for the particular category selected. For example, where the user wishes to search for items in the classified category "real estate sales", a subcategory of real estate sales such as "residential", "mobile", "farms/lots/acreage", etc. would then be selected. Once this hierarchy of category/subcategory has been designated, a substantially narrowed range of database ad records is identified, and that narrowed population can then be searched by entering a formal record selection query containing the specific parameters for the records the user wishes to see.

To facilitate this expedited procedure, the classified ad record database has been specially structured. Particularly, and as shown in FIG. 3, the ad record database for the system has been arranged to include two sets of related information, specifically, a set of pre-selection designation tables 42, and a set of record selection tables 44.

Figure 3:
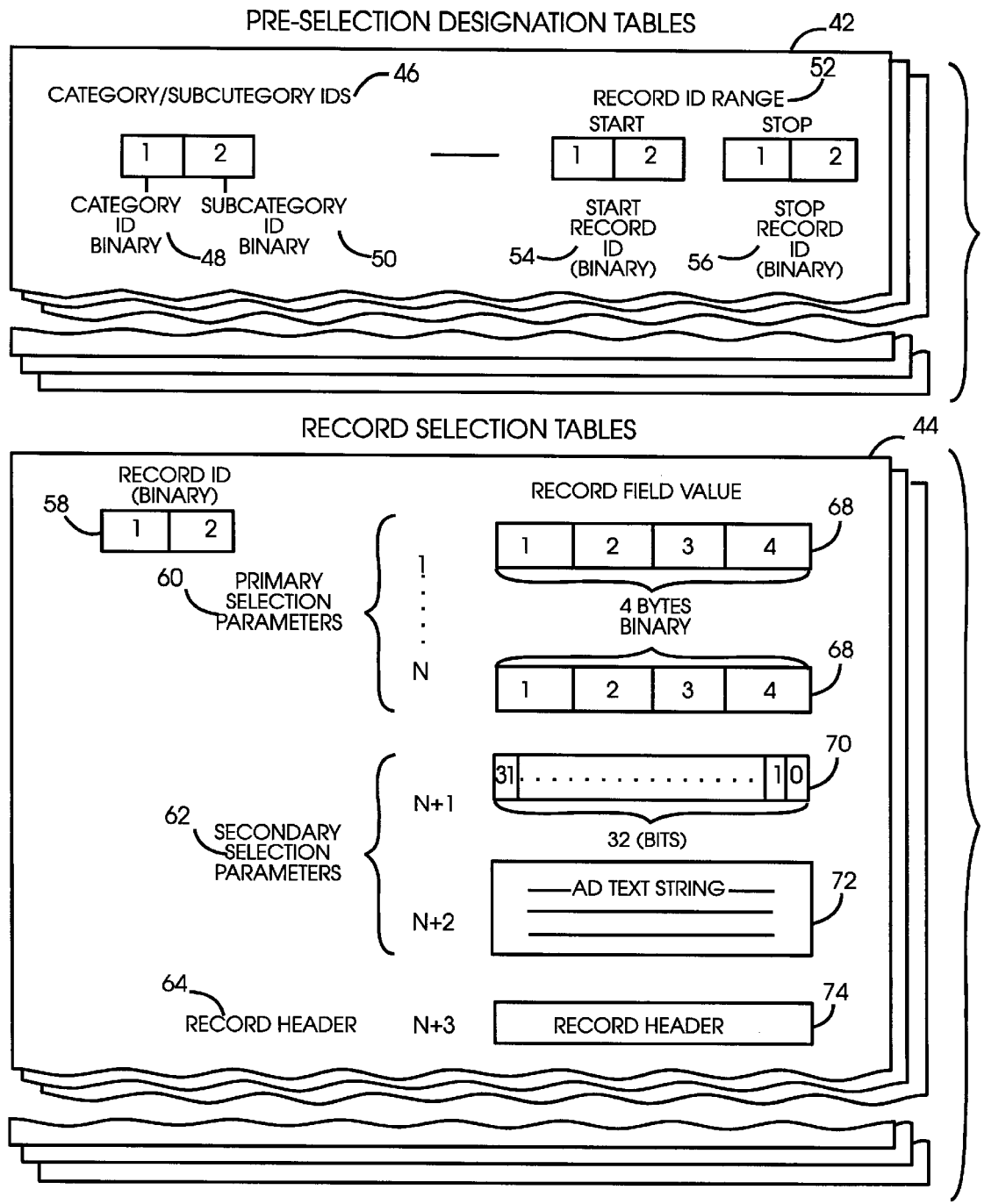
FIG. 3 is a schematic diagram of the database structure for the classified ad system in accordance with this invention.

As seen in FIG. 3, pre-selection tables 42, include a sequence of ad record identification numbers 46, one for each of the noted hierarchically arranged category/subcategory designations for the database. As shown, each category/subcategory identification number 46 includes a first category identification component 48 and a second subcategory identification component 50. As further illustrated in FIG. 3, in preferred form, the category identification 48 and subcategory identification 50 are each binary numbers and are provided as single, eight bit binary bytes capable of representing 256 (0–255) different values. As will be described more fully hereafter, in preferred form, and in connection with search messaging, the single bytes 48 and 50 are each used to represent a two-place, ASCII designation for an ad category and subcategory. Accordingly, in preferred form, the system for purposes of search messaging recognizes up to 99 (01–99) categories and 99 (01–99) subcategories, the 00 values, respectively, being reserved to indicate no designation, which in the case of the subcategory identification, is a designation calling for the listing of all subcategories associated with a particular category. while this category-subcategory capacity has been found suitable for the current system, as will be appreciated, if greater numbers of categories and/or subcategories were desired, they could be readily provided either by employing a different radix; for example, alphanumeric, hexadecimal etc., in place of the numeric ASCII designation, or by providing additional data bits for the respective identifications. However, and as will also be appreciated, as the number of categories and/or subcategories is increased, system ease of use may be eroded, since explanation for the content of the added categories and subcategories may be necessary in order to maintain user understanding.

Continuing, and as seen in FIG. 3, indexed to each category/subcategory identification number 46 is a range of record identification numbers 52 which gives the start record identification number 54 and the stop record identification number 56 for the range of records corresponding to the associated category/subcategory identification 46. As shown, start record identification 54 and stop record identification 56 are each two, eight-bit, binary bytes having a numeral ranges of 0 to 65,535 respectively, Accordingly, in the preferred form shown, the system is designed to accommodate up to 65,536 record identification numbers and associated ad records. Again, as will be appreciated by those skilled in the art, in the event more ad records are desired, a greater bit length would be given to the record identification numbers.

With this arrangement, when a user first enters the classified ad system, he is presented a list of ad categories in a menu and asked to select a category of interest. Upon making the selection, the system generates the corresponding category identification number 48 for the category selected; as for example, with a simple lookup from a table that contains the identification numbers corresponding to the categories presented in the menu. Thereafter, the user is presented a second menu which includes a list of subcategories for the category selected, and is asked to designate the subcategory of interest. In response, the system generates a subcategory identification number with a table lookup in a fashion comparable to that used to generate the category identification. Once the subcategory of interest has been designated and an identification number generated, the system combines it with category identification number 48 to establish the category/subcategory identification number 46.

Following the user's designation of the category and subcategory of interest, the system accesses tables 42 and based on the category/subcategory identification number generated finds the range of corresponding ad record identification numbers 52. As will be appreciated, once this narrowed range of ad records has been identified, a subsequent record selection query detailing the specific features of the ads to be viewed can be submitted and quickly responded to. As will also be appreciated, as the user navigates to this point; i.e., is sequentially shown the category and subcategory menus, the system is able to report the number of ads available in each of the subcategories by simply noting and communicating the ad record ranges for the respective category/subcategory identifications.

Continuing, with reference to FIG. 3, the system database structures additionally features record selection tables 44. As shown, tables 44 include a record for each classified ad supplied by the newspaper, wherein each ad is characterized by a plurality of selection parameters. As seen in FIG. 3, each ad record includes an ad record identification number 58, a set of primary selection parameters 60, a set of secondary selection parameters 62, and an optional record header 64. As will be appreciated, while each record is shown for purposes of illustration to have an expressly included record identification number 58, each record could be identified by its position in the record order determined by a start or reference location and offset to the record position, as is well known in the art. Indeed, the latter approach would be preferred as it eliminates express inclusion of the record number in the record and thus reduces the record data size for purposes of storage and processing.

Still further, while the record text and record header fields, 72, 74 respectively, are indicated as included in the record, again for purposes of record compactness rather that inclusion of an express parameter identification number, a pointer to a suitable variable length memory location and associated length of the field would be provided in the record. Moreover, where position is used to identify parameters rather than an express character identification included in the record, since the variable length of the ad text and header fields would lead to uncertainty concerning the position of fields in the record, fixed length pointers and length values are required to be used instead.

As suggested above in connection with the description of start and stop record identification numbers 54, 56, in preferred form, record identification numbers 58 comprise two, eight-bit, binary numbers, and thus, have a value range of from 0 to 65,535. Continuing with reference to FIG. 3, primary selection parameters 60 include a plurality of fields. Though not included in the ad record, each field has an associated field number used for purposes of identifying the parameter in connection with the an ad search request as will be described hereafter. In the ad record itself, to maintain compactness of each record for storage considerations, each field is identified only by its respective position in the parameter listing, the record being established such that the specific selection parameters are arranged in a predetermined order. As will be appreciated, to facilitate selection, the position of the respective fields in the record are correlated with the respective field identification numbers in a manner well known in the art. For purposes of illustration, however, the respective fields have been referenced in FIG. 3 with index 1 to N. Additionally, and as also shown, each primary selection parameter includes and an associated field value 68. In accord with the invention, primary selection parameters 60 include a collection of features that serve to describe the item advertised and distinguish one item ad from another in the relevant category and subcategory. Further, and as will be appreciated, the type and number of features used to accomplish this for each subject matter category and subcategory will vary depending on the nature of the subject matter involved. For example, in the category "real estate sales" and subcategory "residential property," the primary selection parameters might include such features as: the type of property; e.g., house, condo; the location; e.g., county, town; minimum price; maximum price; minimum number of bedrooms; minimum number of baths; and number of car garage, etc.

On the other hand, in the case where the category is "vehicles"; i.e., automotive, and the subcategory is "cars", the primary selection parameters might include such features as: the make; model; minimum year; maximum year; minimum price; and maximum price.

In accordance with the invention, this flexibly and range of presentation is achieved by maintaining the primary selection parameters in numerical form; i.e., numbers, during internal processing to achieve compactness and ease of handling, but, by presenting the parameters to users in character form; i.e., words, when displaying them in the search menus. In this way, the system is able to achieve the speed and simplicity of numerical processing, while providing the ease of use and understanding associated with descriptive menus.

Continuing, in preferred form, the above-noted field identification number used to designate the primary selection parameters in connection with ad record search messaging, as will be described more fully hereafter, is a two-place, ASCII number, each place being represented by an eight-bit, binary byte. Accordingly, the field identification has a maximum of 99 values; the range being from 01 to 99, once again the 00 designation be reserved to identify designation of no primary selection parameters. In operation, it has been found adequate to have a maximum of 16 primary selection parameters, 16 being a number sufficient to provide enough selection parameters for the range of subject matter commonly encountered in traditional classified ads. According, "N" of the illustrative, reference index shown in FIG. 3 would be 16. As in the case of the category and subcategory identifications, if more field number identification values were desired, either a different radix could be used, or a greater bit length for the identification number could be provided.

As also seen in FIG. 3, each primary selection parameter has an associated record field value 68. The record field value 68 for each of the respective fields referenced with illustrative index 1 to N is a four byte binary value. In accordance with the invention, the field values, as the name implies are the numerical values for the primary selection parameters that characterize the item advertised. In the case of an ad offering a house for sale; for example, and as noted, the primary selection parameters in preferred form would include such features as the purchase price, the number of bedrooms, the garage capacity, etc., for each of the respective ads.

Further, in accordance with the invention, to speed processing of search requests, the primary selection parameters are required to be numerical values only. This approach enables a simplified search procedure. Specifically, the user's search request is taken as a group of primary parameters and a group of secondary parameters. At least the primary selection parameters are taken as specific numeric values which the user enters at the interactive search menus, and which values can then be simply numerically compared with the field values for ads in the database record range defined by the user's designation of category and subcategory. In accord with the invention, the user enters the numerical values for the primary selection parameter either by making write-ins at interactive fields provided on the selection menu or by selecting features presented at the selection menu; as for example, with lists, the list selections producing related fixed-coded numerical values. As will be appreciated the simple, numerical comparison of the user supplied primary selection parameter values with the ad primary selection parameter values held in the ad database enables the search procedure to be rapidly and simply performed.

Also in accordance with the invention, to further speed processing of search requests, the primary selection parameters are not only designed to have numerical values, but additionally, they are required to be of a predetermined, fixed length. In preferred form, field values 68 are selected to have a data length equal to the machine word length for the hardware used to implement the system. As will be appreciated by those skilled in the art, this enables the values for the respective primary selection parameters to be evaluated in one machine cycle. Accordingly, in the preferred embodiment shown, field values 68 are selected to be four bytes in length; i.e., 32 bits, to match the word length of the system's preferred 32 bit processor.

Continuing, in accordance with the invention, secondary selection parameters 62 also include a plurality of fields. As in the case of the primary selection parameters 60, secondary selection parameter fields also have an associated field number used for purposes of identifying the parameter in connection with the an ad search request to be described. However, once again, to maintain compactness, the identification number is not included in the ad record itself, each secondary selection parameter field being identified by its respective position in the record parameter listing, the fields record being arranged in a predetermined order. Once agin, to facilitate selection, the position of the respective fields in the record are correlated with the respective field identification numbers in a manner well known in the art. For purposes of illustration, however, the respective fields have been referenced in FIG. 3 with index N+1 and N+2 to indicate their sequential order after the primary selection parameter field reference 1 to N.

In accordance with the invention, secondary selection parameters 62 are designed not only to supplement primary selection parameters 60, but also, to provide the user additional convenience in entering desired selection parameters. In the preferred form, illustrated in FIG. 3, secondary selection parameters 62, include a mapped field 70 of "yes-no" secondary features for the ad subject matter and a text string 72 containing the entire text of the ad to enable ad-text, keyword searching. In accord with the invention, like primary parameters 60, secondary selection parameters 62 provide details concerning the ad subject matter. However, secondary selection parameters 62 additionally provide user-convenient, alternative ways of describing the ad subject matter. Specifically, yes-no field 70 in preferred form provides up to 32 features which the user can simply check off in a selection menu to further describe the ad to be viewed. As in the case of the primary parameters 60, yes-no field 70 of secondary parameters 62 are category and subcategory dependent. For example, and again with reference to the category "real estate sales" and the subcategory "residential property," yes-no field 70 preferably includes such features as whether or not the property has: a fireplace, family room; eat-in kitchen; formal dining room; pool, yard, etc. In the category "vehicles" and subcategory cars, on the other hand, yes-no field 70 might include things like: air conditioning; power steering and brakes; am/fm radio; CD; manual transmission; ABS; sunroof; low mileage; cruise control; one owner; warranty; leather interior; air bag, etc.

Yet additionally, secondary parameters 62 enable the user to also specify features that may be unique to the item being sought and not well suited to conventional classification. As will be appreciated, use of pre-defined yes-no fields can be restrictive both where one is seeking to find and/or to advertise somewhat unique items. Therefore to provide greater search latitude, secondary selection parameters 62 also include a text field 72 of the actual ad placed. Accordingly, when the user undertakes to enter a record selection query, in addition to specifying primary features 60 and a series of yes-no features, he may also enter a keyword which will be compared against the actual ad text in an effort to locate a match. This feature has the further advantage of providing the user an alternative approach to the search in the event use of the primary selection parameters and/or yes-no checkoffs do not provide the results desired. As will be appreciated, and as noted above, since the ad text is variable in length, in preferred form, field 72 in the ad record includes a pointer to a suitable location in a suitable storage area and a length designation to designate the length of the text rather that the ad text itself.

Finally, record-selection tables 44 are yet further seen to include a record header field value 74. Once again, and as in the case of the primary and secondary selection parameters, though the record summary field is provided with an identification number, for the sake of compactness, the number is not included in the ad record, identification being provided by field position alone, which is subsequently related to the field identification number in a conventional manner. Further, similar to the primary and secondary selection parameter fields, an illustrative, index, specifically N+3 is used to reference the record summary field. Additionally, because header 64 is variable length, its field includes a pointer to a suitable storage location and a lenght instead of the actual header text for the same reasons noted in connection with the description of ad text field 72. In accordance with the invention, record header 64 includes text extracted from the ad text supplied by the newspaper at the time the ad record information for use in the ad record is automatically generated, the header including words that characterize the ad.

Continuing, in accord with the above-noted search procedure, once the record selection parameters are entered, a record selection request message is generated and sent to the ad database server 20, where identification of the records satisfying the request query can be made. Thereafter, database server 20 returns the results of the search to application server 16 which, subsequently prepares a report and forwards it to the user.

In practice, for a typical newspaper classified ad database, on the order of several thousand ad records may be included at server 20. And, for those several thousand records there may be approximately several hundred category/subcategory record ranges and associated record range identification numbers 52 provided. Accordingly, upon entry and navigation to the record selection point, the system quickly accesses the limited number of pre-selection tables 42 and associated record ranges 52 to identify the range of ad records for the category/subcategory chosen. Thereafter, once the category/subcategory designation has identified the record range of interest, the user can subsequently complete the search with a record selection query request specifying primary and/or secondary selection parameters 60, 62, respectively, which may be asserted against the subset of the database ad records specified by the pre-selection designation and the associated search results reported.

As will be appreciated, the ad population distribution for the respective category-subcategory organization of the database may not be sufficiently uniform as to provide a pre-selection reduction in records to be searched equal to the total number of database records divided by the number of categories and subcategories. However, by undertaking the search in two-phases; i.e., first a per-selection designation based on a category/subcategory, then a record selection request query based on item features, a substantial reduction in the time and resources necessary to select a record is realized over what otherwise would be required if all records of the database were searched each time a selection query was entered.

Figure 4:
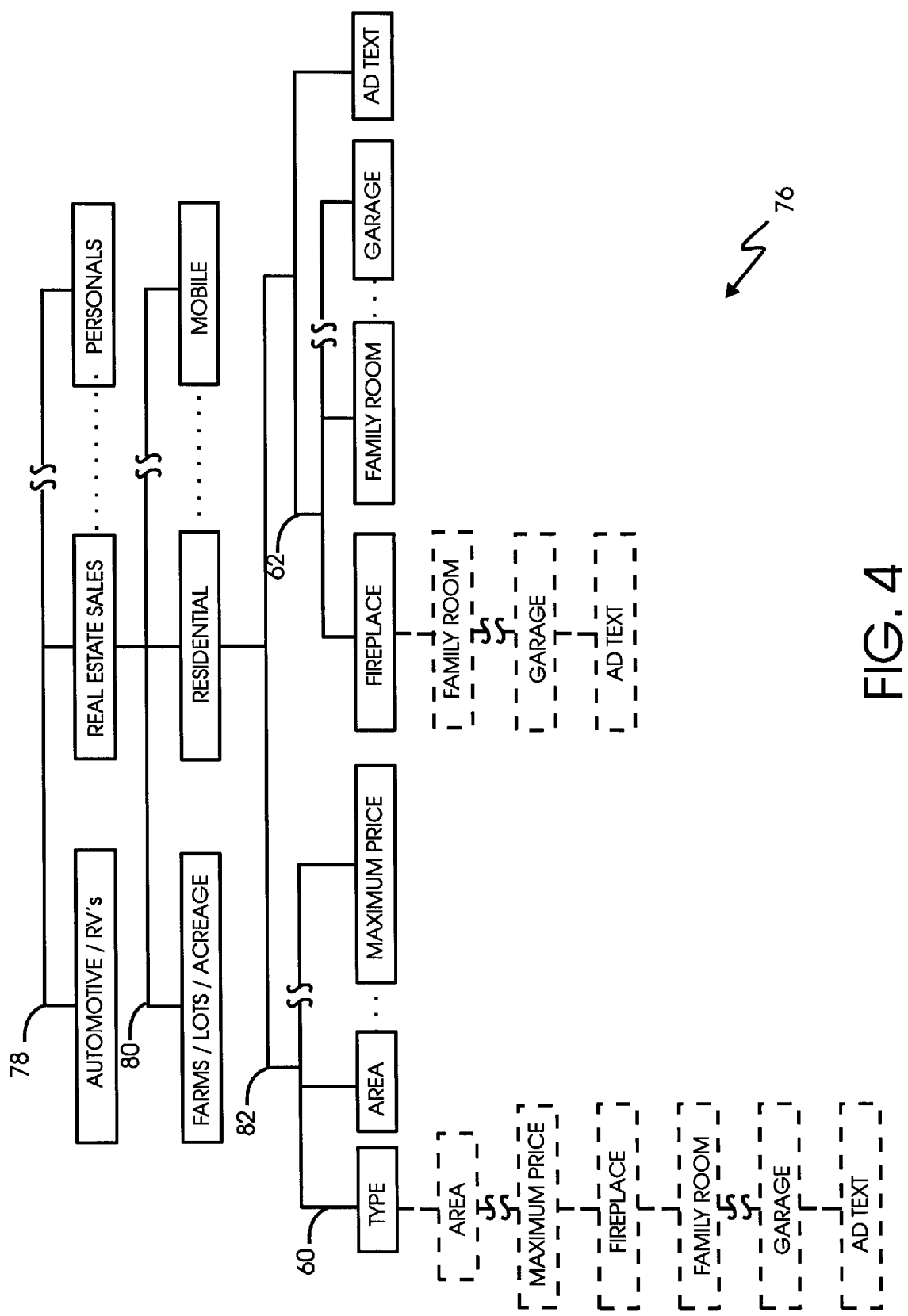
FIG. 4 is a schematic diagram of the record classification organization for the classified ad system in accordance with this invention.

Continuing, to further facilitate the simplicity and speed of the noted two-phase search strategy, and the implementation of the ad database structure, the ad subject matter has been specially organized. As shown in FIG. 4, the subject matter of the ad database has been organized in a compound hierarchical-relational fashion. Specifically, the database record organization 76 features a first level 78 and second level 80 of hierarchical subject matter based on the ad categories and subcategories, followed by a level 82 of quasi-relational organization based on primary selection parameters 60, and secondary selectional parameters 62.

As shown in FIG. 4, first level 78 of subject matter organization for the ad records concerns the ad categories and enables a straight forward entry into the stored records. In accordance with the invention, in order to retain the look and feel of a conventional newspaper print classified ad section, the subject matter categories are selected to be comparable to those commonly appearing in newspapers; for example, "real estate sales", "personals", "automotive" (cars, trucks etc.). While for the sake of simplicity only a few of the commonly encountered categories for classified ads have been shown in FIG. 4, as will be appreciated by those skilled in the art, a more complete set would be used in the implemented system.

Continuing, the second level of subject matter organization 80 concerns the subcategories for the respective ad categories of level 78. Here again, the subcategories are selected to be consistent with those well understood by the public and commonly encountered in conventional classifieds ads and with the categories noted at level 78, and, for example, as shown in the case of the real estate sales category, would preferably include subcategories such as: "residential"; "farms/lots/acreage"; "mobile"; etc. As would be appreciated, a group of suitable subcategories would likewise be provided for each of the other categories of level 78.

Since as noted above and as illustrated in FIG. 3, the category identification and subcategory identifications 48, 50, respectively, are numerically coded, it is possible, in accordance with the invention, to adjust the descriptions of the categories and subcategories presented to suit the tastes both of the newspaper and/or users of the system. Additionally, where multiple newspapers are provided in the system, use of numeral coding permits different category and subcategory descriptions to be employed for each of the respective newspaper databases without requiring significant change to the database structure. As will be appreciated, the respective newspapers may want to use category and subcategory descriptions of their own choosing to accommodate regional requirements or preferences. In such case, all that is needed are suitable lookup tables to relate the various descriptions presented in the search menus with the numerical coding used by the respective databases. Moreover, and as will be described hereafter, system 10 includes an automated ad generator for each newspaper, the respective ad generators having a parser which analyses the particular ad text supplied by the newspaper and automatically converts it into database records having a set of standard record variables and descriptions, the variables and descriptions for each newspaper being derived from a base set of variables for the system. Accordingly, not only is the system able to afford flexibility in the setup of the record organization for each newspaper, but also, once the respective newspaper standard set of variables is established, the system facilitates uniformity among ad records generated for common subject matter.

It is also to be noted that in the preferred form of the invention, subcategory level 80 shown in FIG. 4 may contain items which, while related to the noted category from which it depends, need not provide a further specification of the subject matter to be searched. Particularly, the subcategory may also provide associated items within the specific category; as for example, vehicle insurance within the vehicle category, or docking facilities within the marine category; or training services within the employment category and so on.

Following subcategory level 80, in accordance with the invention, the data structure provides for multiple, relational organization of the ad records. Specifically, beneath hierarchical level 80 the system provides for organization of the ad records in accord with the primary selection parameters 60, and secondary selection parameters 62 at level 82. As described, once the user designates the desired category and subcategory, ad records may be accessed by specifying a desired combination of primary and secondary selection parameters. Moreover, in a first preferred form and as shown, the combination of parameters may be conjunctive or alternative; that is, the parameters may be "anded" (dashed lined) or "ored" (solid lined). For example, when a record is to be selected, the user may specify one or more primary selection parameters and one or more secondary parameters. Further, the user may specify whether the selected parameters are all required to be present in the record; i.e., "anded", for the record to be selected, or whether it would be sufficient if any of the parameters were present in the record; i.e., "ored", in order for it to be to selected. It is to be noted that the system prevents "anding" of impossible conditions as might arise in the case of dependent (high-level, low-level) primary selection parameters of county and town in the category of "real estate sales" and make and model in the "automotive" category.

Accordingly, in the case of a residential real estate search, a user, with the aid of primary and secondary selection parameters can look for a very specific house; e.g., particular location, minimum number of bedrooms, price, and features like fireplace; family room; eat-in kitchen; etc., and as well add some keywords such as "mint" to further specify the "dream" house he is looking for. Or, in the alternative, the user can request to see a group of houses of different character, but, all sharing a common characteristic; e.g., located in a certain town, or on a cul-de-sac, or having a specific price, or some specific keyword word like "sacrifice."

However, while the ability to freely adjust the search by "anding" or "oring" selection parameters may be desirable, certain problems may arise. For example, in the case where each of both the primary and secondary parameters are allowed to be freely "ored", the likely result would be that too many records would be returned, thus defeating the effect of the search limiters and overburdening the user. Indeed, if all the primary selection parameters and secondary selection parameters were selected and "ored", the search would degrade to substantially a simple listing of available ads in the subcategory. Accordingly, in a second preferred form of the invention, selection rules are imposed on the search that restrict the users ability to freely designate "anding" and "oring" of selection parameters. Specifically, in the second preferred form of the invention, only the secondary selection parameters may be freely either "anded" or "ored", the primary selection parameters being required to be only "anded" unless specific primary selection parameter patterns are entered. Particularly, primary selection parameters are permitted only to be "anded" unless the user enters multiple selections for certain primary selection parameters. For example, in the case of real estate sales, primary selection parameters concerning locale such as the town the property is located in may provide user 1 with several choices, any or all of which he is invited to select.

Accordingly, in the case where the user designates multiple towns in a real estate sale search, the request is interpreted as requiring that the town designations be "ored" with the "anded" combination of the other primary selection parameters designated by the user. Additionally, as previously noted, the "anded" combination of logically impossible conditions is resolved for user 1 as happens when dependent sets of parameter designations are presented. While the rule states that designations of between different selection parameters are to be "anded", dependent selection parameters have a special relationship. Specifically, in the case where user 1 has designated at least one of each dependent parameter and the "anded" combination of "high-level" and "low-level" values are logically impossible, the results is to "or" the designations not "and" them.

However, and as noted, in the second preferred form, though combination of the primary selection parameter are restricted, the user would still be able to freely combine the secondary selection parameters by either "anding" or "oring" the parameters designated. An example would be as follows. User 1 designates two high-level areas, e.g., Essex County and Sussex County. By definition, these designations would be "ored" since they are both designations from the same selection parameter list. At the next level, the user 1 designates a specific town; e.g., Watertown, for example from the Sussex County town list. Two modifications are made at the this level. First, the designation of Sussex County (a "high-level" parameter) is implied by designation of the town Watertown since it belongs to the list of towns associated with Sussex County. User 1's choice of Watertown represents a further narrowing of the ad database subset that would otherwise be indicated if a designation of town was not made and only the high-level parameter Sussex County were designated. For this reason, the designation of Sussex County does not need to be explicitly posted in the request message. Additionally, the "low-level" designation of Watertown cannot be "anded" with the "High-level" designation of Essex since this combination of designations can never be matched, it being a physical impossibility. In fact, the designation of Watertown is "ored" with the designation of Essex County. So the ad search will look for all ads which match either "Essex County " or" the town of Watertown in Sussex County.

As will be appreciated, while for the current example, real estate sales has been used to illustrate the invention's capabilities, the same flexibility and restrictions in searching would also apply to other subject matter categories for the noted two forms of the invention.

Continuing, as will also be appreciated, in establishing the selection parameters, descriptions for them are selected which the public commonly associates with the items appearing in the respective categories and subcategories in order to facilitate ease of understanding. By way of illustration, and again for the sake of brevity, only a few of the primary selection parameters for the "real estate sales" category and "residential" subcategory in preferred form are shown, specifically: Area; Type; Maximum Price; etc. And, yet further, by way of illustration, the yes-no secondary selection parameters for residential real estate sales in preferred form might include such items as: Fireplace; Family Room; Garage; etc.

User Search Process

Figure 5A:
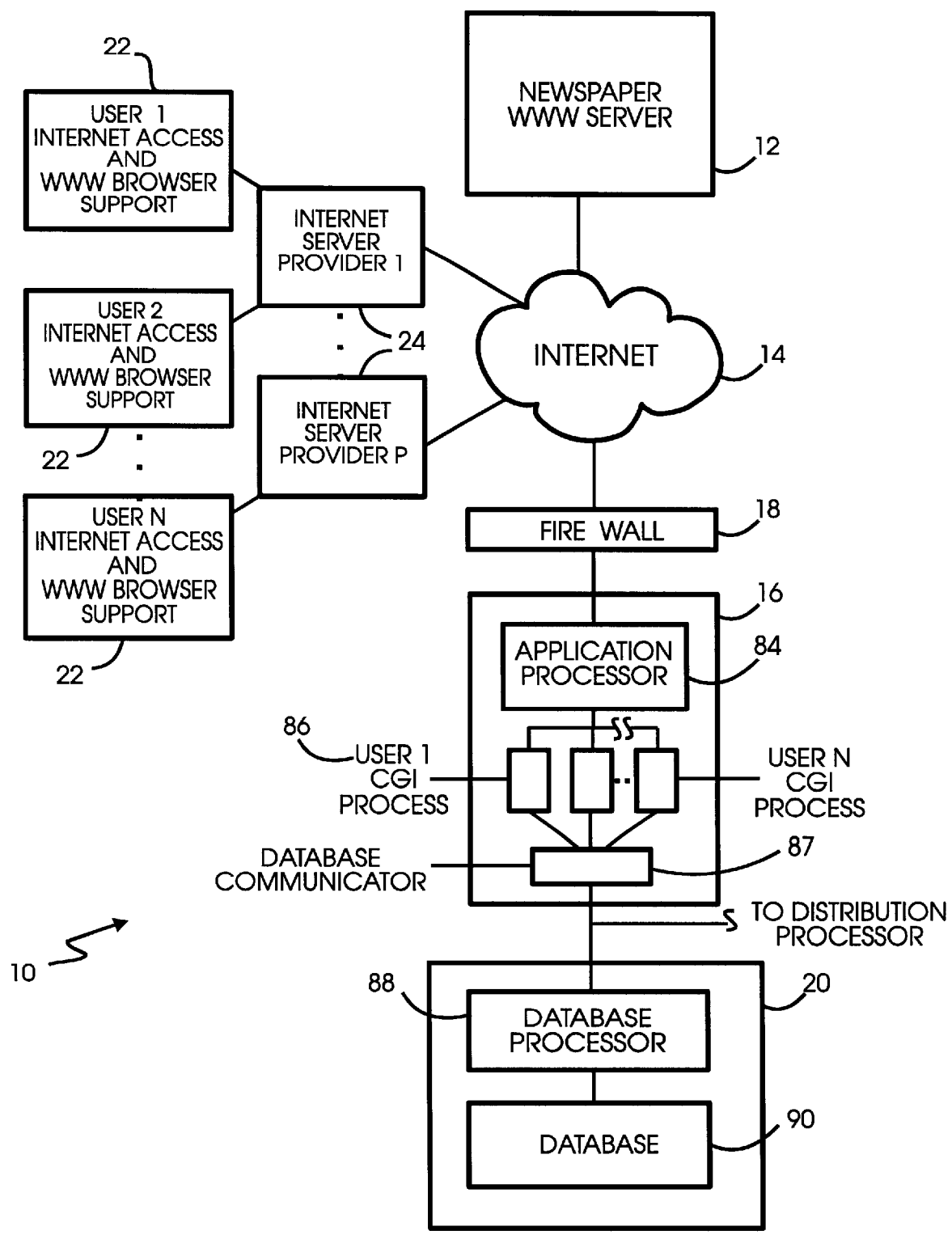
FIG. 5a is a schematic diagram of the system elements associated with a user's search for ad records of the classified ad system in accordance with this invention.
Figure 6:
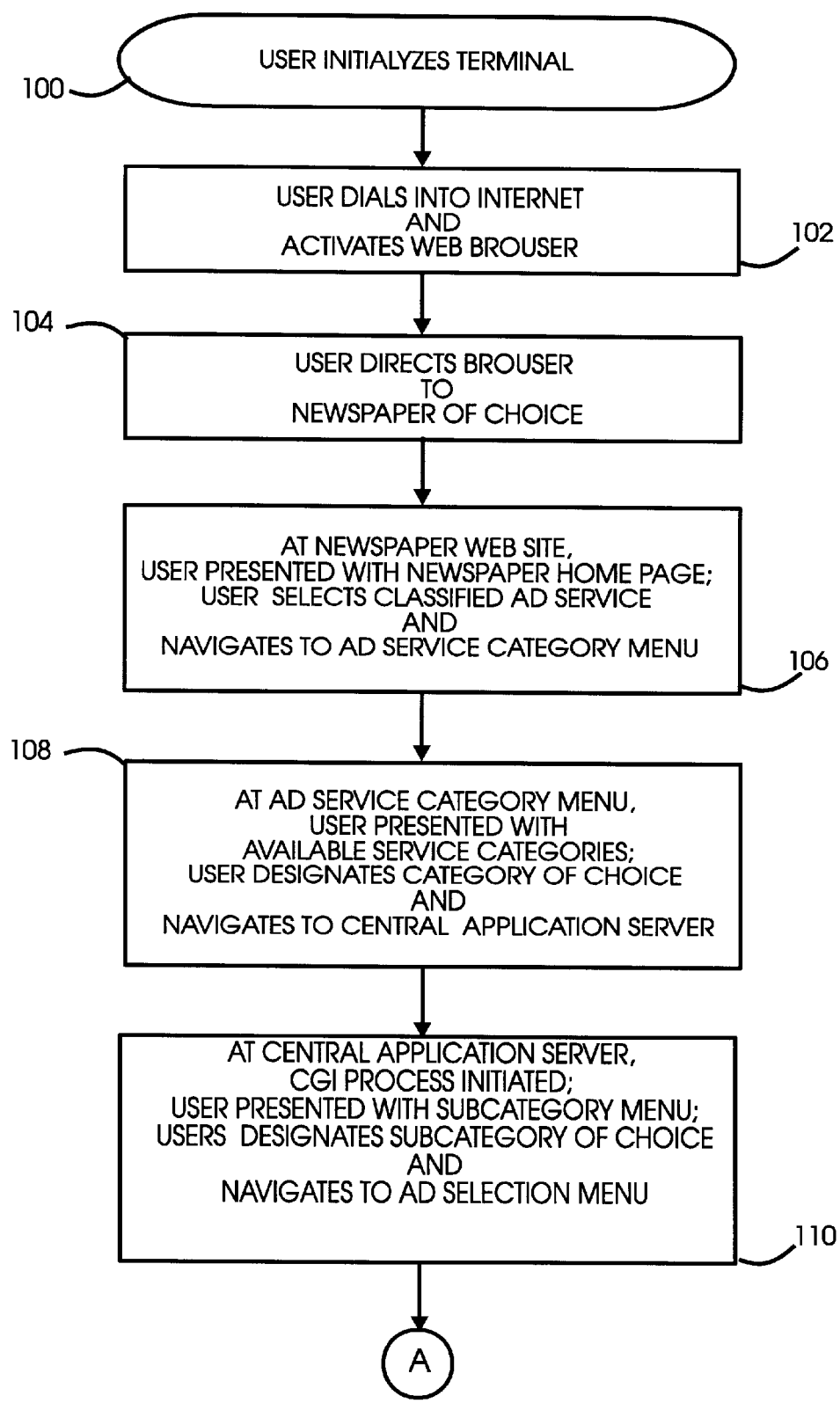
FIG. 6 is a generalized flow diagram of the steps associated with a user's entry into the system and the pre-selection sequence of the ad search process for the classified ad system in accordance with this invention.
Figure 7:
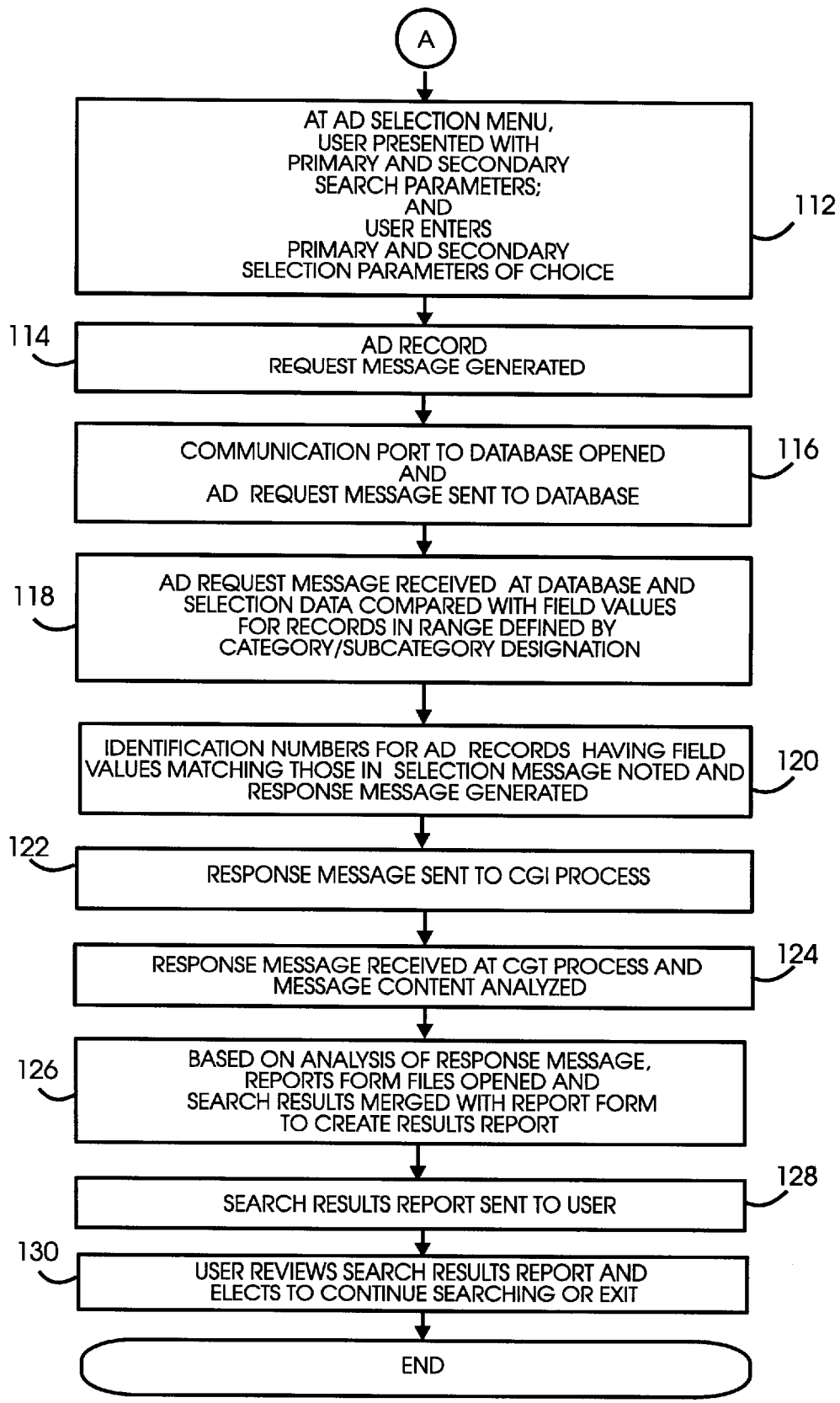
FIG. 7 is a generalized flow diagram of the steps associated with the record selection Messaging and reporting steps of the ad search process for the classified ad system in accordance with this invention.

In accordance with the invention, when a user elects to search for classified ads, his initial steps include activation of his terminal equipment and the establishment of a communication session with the sponsoring newspaper at its Internet Web site. FIG. 5a, illustrates the system elements associated with that process in schematic, block-diagram form. Further, in accordance with the invention and as noted above, to accelerate and simplify ad searching, the process is divided into two principal parts: a first, system entry and pre-selection designation phase; and a second, record-selection phase. FIG. 6 presents the system entry and pre-selection phase of the search process, and depicts it in a generalized, flow-diagram; while FIG. 7 presents the record-selection phase of the search process, again in generalized, flow-diagram form.

More specifically, and with reference to FIGS. 5a and 6, upon deciding to review classified ads for the purpose of either buying items offered for sale or answering the want ads of others, user 1 must first initialize his terminal 22 and establish an "on-line" session with Internet 14. In accordance with the invention, terminal 22 is typically a personal computer equipped with suitable application software for communicating with Internet 14, and supporting World Wide Web interaction.

While software products are available today which enable direct communication with the Internet, in order for such software to operate as intended, the user must maintain direct Internet access. However, direct Internet access typically costs on the order of several hundred dollars a month, and accordingly, is too expensive for most members of the general public to afford. As an alternative, the user can subscribe to one of a number of Internet service providers such as Pipeline, Microsoft Network, or proprietary services such as Prodigy, CompuServe and others who, typically, for a far lower price of approximately $10 to $20 a month, can provide access to the Internet and a number of Internet services there available such as: e-mail; the World Wide Web; FTP/IP; and others.

To establish access to the Internet, service providers commonly maintain a computer configured as an Internet server connected on one side directly to Internet 14, and on the other to a call receiver having multiple, modem-equipped lines connected to the dial-up telephone network. In this arrangement, a user having a personal computer that includes a modem and is capable of supporting communication software typically supplied by the service provider, can use his terminal to call into the provider over the ordinary telephone lines, and, if he has a suitable account number, establish an Internet connection. For the current discussion, user 1 will be assumed to maintain access to Internet 14 through such a service provider. As shown in FIG. 5a, the service providers are generally referenced by numeral 24 and individually noted by index 1 through P. Particularly, and as shown, user 1 will be assumed to have entrance to Internet 14 through indexed provider 1.

Accordingly, and as shown in FIG. 6 at step 100, upon electing to search for classified ads, user 1 activates his personal computer and launches the service provider's application software, thereby initializing his terminal 22 in anticipation of establishing communication with provider 1. As shown at step 102 of FIG. 6, once terminal 22 is initialized, user 1 can open communication with service provider 1 and established contact with Internet 14. This is simply done by causing the provider's application software at terminal 22 to place a modem-based, data communication telephone call to the provider's server and begin an on-line session. However, once connection is made, one further step remains before user 1 can begin to look for ads.

In accordance with the present invention, the classified ad system in preferred form is implemented on the World Wide Web of the Internet to realize the depth of presentation and breath of audience the Web provides. Accordingly, user 1 must also have the ability to display documents and files prepared with the hypertext markup language (HTML) and present graphics commonly associated with Web applications; e.g., GIF, etc. Additionally, user 1 must also be able to navigate the hypertext links that define the Web and its dynamic character. To do this, user 1 must have Web Browser software at his terminal 22. Browser applications suitable for providing such support as noted above include; for example, Navigator® available from Netscape Communications, Inc. Moasic® from Spyglass, Inc., as well as the browsers respectively provided by certain of the propriety, commercial services such as Prodigy, and others.

Once terminal 22 is properly setup; i.e., initialized, connected to the Internet, and running a Web browser, user 1 is ready to begin. As shown in FIG. 6, following setup, User 1's next step, denoted 104, is to "point" his Web browser to the newspaper Web site he wishes to view classified ads at. User 1 accomplishes this by designating the newspaper Web site with a universal resource locator (URL); for example, http://www.newspaper1.com/, or by performing an equivalent operation such as activating a "bookmark" he has setup in his browser, the bookmark being a process for automatically designating a URL from a list previously prepared and stored in the browser application. Thereafter, user 1 is "transported" in conventional Internet fashion well known in the art to newspaper 1's Web site. As will be appreciated, though the metaphor of being "transported" or "navigated" to different places on the Web is commonly employed in describing Internet processes, in reality, there is no actual transport of the user anywhere. Rather, through a series of message exchanges, a communication session is established between user 1's terminal 22 and newspaper 1's server 12, or whatever other navigation "destination" one happens to be referring to. Based on the establishment of that communication session, information from the "destination" can be presented to the user at his terminal, with the result that a "virtual" "transportation" or "navigation" is effected. For the sake of simplicity and convention, however, where reference is made to Internet activity, the "transportation", "navigation", "arrival at," etc., metaphors will be retained and understood as referring to the establishment of the noted communication sessions.

With reference to FIG. 5a, in accordance with the preferred form of the invention, though system 10 maintains a central classified ad application server 16 for supplying classified ads to the public, access to server 16 is through server 12 of the specific newspaper sponsoring the service; e.g., newspaper 1. As will be appreciated, though FIG. 5a for the sake of simplicity shows the case of a single newspaper 1, and a single application server 16, as illustrated in FIG. 1, in accordance with the preferred form of the invention, system 10 contemplates maintenance of a number of newspaper classified ad systems supported with a number of redundant application servers 16 and database servers 20 as a commercial offering to the respective sponsoring newspapers 1 to M, . This enables newspapers 1 to M to derive revenue and goodwill from the classified ad service, without the need for individually assuming the burden and cost of setting up and maintaining an application Web server 16, its respective database server 20 and the respective ad generation subsystems; i.e., generator 26, collection server 36 and distribution processor 40. However, as will also be appreciated, in the event a newspaper would prefer to maintain its own system, it could readily do so; as for example, by simply assuming responsibility for the system illustrated in FIG. 5a, or, by integrating application server 16, its database and the ad generation and distribution subsystems with its server 12 in a fashion well known in the art.

Continuing, and with reference to FIG. 6, at step 106, on "arrival" at newspaper 1's Web server 12, user 1 is presented with newspaper 1's "home page", i.e., a screen presented at user 1's terminal 22, that is designed to introduce the newspaper to the user, explain the newspaper's features and services, and provide a means for user 1 to access the listed features and services. Particularly, as known in the art, Web sites and associated pages are prepared with HTML and include "links" to other locations and resources on the Web, the links being the features which enables a user, as noted, to "navigate" from one point or information resource to another, thereby, providing the Web with its dynamic character. In fact, and again as is well known in the art, the links are actually established addressing and communications procedures which enable a user to maintain his present communication path information and establish a new communication path with another Web site or information resource.

In accordance with the invention, among the features listed at newspaper 1's home page is the classified ad system. Also in accordance with the invention, the classified ad feature listing at newspaper 1's home page is set up with a hypertext link to the first page of the classified ad service.

As outlined above, the ad search procedure in accordance with the invention comprises a two-part process; specifically, an entry and pre-selection, subject-matter designation sequence, followed by a record selection sequence. In both the pre-selection designation and the record selection sequences, the user is presented with a series of interactive menus at which he is furnished with selection options, and prompted for responses, each menu selection option having an Internet "link" to another menu or information resources associated with it. Specifically, in accord with step 106 shown in FIG. 6, upon selecting the classified ad service at newspaper 1's home page, user 1 is "transported" to the first menu of the search pre-selection sequence, which in preferred form is maintained at newspaper server 1 and concerns the subject matter categories for the service.

Figure 8:
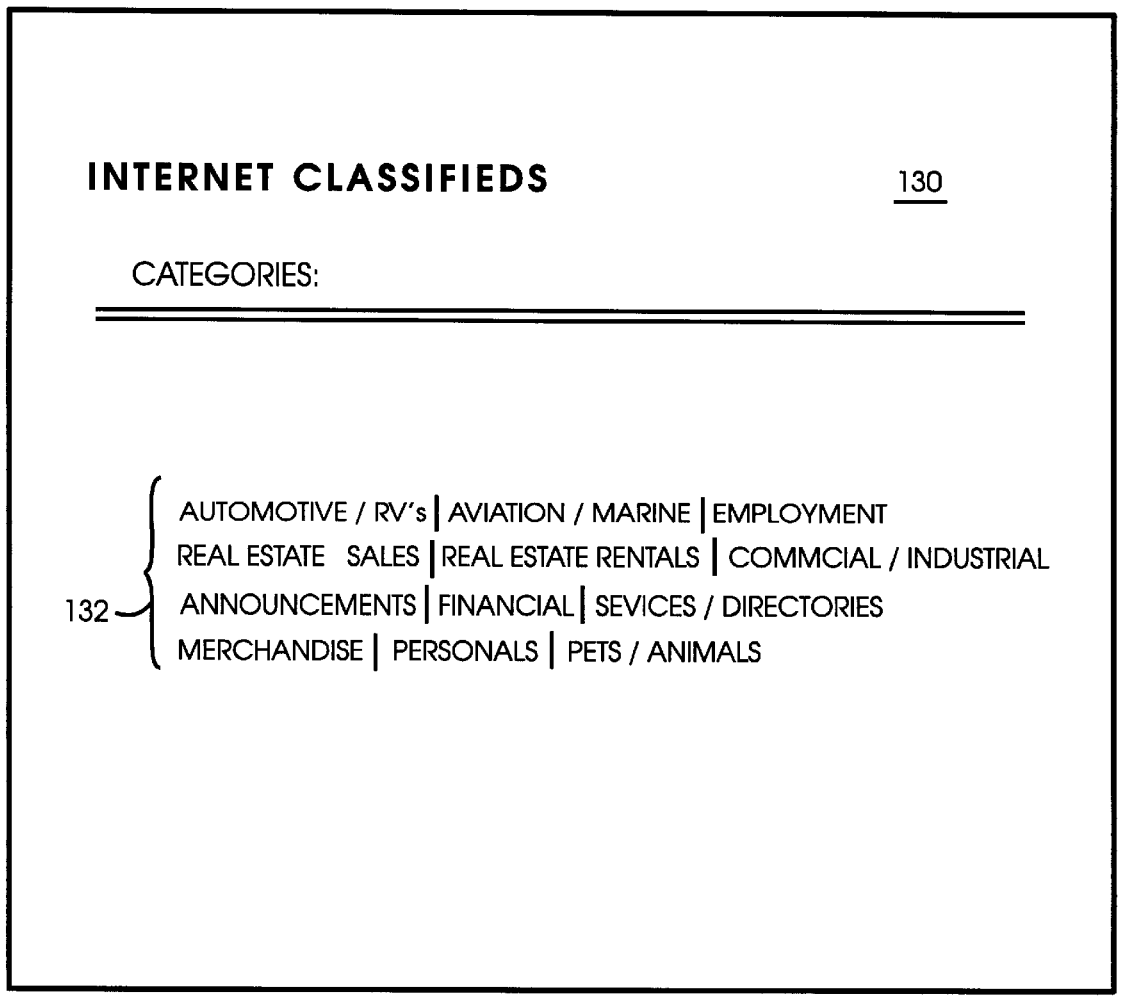
FIG. 8 is a schematic diagram illustrating the search process category designation menu for the classified ad system in accordance with this invention.

With reference to FIG. 8, on "arrival" at the classified ad service initial menu 130, and in accord with step 108 of FIG. 6, user 1 is presented with a listing 132 of the ad subject matter contained in the system, organized by category, and asked to specify the category he would like to review. As shown, in preferred form, the service subject matter categories include:

Automotive/RV's;
Aviation/Marine;
Employment;
Real Estate Sales;
Real Estate Rentals;
Commercial/Industrial;
Announcements;
Financial;
Services/Directories;
Merchandise;
Personals; and
Pets/Animals.

As is apparent, the categories presented are general in character and typical of those commonly found in print classified ads, and, indeed, may be designed to follow closely the categories used by the newspaper in its print classifieds in order to provide familiarity to users and ease of creation, the ads, as noted being prepared from origination procedures common to both the print and on-line process.

In accordance with the invention, and as noted, each of the classified ad category options is again setup with a hypertext link, and upon selecting a category of choice, user 1 is "navigated" further into the system and the pre-selection designation phase of the search process. Specifically, on selecting a subject matter category, the user is brought to the system subcategory menu 134 shown in FIG. 9. As seen in FIG. 9, at subcategory menu 134, user 1 is shown the set of subcategories 136 associated with his menu choice, and additionally, advised of the number of ads for the respective subcategories at postings 138. Accordingly, at a glance, user 1 can get a sense of whether subcategories 136 will provide the kind of items he is looking for, and, based on the number of ads associated with each, the amount of time and effort that may be required to further investigate them. By way of illustration, in the case where user 1 first selects the "real estate sales" category, the associated subcategories in preferred form as shown include:

Residential;
Farms/Lots/Acreage;
Mobile;
Vacation/Time Shares;
Waterfront Property;
Out of Town;
Real Estate Services; and
Wanted.

In accordance with the invention, and as is apparent from a review of the illustration, subcategories 136 are, again, general in character and comparable to those commonly found in print classifieds. As would be appreciated, a group of suitable subcategories would likewise be provided for each of the other categories presented in category menu 130. Further, it should be noted that at subcategory menu 134, in addition to subcategory list 136, user 1 is again presented with listing 132 of service categories and links to permit user 1 to jump to another category and associated list of subcategories in the event the first selected category and list of subcategories is uninteresting, or to permit user 1 to recover from an inadvertent category selection. In connection with user 1's designation of the subject matter category, and the subsequent presentation of the subcategory listing, system 10 undertakes a number of unique process steps which simplify and accelerate the search process. In accord with the invention upon user 1 entering his choice of category, the link associated with that choice additionally initiates a "transfer" of user 1 from newspaper server 12 to central application server 16 and its server processor 84 shown in FIG. 5a. As noted, "transfer" of user 1 to application server 16, in fact, constitutes the establishment of a communication link between user 1's terminal 22 and application server 16. As part of that process, user 1's path information, i.e., his Internet address, is supplied to server 16, so that server 16 can, supply information directly to user 1. Still further and in accordance with the invention as noted at step 110 of FIG. 6, upon "arrival" of user 1 at server 16, server 16 initiates a common gateway interface (CGI) process 86 noted in FIG. 5a by which user 1's "presence" at application server 16 is managed.

While in the past, designers of database applications have employed conventional search procedures based on; for example, standard query language (SQL), to facilitate retrieval of database records, those procedures, regrettably, require substantial amounts of CPU, RAM, and disk resources, as well as time to implement and execute. Additionally, SQL requirements become yet more burdensome as substantial numbers of concurrent users, as contemplated by present system 10, are sought to be served. In accordance with the present invention, therefore, to avoid the complexity, costs and limitations associated with conventional search techniques such as SQL, system 10 relies upon a simplified messaging process to retrieve ad records from database server 20.

Particularly, and with reference to FIG. 5*a*, in accordance with the present invention, application server 16 establishes a client-server relation with user 1's terminal 22, and, as noted, initiates a CGI process 86 at server 16 for the purpose of managing a gatewayed relation between user 1's terminal 22 and database server 20. Further as part of the gatewayed relation between user 1's terminal 22 and database server 20, CGI process 86 is designed to generate and manage ad record request messages, which, upon formulation based on user 1s responds to search menus, are forwarded to database processor 88, through database communicator 87 to effect retrieval of ad record information from database 90. Accordingly, database 90 does not require the overhead of joins, reordering and multiple indexes associated with conventional databases. As will be appreciated, while for the purpose of illustration, system 10 has been shown in FIG. 5*a* in simplified form to include a single web server 16, as noted in connection with the description of the multi-newspaper form of the invention shown in FIG. 1, system 10 could have multiple, redundant application servers 16 to provide improved reliability and facilitate user load balancing.

Additionally, and again for the sake of clarity of illustration, while system 10 has been shown in FIG. 5*a* in simplified form to have a single database 20, as noted in connection with the description of the multi-newspaper form of the invention shown in FIG. 1, system 10 could include multiple, redundant database servers, each having databases for the respective newspapers 1 to M to provide improved reliability and user load balancing. In the case of the multi-newspaper form of the invention, a separate instance of database communicator 87 would be provided to handle CGI processes of users accessing specific newspaper databases.

Continuing with reference to FIG. 5*a*, once database processor 88 determines what the reply to the request message should be, processor 88 generates a response message which is sent back to CGI process 86 through database communicator 87. Thereafter, CGI process 86 can prepare and forward a corresponding report to user 1's terminal 22 through application processor 84. Accordingly, in this arrangement, GCI process 86 acts as a request message generator and database processor 88 acts as a response message generator, which in cooperation, facilitate the submission of ad searches from user 1, and the return of search results reports back to user 1. Further, in accordance with the invention, system undertakes this same general sequence of: request message generation at CGI process 86; message forwarding to the database server 20 through communicator 87; search execution at the database processor 88; generation of a response message at database processor 88; return of the response message to CGI process 86 through communicator 87; and generation of a results report at CGI process 86 for forwarding to the user, for all parts of the search process; i.e., for both the pre-selection, category/subcategory designation sequence, and the record selection sequence. As will be appreciated by those skilled in the art, the present invention, thus, replaces the much more complicated SQL-based, record-searching process that require such database features such as joins, reordering and multiple indexes with a simplified, gatewayed, client-server messaging process. And, as will be further appreciated, because of the ease of machine execution for the simplified client-server, messaging approach taught by the present invention, system 10 is able to handle the search requirements of the multiple, concurrent users with less computing resources than would otherwise be possible with an SQL-based process.

Figure 5B:
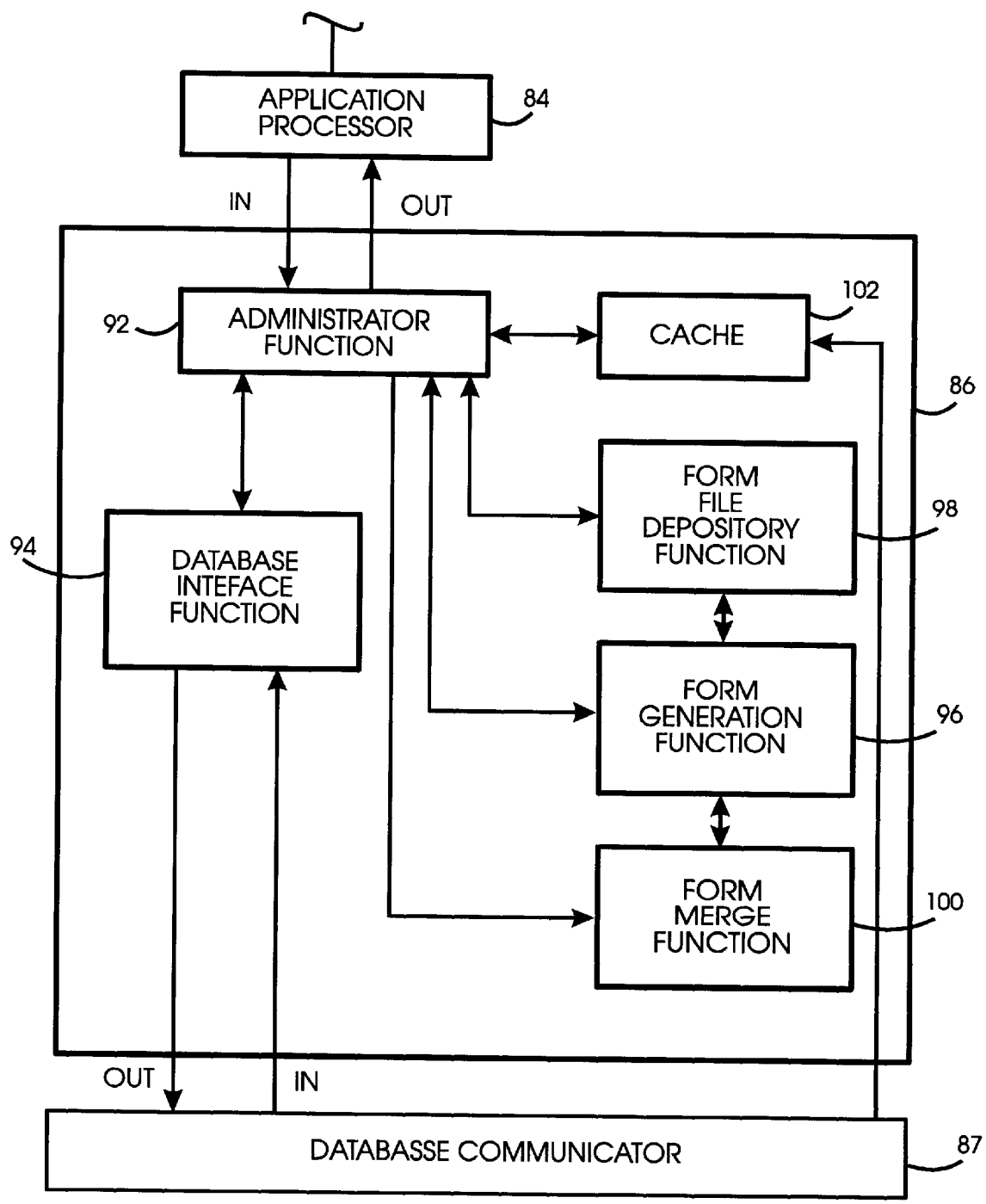
FIG. 5b is a schematic diagram of the CGI process functional elements employed in connection with a user's search for ad records of the classified ad system in accordance with this invention.

More specifically, and in accordance with the invention, the functional elements of CGI process 86 are schematically represented in block form in FIG. 5*b*. As seen there, CGI process 86 includes an administrator function 92, for overseeing control of the process, and movement of data into, through and out of it. Additionally, process 86 includes a database interface function 94 for generating the request message responsive to the ad selection entered by user 1, and for forwarding the request message to database communicator 87. Still further, database interface function 94 is configured for receiving the return of ad selection information from database server 20 through communicator 87 as shown. Continuing, CGI process 86 is yet additionally seen to include a form generator function 96 for generating a report form for conveying results of the request to user 1. As well, CGI process 86 is also seen to include a form files depository function 98 for supplying report forms to generator function 96, and a form merge function 100 for merging the ad information returned from database server 20 at form generator 96 with a designated form depository 98. Finally, CGI process is seen in preferred form to also have a cache function 102 for holding certain database information such as subcategory listings which remain stable between database updates to avoid the need to search the ad database each time a subcategory report is to be presented.

In operation, CGI process 86 receives information concerning user 1; as for example, identification, path and ad selection information in conventional fashion from application processor 84 at the CGI process standard input. Thereafter, administrator function 92 causes database interface function 94 to generate an ad search request message having a form to be more fully described hereafter, and to present the message to database communicator 87. As will be appreciated by those skilled in the art, communication process 87 is conventional in nature and functions as a data pipe for funneling requests messages for all the CGI processes of application server 16 to the respective database server with which it is associated.

Following receipt of the request message at database server 20, database processor 88 performs a search of ad records included in database 90 based on the content of the request message submitted. Thereafter, database processor 88 generates a response message having a form to be described which includes the results of the search, and sends it back to CGI interface function 94 through communicator 87. On arrival of the response message, CGI administrator 90 buffers the response message and analyzes it to determine what report form should be used in presenting the search results to user 1. On ascertaining the report form to be used, administrator function 92 access the form file depository function 98 to determine if the required form file is available. If the form file is not available an error message is returned to user 1. However, in the case where the form is available, administrator function 92 activates form generator function 96, and generator function 96 obtains the required form from depository function 98. Thereafter, administrator function 92 calls form merge function 100 to undertake merge of the ad data contained in the response message with the required form file held at form generator function 96. Thereafter, as the report is created, by form generator function 96, it is shipped back from generator function 96 to the standard output of CGI process 86 and supplied to application processor 84 which, in turn sends it to user 1. Subsequently, upon completion of the report form, and its supply to application processor 84, CGI process, having performed its function of generating the request message and reporting back a results report, extinguishes.

As suggested above, in connection with the description of cache 102, in the case where the results report provided to user 1 is of a type likely to be recalled by other users or user 1 before the information in it is rendered stale by virtue of database 90 being updated; as for example, a subcategory listing generated in response to a category designation, the report, in addition to being supplied to user 1, is also stored in cache 102 for reuse as required.

As an illustration of the above-described process, upon "transfer" of user 1 to application server 16 following user 1's designation of the category of ads to be searched, application processor 84 receives user 1's path and designated category information; initiates a CGI process 86; and passes the path and category information to process 86. Processor 86, in turn, prepares to build the request message for a listing of the subcategories associated with the category user 1 has selected. However, before administrator function 92 initiates generation of the subcategory search message, it checks cache 102 to see if the required subcategory listing is available in the cache. If available, indicating no database update has occurred, since the report was first generated, the information is then, by definition current. If the report was not available, then a database update has occurred since the time the report was generated, and the report was automatically removed from cache 102 by the database communicator 87. In the case where the listing is present and current, i.e., no database update having occurred since the report in cache was prepared, CGI processor simply supplies the cached report to user 1 without undertaking a database search. As will be appreciated, this "shortcut" substantially reduces the time for response.

However, if the subcategory report is not available at cache 102, or if available, is stale, then CGI administrator 92 calls database interface function 94 to build a suitable subcategory request message for the category selected by user 1. Upon generation of the request message, interface 94 passes the message to communicator 87 for delivery to database server 20. In reply, database processor 88 determines the number of ad records for each subcategory of the designated category, and generates and returns a response message to CGI process 86. And, upon receiving the response message from database processor 88, CGI process 86 returns a report to user 1 in the form of subcategory menu 134 which lists the subcategories associated with user 1's category selection, along with a posting of the number of ads associated with each subcategory. Additionally, CGI process 86 additionally stores the report; i.e., menu 134, at cache 102. As will be recalled, designation of category/subcategory identification codes 46 noted in FIG. 3, enables system 10 and particularly database processor 88 at server 20 to access pre-selection designation tables 42 also provided at server 20 to determine the related record identification range 52 and the number of records in database 90 corresponding to subject matter subcategories associated with the category designated by user 1.

Once a subcategory menu; for example, 134 of FIG. 9, has been presented, the next step in the search process is for User 1 to enter his subcategory selection and navigate to the record selection menu of the search process shown in FIG. 10 as 140.

As pointed out in connection with description of the database structure set out above, upon designation of the ad category and subcategory, user 1 provides system 10 sufficient information to substantially narrow the database records so upon specification of ad selection parameters, ads of interest can be rapidly retrieved. Again with reference to FIG. 3, on designating the ad category and subcategory of interest, user 1 provides database processor 88 with identification codes 46 which permit pre-selection tables 42 to be entered and the range of relevant ad records 52 specified. Thereafter, it remains only for user 1 to specify primary selection parameters 60 and secondary selection parameters 62 in order for the specified parameters to be compared against the record values in the range noted and to identify the ads of interest. Accordingly at this point in the process, user 1 has completed the pre-selection phase of the search and is ready to enter the record selection phase.

To effect record selection, user 1, as noted at step 112 of FIG. 7, is presented with a selection parameter menu 140 illustrated in FIG. 10. In accordance with the preferred form of the invention, menu 140 is arranged to present primary and secondary selection parameters, referenced "Selection Features," likely to be of interest and familiar to buyers and sellers concerned with subject matter associated with the category and subcategory user 1 designated. For example, and as shown in FIG. 10, for the category of "Real Estate Sales" and the subcategory of "Residential," the primary selection parameters set referenced 142 includes:

Ad Date;

Type;

County (Area Level I);

Town (Area Level II);

Min price;

Max price;

Min beds; and

Min baths.

As described above, in accordance with the invention, the secondary selection parameters set, referenced 144, includes both a set of yes-no parameters 146 which additionally define the ad matter desired, and ad text which user 1 may enter at a write-in field 148 of the selection menu that can be searched against the actual ad text contained in the ad record to effect a keyword review of the ads. In preferred form, set 146 of yes-no parameters for residential real estate sales includes:

Fireplace;

Family Room;

Eat-In Kitchen;

Formal Dining Room;

Garage;

Cul-de-sac;

Pool;

Yard; and

By Owner.

From the listings, it is, again, apparent that both the primary and secondary parameters are representative of the selection characters commonly associated with the subject matter category and subcategory and commonly appearing in ads placed as found when the ad record information is automatically generated. In the residential real estate sales case illustrated, the primary selection parameters include:

the date the ad was first presented in the system (Ad Date) so the user can specify the currency of the ads to be reviewed; the type property (Type) to enable distinction between; for example, condo's, co-op's, houses; the location of the property in multiple levels to permit designation of; for example, a county of choice (Area Level I), and a town (Area Level II) within that county; and a series of parameters reflecting the character of the property (Min., Max. Price; Min. Beds, Min. Baths). Additionally, and as would be appreciated by those skilled in the art, though not shown in FIG. 10, primary selection parameters 142 might also include, such other and additional features as minimum units, relative to co-ops and condos; minimum acreage for the associated property lot size; capacity of garage, etc., or other parameters considered suitable for the relevant ad subject matter, and commonly found in ads placed by the public.

Like primary selection parameters 142, secondary selection parameters 144, and particularly yes-no parameter set 146, again reflect the commonly understood further details associated with the ad subject matter to be selected; for example, in the case of a residential property such features as: fireplace; family room; eat-in kitchen; formal dining room; garage; cul-de-sac pool; yard; by owner are included. As in the case of primary parameters 142, secondary, yes-no parameters set 146 may be adjusted as deemed appropriate to suit the subject matter involved.

For the keyword search portion of the secondary selection parameters, user 1, as noted, is provided a text entry field 148 as shown at which up to 99 characters may be entered to further describe the subject matter sought. As pointed out earlier, this enables user 1 to enter specialty terms such as "mint" or "sacrifice" to better identify the type ads being sought.

As also previously noted, in a first preferred form of the invention, once the selection parameters are entered, user 1 can elect to have the parameters considered either conjunctively or alternatively; that is, either "anded" or "ored" by entering an appropriate selection at field 150 or field 152, respectively of menu 140. However, as noted above, care must be exercised in "oring" parameters, since as selection parameter are "ored", the restrictive character of the search request is reduced, with the result that the number of ads returned is increased.

Accordingly, in a second preferred form of the invention, selection rules are imposed on the search that restrict the users ability to freely designate "anding" and "oring" of selection parameters. Specifically, in the second preferred form of the invention, fields 150 and 152 of menu 140 for respectively "anding" and "oring" selection parameters apply only to the secondary selection parameters 144, namely, yes-no parameters 146 and text field 148. As a result, only the secondary selection parameters may be freely either "anded" or "ored", the primary selection parameters being required to be only "anded" unless the user enters multiple designations for a specific primary selection parameter as previously noted. Particularly, primary selection parameters are permitted only to be "anded," unless the user enters multiple selections for certain primary selection parameters.

Accordingly, in the case where the user designates multiple towns in a real estate sale search, the request is interpreted as requiring that the town designations be "ored" with the "anded" combination of the other primary selection parameters designated by the user. However, and as noted, in the second preferred form, though combination of the primary selection parameter are restricted, the user would still be able to freely combine the secondary selection parameters by either "anding" or "oring" the parameters designated.

As will be appreciated, while for the current example residential real estate sales has been used to illustrate the invention's capabilities, the same freedom and limitation in entering the primary and secondary selection parameters would also apply to the other subject matter categories and subcategories.

Also in accordance with the preferred form of the invention, primary and secondary parameters 142, 144 respectively are positioned on the selection menu in the order of importance commonly ascribed by buyers and sellers. As shown selection menu 140 first provide for specification of property type, followed by location, price range and physical characteristics; e.g., bedrooms, baths, etc. As noted, to facilitate ease of entry and speed or processing, in accordance with the invention the selection parameters are maintained as numerical values. Accordingly, the selection menu includes write-in fields for the primary selection values which may be entered as numbers; for example, to accommodate price range, minimum, beds, baths, etc., and scroll boxes at which lists of the area alternative; for example, County, town can be selected, the selected areas being related to numerical codes which the system subsequently generates from translation tables. As would be appreciated, other comparable means such as simple lists having associated numerical identification codes or their equivalent could also be used.

Following primary parameters 142, selection menu 140 presents secondary parameters 144. Again, in the interest of enabling user 1 to quickly and easily enter information, yes-no parameters 144 are provided simply as a set of check-off boxes in which user 1 can enter his desires. And, in the case of the keyword search text, menu 140 provides for direct entry at write-in field 148.

As also seen in FIG. 10 selection menu 140 additionally includes a write in field 154 to permit user 1 to limit the number of ads he wishes to see in connection with a request, and an associated posting field 156 that displays the number of records for the subcategory. Still further, selection menu 140 yet additionally includes write-in fields 158, 160 to set the range of dates for ads to be viewed, the range being measures from the date of the search to a cut-off month and day of user 1 choosing entered at fields 156, 158, respectively.

At its end, selection menu 140 includes an execution button 162 denoted "SEARCH" to enable user 1 to enter his selection of parameters and begin the retrieval of ads. Additional, menu 140 at its end also includes a re-listing of the system categories and links 132 to enable user 1 to jump to another category of the system or to recover from an inadvertent subcategory selection. Yet additionally, menu 140 in preferred form also includes a link 166 to subcategory menu 130 to enable user 1 to navigate back to the subcategory listing to select a different area of investigation in the same subject matter category.

In accordance in with the invention and as a still further aspect of it, it is possible to adjust presentation of the user search menus to allow for special conditions that may arise in connection with particular subject matter categories. Specifically, in the case where certain selection parameters are of heightened interest; for example, the general location of real estate sought to be purchased; or the make of a car to be bought, another "pre-selection" menu can be presented to user 1 before the primary selection menu is presented and executed. As will be appreciated, since the selection parameters can be individually selected; for example, a search in which only one parameter is specified, and since the database searching in accordance with the invention can be quickly executed, it is possible to conduct a preliminary selection search on a single, predominant selection parameter to create a modified subset of the database, report the results, and thereafter, perform the full selection search on the subset defined. This "conditioning" searching can be readily accomplished by providing a further pre-selection menu following the category and subcategory designation menus. Insertion of the additional pre-selection menus enables the users to simply designate the predominant parameter; as for example, location in the case of real estate; i.e., county, and to have the system preform a search in conventional fashion for the purpose of narrowing the number of records which would, thereafter, be fully searched with the user's subsequent designation of the remaining selection parameters at selection menu 140. While this procedure, in effect, requires two selection searches to be undertaken, one for the predominant parameter and another for the remainder of the selection parameters, the speed with which searches can be done, and the narrowing of the database records to be subsequently searched, compensates for the additional step. As also noted, this approach of "conditioning" the database with additional preliminary selection searches can be readily repeated, via links from menu 140 and the results report, provided reduction in overall search time justifies inclusion of the additional preliminary selection steps, and indeed, may be advantageous in those cases where the database record are markedly skewed to one for more selection parameters. As will be appreciated, in accordance with the invention, inclusion of specialty menus in the search sequence can be readily accommodated without major modification to the either the database structure or the database record organization. This can be effected by simply including additional menu templates at application CGI process 86, and having the record request message require the special menus be called following a particular query. For example, in the category "real estate sales" subcategory "residential," upon submission of a request for the "residential," subcategory, the response message provided by database server 20 would call for a specialty menu concerning "area" to be presented with the results of residential subcategory query.

Continuing, as noted, above, following the forwarding of the search results report to user 1, the CGI process extinguishes, and, because it is not possible in commonly available Internet system to retain identification of the user between sessions, it is not possible to conveniently maintain a record of user 1's search experience which could be used for continuation of his search. In accordance with the present invention however, in a first form, this problem is overcome by sending the search report to the user as an HTML document that includes sufficient information to permit the user to continue his search. Specifically, at each stage of the search, for example, category, subcategory, selection parameters, the results report is a selection menu for the next stage of the search, and carries with it what the user typically needs to continue the search process. For example, and as noted, the results report sent to user 1 in reply to his designation of category is the subcategory selection menu 134, and the results report sent to user 1 in reply to the designation of the subcategory is the parameter selection menu 140. As a result, at each stage of the search, user 1 is provided the information in the HTML results report sent to him to permit his continuation to the next stage of the search. However, while a certain amount of history information can be provided in the results report for subsequent use, the HTML document is limited and typically alone is not sufficient to retain user identification across sessions. Accordingly, in a second preferred form, the system issues a unique identification number for the user upon his entry to application server 16, and establishes a suitable memory space to maintain a history of user 1's search experience. Further, user 1's memory identification number and memory space with its history is retained for a predetermined period; as for example, up to an hour after termination of the CGI process, within which the user can return to the system and pick up where he left off.

In accordance with the invention once user 1 has completed entering the selection parameters, search execution button 162 is activated, and user 1's specification of primary and secondary selection parameters is passed to CGI process 86. As noted in FIG. 7, following entry of the selection parameters at step 112, database interface function 94 of CGI process 86 at step 114 builds the ad record request message to be sent communicator 87 and database server 20 for retrieval of the desired records.

Figure 11:
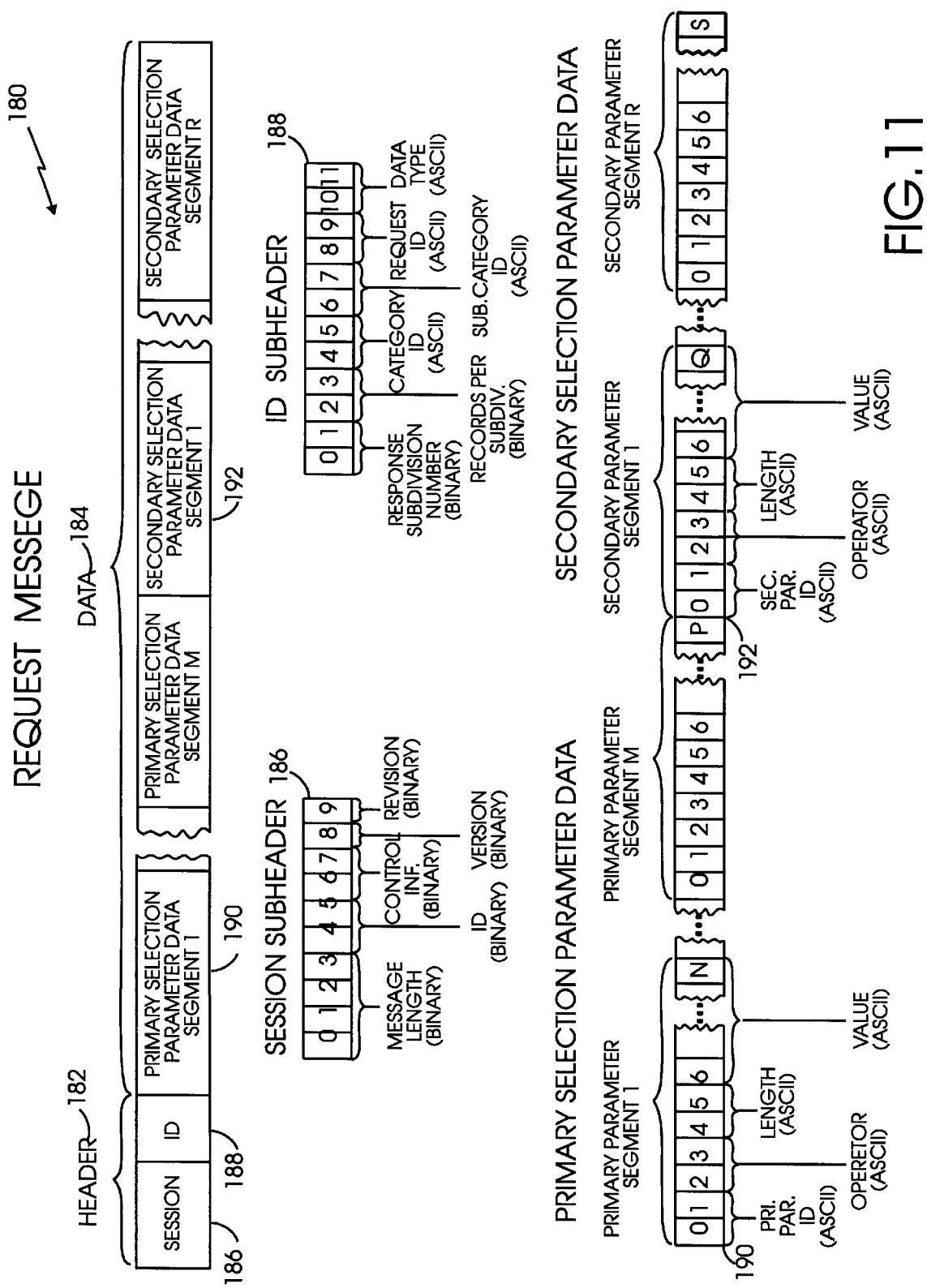
FIG. 11 is a schematic diagram of the structure for the request message generated in connection with the record selection query of the ad search process for the classified ad system in accordance with this invention.

The general form of the request message 180 is schematically illustrated in FIG. 11. As shown there, request message 180 features a header 182, followed by data train 184. In accordance with the invention, header 182 is designed to provide both processing and content information regarding user 1's request for ads. To facilitate this, header 182 is provided with two principal parts, a session subheader 186 to identify and describe the message relative to the system search process, and a message identification subheader 188 to give information about the content of the request message and indicate the sizing for the response message to be returned in reply to the request message. Further, and as shown, message 180 also includes a data train 184. In accordance with the invention, data train 184 is provided where primary and/or secondary selection parameters are submitted with the ad request. However, it need not always be present. As noted, during the course of system operation, request messages can be submitted to database server 20 that do not include specification of selection parameters. Particularly, when user 1 designates a category of interest, as noted, a search request message is sent to database server 20 to obtain a listing of the subcategories associated with the designated category, together with a posting of the ad count for each associated subcategory. For the subcategory request message, the primary and secondary selection parameters need not be specified, and accordingly, no data train 184 need be included with request message header 182. However, where primary and/or secondary selection parameters are submitted; for example, where user 1 has specified selection parameters at menu 140, data train 184 is provided, and includes as shown, a plurality of sequential data segments 190, 192; segments 190 concerning the primary selection parameters 60 and segments 192 concerning secondary selection parameters 62.

With regard to the message structure, as shown, header 182, includes a first subheader 186, entitled the session subheader. In preferred form, session subheader 186 is configured to include 10 binary, eight-bit bytes (0–9) allocated for the purpose of describing: the length of the message; its origin; matter concerning system status; and the message format. More specifically, the first four bytes (0–3) of subheader 186 define a message length field, particularly, the number, expressed in binary form, of message bytes following the length field; the total byte length of the message being equal to the value given in the length field, plus the four bytes of the length field itself. The next two bytes, (4, 5) of subheader 186 define an origination identification field that includes an identification number expressed in binary form for the CGI process that generated the request message. In accordance with the invention, a CGI process 86 is initiated when user 1 first begins a query and is extinguished only when the results report is sent back to user 1. Accordingly, the identification number is unique to the specific CGI process initiating the request message and the request message itself. Therefore, and as will be appreciated by those skilled in the art, database communicator 87 and uses the CGI identification number to identify the destination for the response message so that response message generated in reply to request message 180 will be properly returned to the CGI process that originated the request message.

Continuing, the next two bytes (6, 7) of session subheader 186 provide information regarding the status of the system. Specifically, bytes 6 and 7 define bit-based control flags which may be used both to indicate current condition at application server 16, as well as conditions at other parts of system 10; as for example, diagnostic requests sent to database processor 88. In preferred form, bytes 6 and 7 are used: to acknowledge receipt of notification that the ad database has been updated; to verify the connection between application server 14 and database server 20; and to indicate the occurrence of database processing events.

Finally, the last two bytes (8, 9) of subheader 186 provide, respectively version and revision identification in binary form for the CGI process. In identifying the version and revision of the CGI process, the format of the request message is identified, and with it, the format to be used for the response message. As will be appreciated, the version and revision of the CGI process and additionally the message format for the CGI process will from time to time change based on improvements to the system. Accordingly, a means is required to indicate the version and revision of the CGI process so that database processor 88 will know what format the response message should take to be fully understood by the CGI process that initiated the request. In preferred form, bytes 8 and 9 respectively, provide that information.

Turning next to the request message identification (ID) subheader 188, in accordance with the invention, the function of ID subheader 188 is to provide information concerning the data content of request message 180, and additionally to provide "blocking" information; i.e., information concerning the required subdivision and subdivision sizing of the response message to be supplied in reply to request message 180. Particularly, and as shown in FIG. 11, subheader 188 includes 12, eight-bit, binary bytes. In preferred form, the first four bytes (0–3) of subheader 188 provide information in two, two-byte fields for instructing database processor 88 regarding the desired divisional organization of the response message. The first two bytes indicate the number of the response message subdivision to be returned in response to the request message, and the second two bytes indicate the maximum number of ad records to be included in each response division, which, as will be appreciated, determines the total number of divisions that will makeup the entire response to the request message.

In accordance with the invention, the first two bytes (0, 1) of ID subheader 188 give the number, in binary form, of the desired number divisions to be provided per response, and the next two bytes (2, 3) give the maximum number, expressed in binary form, of records to be returned in the response division.

Continuing, ID subheader 188 in addition is seen to include information concerning the subject matter content of the request message. Particularly, the two bytes (4, 5) of subheader 188 following the blocking information of bytes 0–3 provide the category identification number in ASCII form for user 1's request. And, the next two bytes (6, 7) of subheader 188 provide the subcategory identification number in ASCII form for user 1's request. As described above, the category/subcategory identification for the request is used to access above-described, pre-selection designation tables 42 at database server 20 and to provide identification of record range 52 against which user 1's entered primary and secondary selection parameters 60, 62 are to be compared. As will be appreciated, because the request message employs two, ASCII, numeric characters to identify ad category, and two, ASCII, numeric characters to identify the subcategory, the maximum number of different categories that can be designated with the request message is 99, and the maximum number of subcategories that can be designated is also 99. And, this is so even though, as noted above, the data structure as shown in FIG. 3 includes a binary byte having 256 possible values for the category an a binary byte having 256 possible values for the subcategory.

The next four bytes (8–11) of ID subheader 188 provide two, two-byte fields that respectively give identification code for the request message and the data type for the data being submitted. Particularly, bytes 8, 9 provide a two-place ASCII code for the request message identification, and bytes 10, 11 provide a two-place ASCII code for the data type. In accordance with the invention, depending on the point in the search process at which a request is made, various standard types of request messages and data forms are employed. To enable communication of the request message type and data type to database processor 88, a set of codes to identify each is established, and respective codes are included in subheader 188 for their identification. For example, as illustrated in FIG. 9, when user 1 first navigates to the subcategory menu, a list of subcategories with ad posting per subcategory are presented at menu 134. An appropriate message identification code and data code would be included in request message subheader 188 at the time the request is generated. For example, in preferred form, in the case where a subcategory listing without ad count postings is to be provided in reply to the request message, a message identification of "27" and data type of "00," respectively, are provided at bytes 8, 9 and 10, 11 of request message subheader 188. In case of a subcategory listing with ad count postings, the request message identification is "28" and the data type "00."

Further, as noted, in submitting selection parameters, user 1 can designate whether the selection parameters entered are to be considered conjunctively ("anded") or alternatively ("ored"). To effect user 1's choice appropriate coding is included in the data type field. Particularly, in preferred form, where user 1 designates that the parameters selected are to be "anded" i.e., all appear in the ads retrieved, the data type "01" is included with a request message identification of 85. Where user 1 designates that the parameters be "ored", i.e., that any of the selected parameters appear in the ads to be retrieved, the data type "02" is included in the data type field in conjunction with a message identification of 85.

Continuing, as illustrated in FIG. 11, following message subheaders 186 and 188, request message 180 further includes data train 184. In accordance with the invention, and as noted, data train 184 is provided in request message 180 where primary and/or secondary selection parameters have been designated. Particularly, data train 184, features data segments 190, 192, respectively, where user 1 enters primary and/or secondary selection parameters at menu 140.

In preferred form, data segments 190, 192 are similar in structure, each featuring a sequence of bytes to define the particular parameter to which the segment relates, the "condition" of the parameter, and its value. More specifically, in preferred form, primary segments 190 includes a first two-byte field (0, 1) presented in ASCII form to define the primary selection parameter to which the segment relates.

As illustrated in FIG. 3 and noted in connection with description of the system data structure, primary selection parameters 60 each have a two-placed, ASCII number associated with them for purposes of identification. As will be appreciated and as noted above, the identification number could be established either by expressly ascribing an identification number to the respective parameters in the ad record, or by referencing the position of the parameter in the data structure with respect to a reference location and an offset as is well known in the art. In preferred form, identification number 66 is presented at bytes 0 and 1 of data segment 190 to identify the primary parameter selected. For example, in the category/subcategory of "real estate sales", "residential", the numbering for primary selection parameter noted in connection with the above would be: 01, Ad Date; 02, Type; 03, County (Area Level I); 04, Town (Area Level II); 05, Min price; 06, Max price; 07, Min beds; and 08, Min baths;

Following the parameter identification field, data segments 190 includes a two-byte field (2, 3) configured in ASCII form to identify an operator for defining the condition to be placed on the selected parameter. In preferred form, the parameter operators include: "equal to" (=); "greater than" (>); "greater than or equal to" (>=); "less than" (<); "less than or equal to" (<=); and "match text content" (~).

Thereafter, primary parameter data segments 190 include a two-byte field (5, 6) in ASCII form to identify the place length for the parameter value to be presented in the segment. And, following the value length field, segments 190 includes a sequence of multiple bytes corresponding to the value given in the length field, to give the value in ASCII form for the primary parameter identified in the segment.

By way of illustration, and again with reference to a category/subcategory designation of "real estate sales", "residential," in the case where user 1 desires to include the requirement that the property be a house, a data segment 190 would be provided that appears as:

02=011, wherein "02" indicates that the "Type" primary parameter has been selected, "=" indicates that the Type parameter should be "equal to"; "01" indicates that the value length for the parameter will be one character; and "1" indicates the numerical, code value for a house has been selected. Additionally, if user 1 wishes to indicate that property type should be either a house or a condo, the designates multiple choices for the "Type" parameter. These choices, which are automatically "ored" by the process are indicated as follows:

02=011|2 wherein "02" indicates the "Type" primary parameter has been selected, "=" indicated the "Type" parameter should be "equal to"; "01" indicates that the value length for the parameter; will be one character; the "1" indicates the value of the first choice, the "|" indicates that the first value is to be "ored" with the following value; and "2" indicates the value of user 1's second choice.

With regard to coded parameter value "1," it will be recalled that in posting information to selection menu 140, user 1, in preferred form, is permitted to enter numerical values directly to write-in fields; and enter check offs in designation boxes; and select items from scrolled lists. In the case of both designation boxes and list selections, and as will be appreciated by those skilled in the art, system 10 generates the numerical values corresponding to the user's action from suitable tables. Accordingly, though user 1 might simply check off "house" at selection menu 140, the system would supply the designation of the value "1" to the request message to signify the selection of "house." Continuing, and as a further illustration, in the case where user 1 wanted to specify that the house have a maximum selling price of $250,000 or less, data train 184 would also include a primary parameter segment 190 appearing as:

06<=06250000, wherein "06" indicates specification of the maximum selling price primary parameter, "<=" indicates that the maximum selling price be less than or equal to the value given, "06" indicates numerical value is 6 places long, and 250000 indicates that the $250,000 maximum selling price.

Still further, should user 1 want to require that the ads selected include houses having a maximum price of $250,00 and also have at least 3 bedrooms and 2 bath, the following additional primary parameter data segments 190 would also be provided and appear as:

07>=013,

08>=012.

Continuing, in addition to primary parameter segments 190, as illustrated in FIG. 11, data train 184 also includes secondary parameter segments 192. As shown, secondary parameter segments 192 have a structure which is the same as that of primary parameter segments 190, namely, a first, two-byte field to identify the parameter; a second two-byte field to express the "condition" for the parameter; a third, two-byte field to give the number of places for the parameter value, and a fourth, multi-byte field to give the parameter value itself.

More specifically, as in the case of primary parameter segments 190, the first two bytes of the secondary parameter segments 192 define a first two-byte field (0, 1) presented in ASCII form to identify the secondary parameter to which the segment relates. Again with reference to FIG. 3, like primary parameters 60, secondary parameters 62 are each provided with two-placed, ASCII identification numbers. In preferred form, an identification number for the secondary parameter selected is presented at bytes 0 and 1 of data segment 192 to identify the parameter selected and to be searched on. In the case of the secondary parameters, however, in preferred form only a limited number of parameters are provided for in the set; particularly, three parameters are used having, respectively, identification numbers A0, A1, and A2.

Particularly, in the ad request message, parameter A0 identifies mapped field 70 of "yes-no" secondary subject-matter features illustrated in FIG. 3, and A1 identifies one or more key word that are to be compared with text string field 72 also illustrated in FIG. 3 which contains the entire text of the ad to enable ad text, keyword searching. The third secondary parameter A2, is an "ad limit" parameter which may be used to control the number of ads returned per ad request.

In accordance with the invention, in a first preferred form, though not included in the database structure illustrated in FIG. 3, the secondary selection parameter set also includes an ad limit parameter for purposes of enabling the request message to specify the maximum number of records to be returned per subdivision of the response message sent back by database processor 88 in reply to the request message. With reference to FIG. 10, and menu 140, this parameter may be set at field 154. As will be recalled, in certain situations, for example, large numbers of ads in a subcategory, to either avoid overburdening user 1 with large responses, or to prevent potential piracy, it is desirable to limit the number of ads returned per request. The "ad limit" parameter enables that to be accomplished. In a second preferred form, the field reports to those as searches which result in no more matching ads than the value specified by user 1. So, if a search yields a number of matching ads greater than the amount specified by field 154, then user 1 will be informed that the search results have exceed the specified limit ans user 1 is instructed to either raise the limit if not already set at the maximum value or narrow the search by selecting additional parameters or change "oring" parameters to "anding" parameters.

Continuing, the next two bytes (2, 3) of secondary parameter data segment 192, as in the case of primary parameter segment 190, identify, in ASCII form, an operator that defines the condition to be placed on the parameter selected. Once again, in preferred form, the operators include: "equal to" (=); "greater than" (>); "greater than or equal to" (>=); "less than" (<); "less than or equal to" (<=); and "match text content" (~).

Thereafter, data segments 192 include a two-byte field (5, 6) in ASCII form to identify the place length for the parameter value to be presented in the segment. And, as in the case of segments 190, following the value length field, segments 192 include a multi-byte sequence corresponding to the value given in the length field, to give the value in ASCII form for the secondary parameter designated.

By way of illustration, and again with reference to a category/subcategory designation of "real estate sales", "residential," in the case where user 1 has designated the above noted primary selection parameters for a house having a maximum selling price of not more the $250,000 and at least 3 bedrooms and 2 baths, and additionally wishes to include secondary parameters concerning house features such as a fireplace, family room, an eat-in kitchen, garage and pool, a secondary parameter segment 192 having the following appearance would be provided:

A0=0287.

In the example given, "A0" indicates that the secondary parameter is the "yes-no" field of subject-matter features, which as described, for the category/subcategory of "real estate sales", "residential" includes: Fireplace; Family Room; Eat-In Kitchen; Formal Dining Room; Garage; Cul-de-sac; Pool; Yard; and By Owner. Further, "=" indicates "equal"; "02" indicates the parameter value will have two places; and "87" indicates the value of the "yes-no" field where the "Fireplace", "Family Room", "Eat-In Kitchen", "Garage" and "Pool" features have been selected. More specifically, as explained above, the "yes-no" parameters selected are mapped to 32 bit field 70 shown in FIG. 3. Particularly, in preferred form, the noted features are assigned to field 70 in right-aligned order (ascending from the right) as follows: "Fireplace" to the 0 bit; "Family Room" to the 1 bit; "Eat-In Kitchen" to the 2 bit; "Formal Dining Room" to the 3 bit; "Garage" to the 4 bit; "Cul-De-Sac" to the 5 bit; "Pool" to the 6 bit; "Yard" to the 7 bit; and "By Owner" to the 8 bit. Further, as each of the features are selected, a "1" (yes) is placed in the bit place. If the feature is not selected, a "0"(no) is placed in the bit place. Accordingly, once the features have been selected a pattern of "1's" and "0's" results that can be read as a binary value. In the example chosen, since "Fireplace", "Family Room", "Eat-In Kitchen", "Garage" and "Pool" were selected, a "1" would appear in the 0, 1, 2, 4, and 6 bit places (1010111) and produce a decimal equivalent value or 87 ($2^0+2^1+2^2+2^4+2^6$). As would be appreciated by those skilled in the art, other combinations of features would produce a different bit pattern and resulting different parameter value.

In the event user 1 yet additionally wanted to include several keywords in his request such as "clean" the secondary selection parameters segment 192 would look like:

A1~05clean,

"A1" signifying selection of the text string parameter, "~" signifying a text string comparison, "04" signifying the length of the text string (including the commas separating words) and "mint" representing the text string values to be search against the ad text field 72 shown in FIG. 3.

Finally, in the first preferred form as previously noted, in the case where user 1 still additionally wishes to further limit the number of ad retrieved per request to 25, the suitable secondary parameter segment would look like:

A2=0225,

"A2" indicating the "ad limit" parameter; "=" indication equal, "02" indicating 2 places for the parameter value, and 25 indicating the maximum number of records to be returned.

In summary then, for the examples noted, in the event user 1 wanted to see ads in the category/subcategory "real estate sales", "residential" for houses having a selling price of less than or equal to $250,000 and including at least 3 bedrooms, 2 baths, a fireplace, family room, eat-in kitchen, garage and pool, and the keywords "mint" and wanted to look at not more that 25 ads, then he would fill in menu 140 accordingly, and the following data train 184 would be produced;

02=0111,06<=06250000,07>=013,08>=012,A0=0287,A1~05clean, A2=0225.

As will be appreciated, in accordance with the invention, the concise nature of the numerically coded selection parameters for the compound search conditions sought to be satisfied enables detailed searching to be undertaken simply, quickly and with minimum computing resources.

With reference to FIG. 7, and step 116, once database interface function 94 of CGI process 86 has generated request message 180 from the information entered by user 1, CGI process 86 sends ad request message 180 to database communicator 87, and database communicator 87 sends ad message 180 through a communication port it maintains open to database processor 88 for disposition.

As noted at step 118, of FIG. 7, upon receipt of request message 180 at database server 20, database processor 88 undertakes analysis of the message and prepares to compare the request information contained within the request message to the information available at database 90 in preparation for generation of a suitable response. In accordance with the invention, because of the numeral format for database 90 above described, and the numerical form of the request message which constitutes the search query, it is possible to load the database to and search process in RAM memory, where as will be appreciated by those skilled in the art, the search may be simply and quickly executed.

With regard to the record search, upon receipt of message 180, database processor 88 initializes an ad record comparison process; analyzes request message subheader 186 to note the length of the incoming message in order that a suitable processing environment may be provided, and further, notes the destination for the response, particularly, the CGI process that originated the message so that the response message to be prepared can be properly routed back in reply. Thereafter, processor 88 notes the CGI process version and revision identification provided in subheader 186 so that processor 88 can provide the appropriate format for the response message. Following identification of the request message length, required return routing and format information, processor 88 reviews message subheader 188 to determine the "blocking" requirements for the response, particularly, the number of the response subdivision to be provided and the maximum number of records to be returned per subdivision as described above.

Thereafter, processor 88 undertakes analysis of the substantive content of the request message and prepares to locate matches for the ads desired. Particularly, processor 88 notes the category identification provided in subheader 188 and determines if a subcategory has been designated and the identification for the message type and data type. In the case where the subcategory has not yet been designated, processor 88 uses the category identification 48 noted in FIG. 3 to access pre-selection tables 42 provided at database server 20 to determine the respective ad record ranges 52; i.e., the start record and stop record identifications 54, 56, respectively, for subcategories associated with the category designated. Subsequently, upon identification of the appropriate start and stop record number noted, processor 88 determines; i.e., counts, the number of records for each of the subcategories associated with the designated categories. Thereafter, processor 88 notes the number of ad records per subcategory and holds the respective information for inclusion in the response message to be prepared. In preferred form, and as noted above, the subcategory count, may have been determined in a prior request and be available in CGI process cache 102. In that case, the request would not be made to database 90, but rather immediately retrieved from CGI cache 102.

In the case where request message subheader 188 includes the designation of a subcategory, and further indicates the message type as being one for the request of ads limited by specified selection parameters, processor 88 again enters pre-selection tables 42, and for the category/subcategory identification 46 specified in the request subheader, finds the start and stop record identifications, 54, 56. Thereafter, processor 88 enters record selection tables 44 illustrated in FIG. 3 and compares the parameters identifications and associated parameter values presented in data segments 190, 192 of request message data train 184 with the associated field values, 68, 70 and 72 of tables 44 to identify records that satisfy user 1's request. Subsequently, processor 88 once again notes records "matching" the selection parameters included in request message 180, holds the information and prepares to generate a suitable response message.

More specifically, in carrying out the search, database processor 88 builds a model selection record from the request message that includes the numerical values in the fields for selection parameters the user has designated, and a zero in the numeric fields for the parameters the user has not designated. Further, for parameters for which user 1 is permitted to make multiple choices; for example, in the case of category "real estate sales", subcategory "residential", for the parameter "type" as shown in FIG. 10, where user 1 selects "co-ops, condos" and "houses", two numeric values would be associated with the parameter "type." As will be appreciate, for parameters of other categories and subcategories, various other parameters may also allow possible multiple acceptable designations, and if designated, the parameter would have multiple, non-zero values associated with it in the model record.

Further, processor 88 associates with each of the parameters the user has designated, the operator; for example, "=", ">=", "<=" etc. which user 1 has selected for the respective parameter. And, yet further, processor 88 sets up a data structure which upon comparison of the model record to the database records, processor 88 will fill in to create a bit map of the ad records that satisfy the comparison. Particularly, in preferred form, the data structure is a linear bit array that references the start position of the ad records to be compared and progress in length to provide one bit per ad record until all the records to be compared are accounted for. Thereafter, during the comparison process, processor 88 populates.the array with a "1" for records found to match the model record, and a zero for records that do not match the model record.

In undertaking the comparison, processor 88 first compares the primary parameters of the model record, one parameter at a time, with the parameters of the ad records in the predetermined range, one record at a time. In the comparison, processor 88 moves down the parameters of the model record one parameter at a time, in the order of the parameters in the model record which is the same as the order of parameters in the ad database records; as shown in FIG. 3. If the parameter in the model record is zero, the parameter is skipped. However, if the parameter is non-zero, the numeric value of the model record parameter is compared with the corresponding parameter value of the ad record being tested. In the case where the parameter value of the model record does not match the parameter value of the record being tested, processor 88 determines if the parameter is one for which the user is permitted to make multiple choices. If the parameter is one for which user 1 is permitted to make multiple choices, the processor then compares the other values for the parameter, one at a time until all are exhausted. If, respectively, all fail to produce a match, the record being tested is judged to be a non-matching record and processor enters a "0" to the bit map and goes to the next record in the ad database range being tested.

Still further, if the parameter of the model record is one for which multiple level dependency is provided, in the event a non-zero higher-level parameter values fails to find a match in the corresponding parameter in the ad record, the low-level parameter of the dependent combination which is arranged to immediately follow the high-level parameter is then checked. If processor also fails to find a match for its numeric value in the corresponding ad record parameter, then again the record being tested is judged to be a non-matching record and processor enters a "0" to the bit map and goes to the next record in the ad database range being tested.

On the other hand, if the parameter comparison is successful, processor 88 then proceeds to the next parameter in model record. Further, if processor 88 continues to find successive matches for the other primary parameters, processor 88 enters a "1" in the bit map for the successful comparison.

Thereafter, processor 88 proceeds to the next record in the ad record range to be searched, and repeats the process successively for each of the ads in the range until all records are exhausted.

Following completion of the first pass at the record range, processor 88 then undertakes a second pass of the record range to test the secondary selection parameters. However, for the second pass, processor only compares the model record to the records in the range for which the bit map indicates a match of primary selection parameters, i.e., records for which the bit map has a "1."

In undertaking the comparison for the secondary selection parameters, in preferred form, processor 88 notes whether user 1 has elected to "and" his selection of secondary parameters or "or" them. In the case where user 1 has designated that the secondary parameters are to be "anded", processor 88 goes to the yes-no field 70 of the model record and compares the value in the model record to the corresponding value in the records the records which previously were found to produce matches to the designated primary parameters. If the yes-no secondary parameter value at field 70 does not match the ad record field, then the previously indicated "1" in the bit map to indicate successful matches is changed to "0." And, processor 88 moves to the next record found to be a match in the comparison of the primary parameters.

In the case where the yes-no field 70 does match, processor 88 then moves to the ad string text field 72 of the model record and notes the word or words user 1 has entered in field 148 of menu 140 which have been placed in a 99 character buffer associated with the model record field 72. Thereafter, processor 88 goes to the memory space pointed to in the ad text string field 72 for the ad record to be tested to find the ad text against which to compare the word identified by the model record. If the word referenced by the model record does not match any word in the ad text, processor 88 judges that the record being tested to be a non-matching record and processor 88 changes the "1" previously entered in the comparison bit map "0." It is to be noted that if multiple words have been entered at field 148, each one is tested successively, and if none are found in successive passes at the ad text, processor 88 judges that the record being tested to be non-matching record and processor 88 changes the "1" previously entered in the bit map "0."

If however, any of the words entered in filed 148 match, processor 88 retains the "1" entered in the bit map for the selection of the primary parameters and the record is considered a successful match.

Continuing, if user 1 has indicated the secondary parameters are to be "ored," processor 88 again begins by looking at yes-no field 70 of the model record. However, in the "or" condition, processor 88 compares the bits of field 70 with the bits of field 70 of the ad record being tested, one bit at a time. If none of the bits are found to match, processor 88 moves to text field 72 and compares the word or words of the model record to the ad record. If none of the word are found to match, processor 88 judges that the record being tested to be a non-matching record and changes the "1" previously entered in the bit map to "0."

Still further, where user 1 has indicated the secondary parameters be "ored", if on comparing yes-no field 70, any of the bit places are found to be equal to those of the field 70 of the ad record being tested, a successful match is judged to have been found, and processor 88 retains the "1" previously entered for the record tested.

Finally, if yes-no field 70 fails to find a match as described above, then processor 88 tests text filed 72 as described above and if any word or words of the model record are found to match the ad record being tested, then the record is judged a match, and processor 88 retains the "1" in the bit map entered in connection with the successful test of the primary parameters.

Following, the comparison test above described, processor simply refers to the comparison bit map, and passes the ad text for ads having "1's" in the comparison bit map to CGI process 86 by means of the response message 194.

Figure 12:
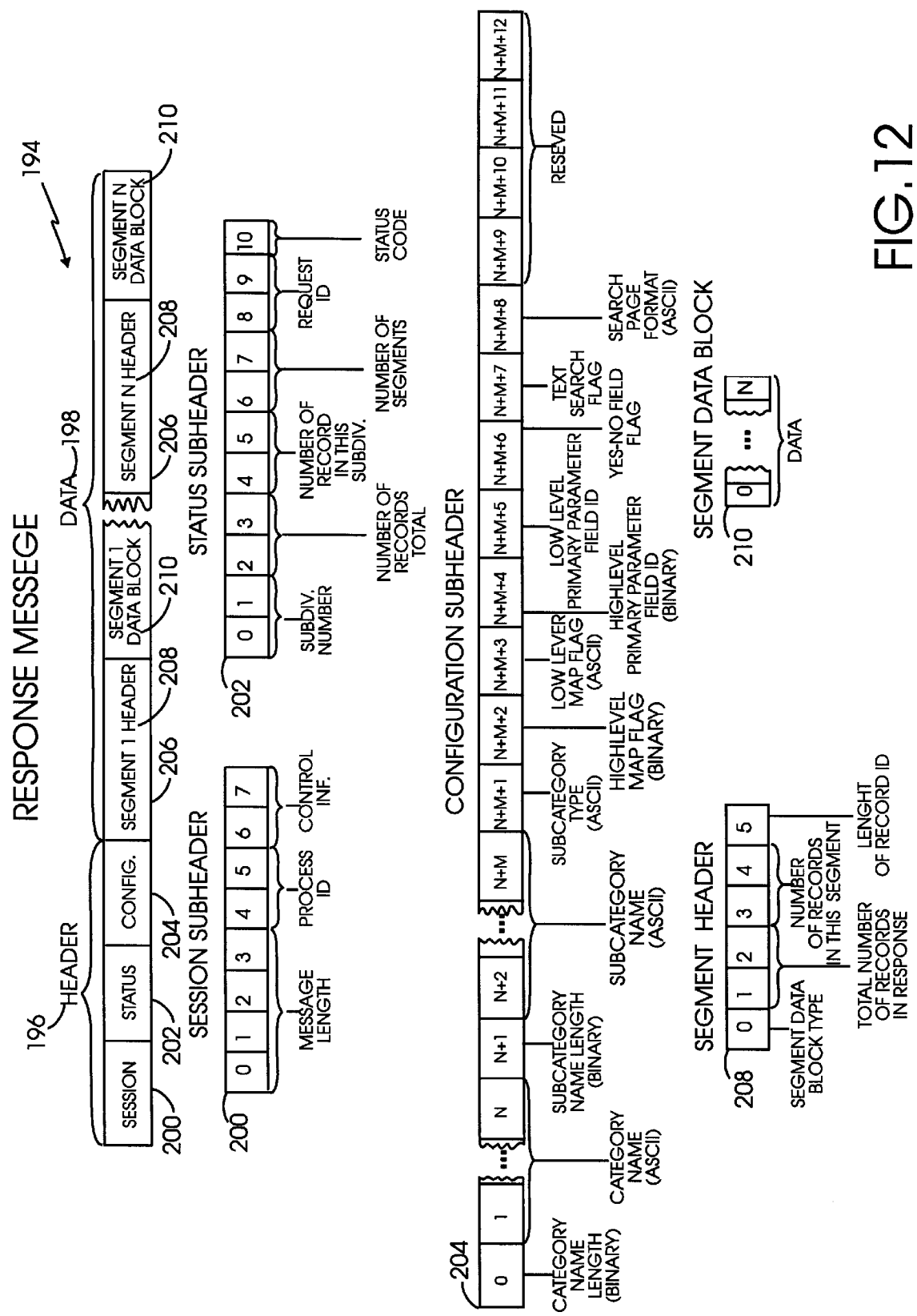
FIG. 12 is a schematic diagram of the structure for the response message generated in connection with the record selection query of the ad search process for the classified ad system in accordance with this invention.

In accordance with the invention, the response message 194 which database processor 88 prepares in reply to request message 180 is schematically illustrated in FIG. 12. In general form, response message 194, is similar to request message 180, response message 194 featuring a message header 196, followed by a data train 198. Also, like request message 180, header 196 of response message 194 features subheaders to provide both processing and content information. However, in the case of response message 196, the header processing and content information concern the return of ad record data to the proper requesting agent; identification of the response message organization; and specification of the returned information content so that the information can be properly formatted for presentation to user 1.

To accomplish these objectives, response header 196 is provided with three principal parts, a session subheader 200, for identifying and describing the response message relative to the system search process, a status subheader 202 to identify the organization and blocking of the response message, and a configuration subheader 204 to identify the information being returned to user 1 in reply to the search request.

Further, and as shown, response message 194 additionally includes a data train 198. In accordance with the invention, response message data train 198 is generally similar to data train 184 of request message 180, the response message data train 198 also including a plurality of data segments 206. However, because of the more complex and varied nature of information being returned; for example, category, subcategory, search menu, ad data, etc., segments 206 includes an additional degree of organization in the form of segment header 208 and an associated segment data blocks 210. In accordance with the invention, data segments 206 are returned where processor 88 can generate data from database 90 responsive to user 1's ad request. However, in the case where the processing of the request is unsuccessful, either because of some impropriety in user 1's submission or some failure of the system, no response data segments 206 are provided. Yet additionally, in the case where a proper request is submitted and processed, but, no records are located, while data segments header 206 will be provided, the associated segment data block 210 will be empty, as for example, where new ad record data is being loaded to the system.

With regard to the message structure, as shown, response message header 196, includes a session subheader 200. In preferred form, subheader 200 is configured to include 8 binary, eight-bit bytes (0–7) allocated for the purpose of: describing the length of the response message; its destination; and matter concerning system status. More specifically, the first four bytes (0–3) of session subheader 200 define a response message length field, particularly, the number, expressed in binary form, of message bytes following the length field; the total byte length of the message being equal to the value given in the length field, plus the four bytes of the length field itself. The next two bytes, (4, 5) of subheader 200 define the response message destination, once again, expressed in binary form. As explained in connection with the description of request message subheader 186, in the preferred embodiment, the CGI process 86 both originates the search request message and receives the database search results. Accordingly, the response message destination is uniquely identified with the identification for the originating CGI process, and its identification number is thus provided at session subheader bytes 4, 5.

Continuing, the last two bytes (6, 7) of subheader 200 provide information regarding the status of the system. Specifically, bytes 6 and 7 define bit-based control flags which may be used both to indicate current condition, at database server processor 88. In preferred form, bytes 6 and 7 are used: to notify the application server 16 of updates to the ad database 90; to verify the connection between application server 16 and database server 20; to indicate the occurrence of database processing events and to indicate whether a processing error indication is being returned.

With regard to the response message status subheader 202, in accordance with the invention, the purpose of subheader 202 is to provide information concerning the data content of response message 194, and additionally to provide "blocking" information regarding the subdivision and subdivision sizing of the response message. More specifically, and as shown in FIG. 12, status subheader 202 includes 11, eight-bit, binary bytes. In preferred form, the first eight bytes of subheader 202 define four, two-byte fields which provide blocking information for the response message. Particularly, the first two bytes (0, 1) of subheader 202 identify in binary form the message subdivision being sent. As described in connection with request session subheader 186, to avoid overburdening user 1 or the potential for record piracy, the response message is divided into multiple parts, each part; i.e., subdivision, having a maximum number of ad records, the total number of subdivisions constituting the full response. Bytes 0,1 of subheader 202 identify the response message subdivision being returned. The next two bytes (2, 3) of subheader 202 give, in binary form, the number of ad records that are included in the full response message and the following two bytes (4, 5) present in binary form the number of ad records included in the current message subdivision. Finally, the next two bytes (6,7) of subheader 202 give in binary form the number of data segments 206 that are included in the current response message subdivision. In preferred form, to simplify processing, response message 194 is restricted to a single division; i.e., a single unit and all records are reported with it. In the event the records located and to be returned exceed the maximum number of records set by either user 1 or system 10 for a response, an error message is returned and user 1 advised to modify the search selection parameters to reduce the number of records to be returned.

Following the blocking information, response message status subheader 202 includes two additional fields, a first field to identify the request message type and a second to indicate the response status. More particularly, bytes 8, 9 of subheader 202 define a two-byte field for designating the original request message type. As noted, in connection with the description of request message subheader 188, in accordance with the invention, a series of predetermined codes is established to identify the nature of standard request messages; for example, category/subcategory listing with and without ad counts; primary selection parameter listings with and without ad counts; particular primary parameter listings and count, etc. Identification of the request message is provided in ASCII form at subheader 202 bytes 9, 10.

Finally, the last byte of subheader 202; i.e., byte 10, presents a search status code designed to indicate either successful or unsuccessful processing of the request message. In preferred form, a negative value at byte 10 indicates an error condition in the request message processing, while a value of zero indicates an unconditional success in processing. Further, and also in preferred form, a positive value at byte 10 indicates a successful search and that additional status information will be reported.

Following status subheader 202, response message header 196 yet additionally includes configuration subheader 204. In accordance with the invention, subheader 204 is a variable-length, multi-byte sequence designed to provide category/subcategory dependent configuration data for use by CGI process 86 in handling and reporting the ad data being returned with response message 194. Particularly, subheader 204 instructs CGI process 86 as to the type and character of the search data to be returned in response message data segments 206.

As shown in FIG. 12, subheader 204 includes a first, single-byte (0) binary field to identify the length of the category name which user 1 originally designated when beginning the search request database processor 88 is responding to. And, following byte 1, subheader 206 includes a multi-byte, ASCII field (1 to N) to provide the category field name; for example, "Real Estate Sales." Next, subheader includes another single-byte, binary field (N+1) to identify the length of the subcategory name designated at the outset of the search being responded to, which, as in the case of the category identification, is followed by another multi-byte, ASCII field (N+2 to M) in which the name of the designated subcategory field is given. Following the subcategory name field, subheader 206 includes a single-byte, ASCII field to identify the type of subcategory page to be presented to user 1. In preferred form, and as noted above, depending on the subcategory chosen, either parameter selection menu 140 is presented or a specialty menu to further limit the range of ad records to be reviewed. For example, in the category "real estate sales", and the subcategory "residential", a subsequent selection menu directed to "local" may be presented before selection menu 140 and the remainder of the primary and secondary selection parameters are presented. But, since presentation of the specialty menu "area" is itself a response to a request for ad information concerning the subcategory "residential", the response message must identify the subcategory type in order to advise CGI process 86 of the form of reply which should be made following the "residential" subcategory designation. The subcategory type field following the subcategory name provides that information.

Continuing, following the subcategory type filed (N+M+1), subheader 206 includes a series of fields (N+M+2 to N+M+8) concerning the selection parameters to further identify the form of the subsequent menu presentations to user 1 which are dependent on the subject matter being searched and primary and secondary selection parameters presented in the ad request message being responded to. As also seen in FIG. 12, following byte N+M+8, configuration subheader 204 includes a series of four reserved bytes.

Continuing, as shown in FIG. 12, following subheaders 200, 202 and 204, request message 194 further includes data train 198. As described, data train 198 includes one or more data segments 206 where processor 88 is able to locate information in database 20 responsive to user 1's request message 180. However, data segments 206 will not be returned where either an improper request message is submitted, or some error arises in the search process. In the case where data segments 206 are returned, in accordance with the invention, they are provided with a prescribed organization. Specifically, and as seen in FIG. 12, data train segment 206 includes a data segment header 208 and an associated segment data block 210.

As shown, data segment header 208 includes six, binary, eight-bit bytes. Particularly, segment header 208 includes a first, single-byte field (0) which may take an ASCII or binary form to identify the nature of the associated data block 210.

In preferred form, the data block types include; for example, category lists, subcategory lists, primary selection parameter field identifications, secondary selection parameter "yes-no" feature lists, and ad text data.

Additionally, following the data block description field (0), response message data segment header 208 includes a two-byte binary field (1, 2) to identify the number of ad records to be reported in the full response message, and a two-byte, binary field to identify the number of ad records included in the associated data block. Finally, data segment header 208 includes a single-byte field (5) to identify the length ad records identification number in the associated data block.

Continuing, in accordance with the invention, following header 208, data segment 206 includes an associated segment data block containing information to be reported to user 1. More specifically, data blocks 210 in preferred form are variable, multi-byte structures, who's content and format are specific to the data block type specified at byte 0 of the data block header 208. The request message identification and at type field at bytes 8, 9 and 10, 11, respectively of ID subheader 188 shown in FIG. 11 determines the data blocks that are to be reported in the response. For example, the data block types include: a category block to report system category descriptions; and a subcategory block to report each system subcategory and identify the form of the subsequent menu to be presented to user 1. Additionally, the data block types include a primary selection parameter block, either with or without ad counts to describe primary selection parameters, and where called for, provide the number of ads found in database 90 that match the selection values for the parameters entered in user 1's request message. Still further, the data block types include a block to report subject matter features of the secondary parameter "yes-no" group previously described in connection with the explanation of selection menu 140. And, the data block types include an ad detail block to report details of the ad text and associated information such as related photos, etc.

In preferred form, each of the data blocks includes data fields for reporting the information to be presented; the fields being dependent upon the type data block involved. For example, in the case of category data block, sequential data fields are provided for: the category identification number; the length of the category description; and the category description; i.e., title. For subcategory data blocks, sequential data fields are provided for: the subcategory identification number; the length of the subcategory description; the subcategory description; i.e., title; the number of ads in database 90 for the subcategory; the description of the subcategory type; and an identification number for the associated subsequent menu to be provided to user 1 upon selection of the subcategory. In the case of a primary selection parameter block, sequential data fields are provided for: the parameter identification number; the length of the parameter description; and its description. Further, where ad "match" counts are called for, an additional field to present the match count is provided. For the secondary parameter "yes-no" feature block types, a data field is provided to identify the length of the feature description; and a data field to present the feature description. Finally, for ad detail type data blocks, data fields are provided to: identify the type of special matter included; as for example, a photo; to identify the length of an ad text header; to present an ad text header, if called for to identify the length of the ad text; and a field for the ad text.

Continuing and with reference to FIG. 7, as noted at step 120 of the record search general flow diagram, upon comparison of the content of selection message 180 with the information provided at database 90, database processor 88 generates response message 194 in accordance with the above described structure, and at step 122 of the search process passes the response message back to CGI process 86 which originated the record request. Thereafter, and as described above, CGI process 86 analyzes the content of response message 194 and extracts the retrieved ad information. Next, based on the information retrieved, CGI process 86 calls up the report form template maintained at form file depository function 98 specified in the response message and report generator function 96 of CGI process 86 proceeds to prepare a report to user 1 by having data merging function 100 merge the information from the response message with the report form template. In preferred form, the resulting report provided to user 1 is an HTML document including not only the retrieved ad information, but also hypertext links to the classified ad search process, the host newspaper and/or some other Web site. Yet additionally, in preferred form, each time CGI process 86 forwards a report to user 1, the report additionally includes historical information concerning user 1's search experience which is brought back to server 16 and CGI process 86 in the event user 1 should elect to continue his search.

In accordance with the invention, in order to simply operation, the same general sequence of: request message generation; return of response message; and report generation is followed throughout the search process. What advances the search and gives the appearance of progression is the use of different report forms at the end of each stage of the process. As pointed out, from the point of category designation, the search process generates a category request message that gives rise to a response message which calls for a query report in the form of the subcategory menu 130. And, it is menu 130 and the options it presents that enable user 1 to progress to either the above-described specialty menus which narrow the reviewable ad record range, or to selection menu 140, it being understood that the specialty menus and selection menu 140 are themselves query report forms that both provide requested ad information and enable the user to proceed to the next stage of the search.

Finally, once user 1 has progressed through the above note sequence of search steps and associated reports and CGI sequences, to arrive at selection menu 140, and, thereafter enters his desired set of primary and secondary selection parameters, the attendant CGI process 86 then in operation returns a results report that identifies the number of ads in database 90 which meet the users specification and further provides a sequential listing of the ads themselves which user 1 can review. In accordance with the invention, the list order is predetermined by the sort order for the database carried out during distribution process that leads to the database update, as will be described below. This "pre-sorting" of the records thus substantially speeds the search response to user 1, since the database need not sort the records following the search as is necessary with conventional databases and search processes.

Still further, in addition to posting the ads in full text which match the selection specification, the results report in preferred form additionally provides user 1 with a series of options for further searching. Particularly, the results report in preferred form includes option to permit user 1 to either modify his selection specification to, for example, narrow or expand the number of records returned, or to permit user 1 to navigate to another subcategory of the same category just searched, or to go to an entirely new category. As will be appreciated, in preferred from, the options are provided on the results report as hypertext link to either the selection menu 140 in the case where the search is to be modified, or to the subcategory menu 130 for the current category, or to the service main category listing. Still additionally, the results report may include a link to the host newspaper Web server 12 and/or some other Web site as noted at step 130 of FIG. 7.

In the case where user 1 is satisfied with search results and does not wish to continue interrogating ad database 90, he would either save the ads results report to his terminal, print a copy of the report or note the telephone number associated with the ads of interest for subsequent follow-up contact.

Following completion of the ad search process, user 1 is free to quit the classified application and direct his attention to other matters.

Ad Record Maintenance

In accordance with the invention, and as outlined above, in preferred form, system 10, also features elements and procedures for quickly and easily generating and supplying uniform ad records to maintain the system ad database. Particularly, system 10 includes an ad generator having a parser that automatically interrogates the newspaper ad feed and translates its ad data into uniform, numerically coded ad record information in accordance with the established system database organization and structure. Further, system 10 additionally includes a server for inexpensively and quickly collecting generated ad database record information on a scheduled basis from any place in the world where Internet access can be effected. And, yet additionally, system 10 includes a distribution processor for transforming the ad record information collected into ad records and assembling those ad records into a multi-day, ad record reservoir from which the ad record database may be refreshed and replenished and to which database, record-request information may be fed back for creating usage and experience reports. Still further, the distribution processor is provided to receive ad placement requests from users for entry into the system.

The elements of the ad record generation; record collection; and distribution subsystems for the multi-newspaper, international version of system 10 are shown schematically in FIG. 1, and, for the simplified, single-newspaper version of system 10 in FIG. 2. However, for the purpose of the following discussion, reference will be made to FIG. 13, in which the elements of the ad record generation, record collection and distribution subsystems for the single-newspaper version of the system are schematically shown in a somewhat more detail together with database server 20, like elements to those shown in FIGS. 1, and 3 having like reference numerals.

Figure 13:
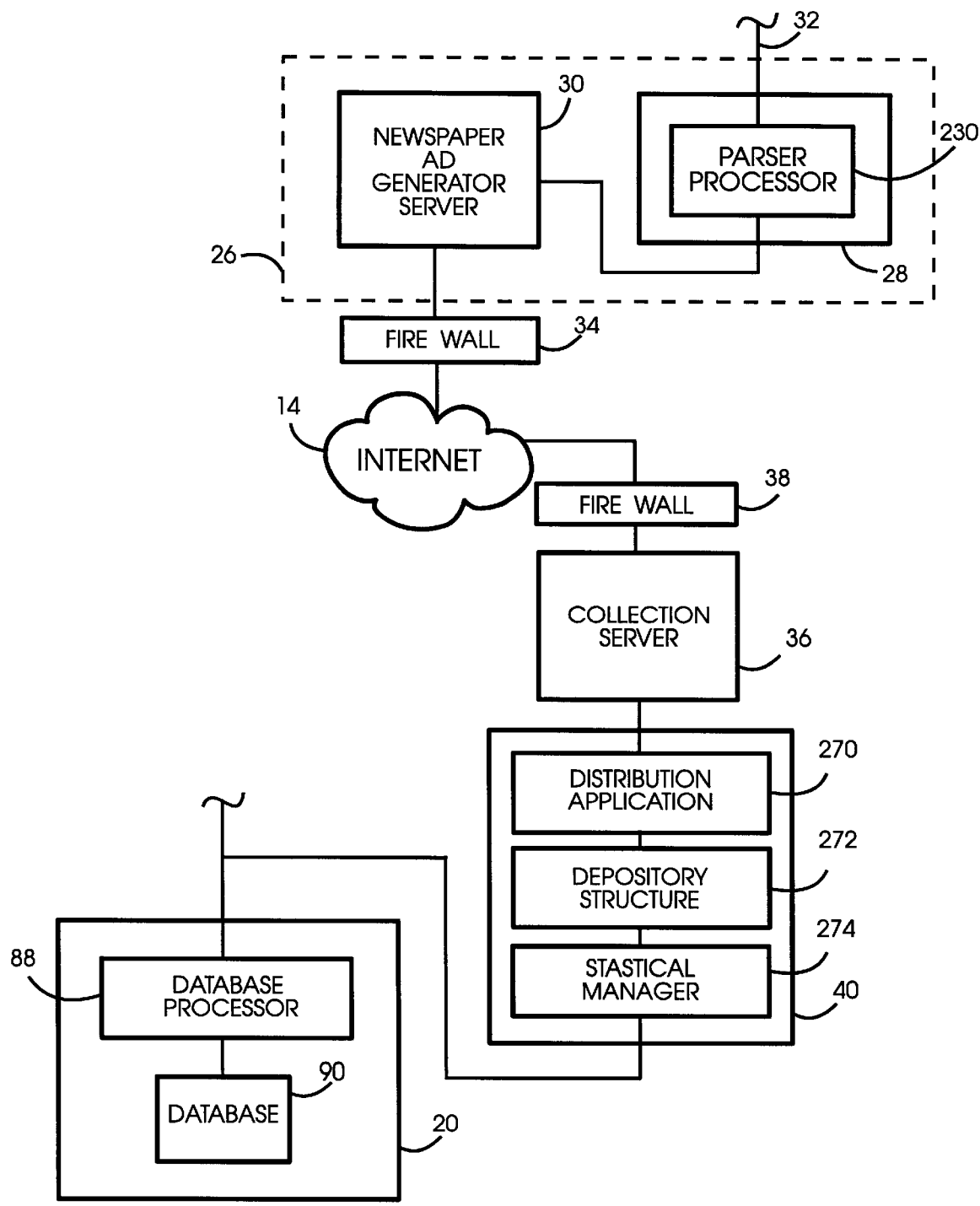
FIG. 13 is a schematic diagram of the system elements associated with ad database record creation for the classified ad system in accordance with this invention.

With reference to FIG. 13, the ad generation subsystem includes ad generator 26 having a host newspaper ad generator processor 28 and an ad generator server 30. Additionally and as shown, ad generator processor 28 features a parser processor 230. Still further, and as also shown, ad generator processor 28 and its parser processor 230 have a feed 32 for receiving classified ad information from the newspaper. In accordance with the invention, to simplify implementation, system 10 is designed to accept the ad information the newspaper uses to support its print classified ad system. That information is supplied to ad generator processor 28 and its parser processor 230 at feed 32. Parser 230, in turn, and as noted, converts the newspaper classified print feed 32 into ad record information which is compliant with the system record organization and structure for inclusion at ad database 90.

More specifically, throughout a business day, the newspaper receives classified ads from the public in conventional fashion; for example, over the telephone, walk-ins, mail-ins, etc., and, in preferred form, also from system 10. In the normal course, representatives of the newspaper review the ad text received, and upon its approval and after securing suitable account and payment information, accept the ads for publication. Thereafter, the newspaper prepares digital information files to feed its automated printing facilities (not shown). Typically, the print feed is a digital information file, including ASCII text records concerning the identification and processing of the ad together with the ad text itself. Particularly, in conventional operation, the ad records in addition to the ad text, each include: an ad identification number; a newspaper, subject-matter classification code; a publication date; account information; as well as other associated information. At the end of the day, that information is made available to the newspaper's automated print facility and to system 10 for supply to ad generator processor 28 and parser 230.

With regard to parser processor 230, in preferred form, processor 230 is a micro computer having at least a 486DX66 processor together with suitable RAM and disk storage resources; for example, at least 12 megabytes of RAM and on the order of 250 megabytes of hard disk storage space. Still further, in accordance with the invention, parser processor 230 features a parser software application 240 shown with its associated input and output files in FIG. 14 for translating the newspaper ad feed into ad database record information. In preferred form, parser application 240 is batch-process, DOS program capable, on average, of converting approximately 2 to 3 thousand ad print records into database record information per minute.

Figure 14:
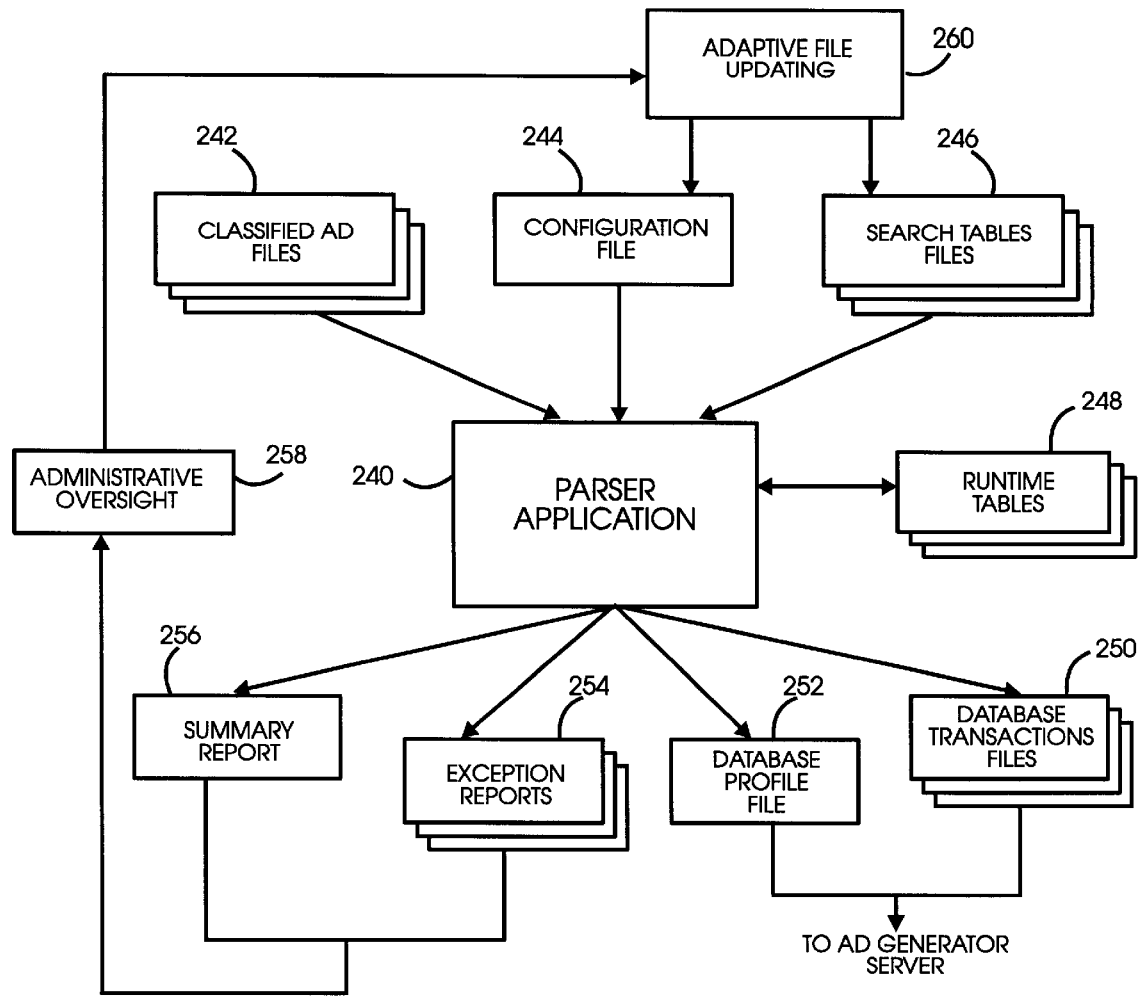
FIG. 14 is a schematic diagram of the elements associated with operation of the parser used for creating ad database records for the classified ad system in accordance with this invention.

As shown in FIG. 14, parser application 240 includes a number of information files to support its execution, and produces a number of reports and files in the course of its operation. In accordance with the invention, parser application 240 is designed to automatically examine each record contained in classified ad files 242, and to convert it into ad record information which subsequently when sorted may be configured as database records having the organization and structure of the records prescribed for the system. To accomplish this, parser application 240 features a configuration file 244 which includes an information set for adapting the parser application to the requirements established by the newspaper for the organization and display of its ad records. Specifically, configuration file 244 includes: the category, subcategory and selection parameter definitions and associated identification codes which established the organization and structure of ad database 90; the criteria and syntax rules by which parser application 240 will analyze the newspaper ad text feed 242; designations for the ad text equivalence search table 246 to be used during parsing; sort text rules for defining the sort order of the ad records which is based on either the selection parameters established for database 90 or the ad text and the header text rules. Additionally, parser application 240 includes a series of ad text-equivalency search table files 246 which contain alternative wording and phrasing commonly used in classified ads for equivalent ad terminology, the text-equivalency information enabling the parser to recognize variant ad descriptions and convert them to the standard selection parameters established for database 90.

In accordance with the invention, upon initialization, parser application 240 loads configuration file 244 and search table files 246, and thereafter, builds a series of runtime tables 248 that include the text-equivalence word and phrase-recognition information of files 246, together with the parsing syntax rules and pointers to the category, subcategory and selection parameter definitions and their associated identification codes that define the organization and structure of database 90 above described. Additionally, runtime tables 248 also include information concerning the layout of the database architecture including; for example, the length and placement information of the record variables to enable the parser application to build ad database record information. And, additionally, runtime tables 248 also include sort order rules defined for database 90 which establish the order in which ads will appear in database 90 or the ad text based on the ads respective selection parameters. Accordingly, in operation, parser application 240 is able to read the newspaper ad text files 242 at feed 32, and convert the text of the ads into database records that are accumulated as database transaction files 250. More specifically, parser application 240 does this by analyzing each record of ad text files 24, to first extract the newspaper classification code, and based on the newspaper code, establish the category/subcategory identification 46 for the ad as shown in FIG. 3. Additionally, the newspaper ad feed also included a newspaper record identification code and information concerning the listing priority for the for the ads.

Following establishment of the ad category/subcategory code, parser application 240, thereafter, analyzes the ad text based on: the syntax rules; text-equivalence information; and database organization and structure information, to establishes the selection parameters for the ad record as also shown in FIG. 3. Additionally, parser application 240, in accordance with the sort order text rules established for database 90 and provided by configuration file 244, creates a further sort order field in the database record information, as well as the sort order priority information with the required ad text that will be required to sort the ad record information. Finally, parser establishes the header text field for the ad record information that will be ultimately carried through to the ad records. In accordance with the invention, with the exception of the sort order text field, newspaper record identification code, and the ad listing priority information the ad record information thus created defines the database record, and, when the ad record is subsequently sorted, the sort order text field, record priority order and newspaper identification code is eliminated to convert the ad record information into a database ad record. Also in accordance with the invention, parser application 240 supplies the ad record information at transaction files 250 arranged in accordance with the database categories; i.e., one file of ad record information per category for all the records received for newspaper files 242.

Further, based on the ad text read, parse application 240 also makes available at as part of its output database profile file 252. In accordance with the invention, profile file 252 includes the category, subcategory and selection parameter definitions and associated identification codes which establishes the organization and structure of ad database 90.

As also shown in FIG. 14, parser application 240 still further produces several additional outputs in the form of exception reports 254 and summary report 256. In accordance with the invention, these reports constitute "feedback" information which is used by the system administrator for adaptively improving the conversion efficiency of the parsing process. Specifically, parser application 240 produces an exception report that documents any failure of the parser application to extract search parameters from the ad text of newspaper feed 32. Additionally, summary report 256 provides record counts for the respective categories and subcategories encountered in the parsed ads. Both reports 254 and 256 are presented to the parser application administrator, denoted 258 in FIG. 14, who can examine the failure to recognize ad wording and syntax, and usage frequency of the respective ad categories and subcategories. In response, the system administrator can make changes to search table files 246 by deleting search wording and phrasing found, ineffective in recognizing the text of the ads from feed 32, or by adding wording believed more likely to identify ad terminology. Additionally, the administrator can propose changes to the database organization; for example, deletion of ad subcategories found of little or no interest, and include subcategories and specialty search levels, as noted above, believed likely to better present subject matter of interest to the public. As shown in FIG. 14, administrative changes to parser configuration files 244 and search tables 246, in preferred form, are entered with a suitable text editing facility 260, well know in the art.

Figure 15:
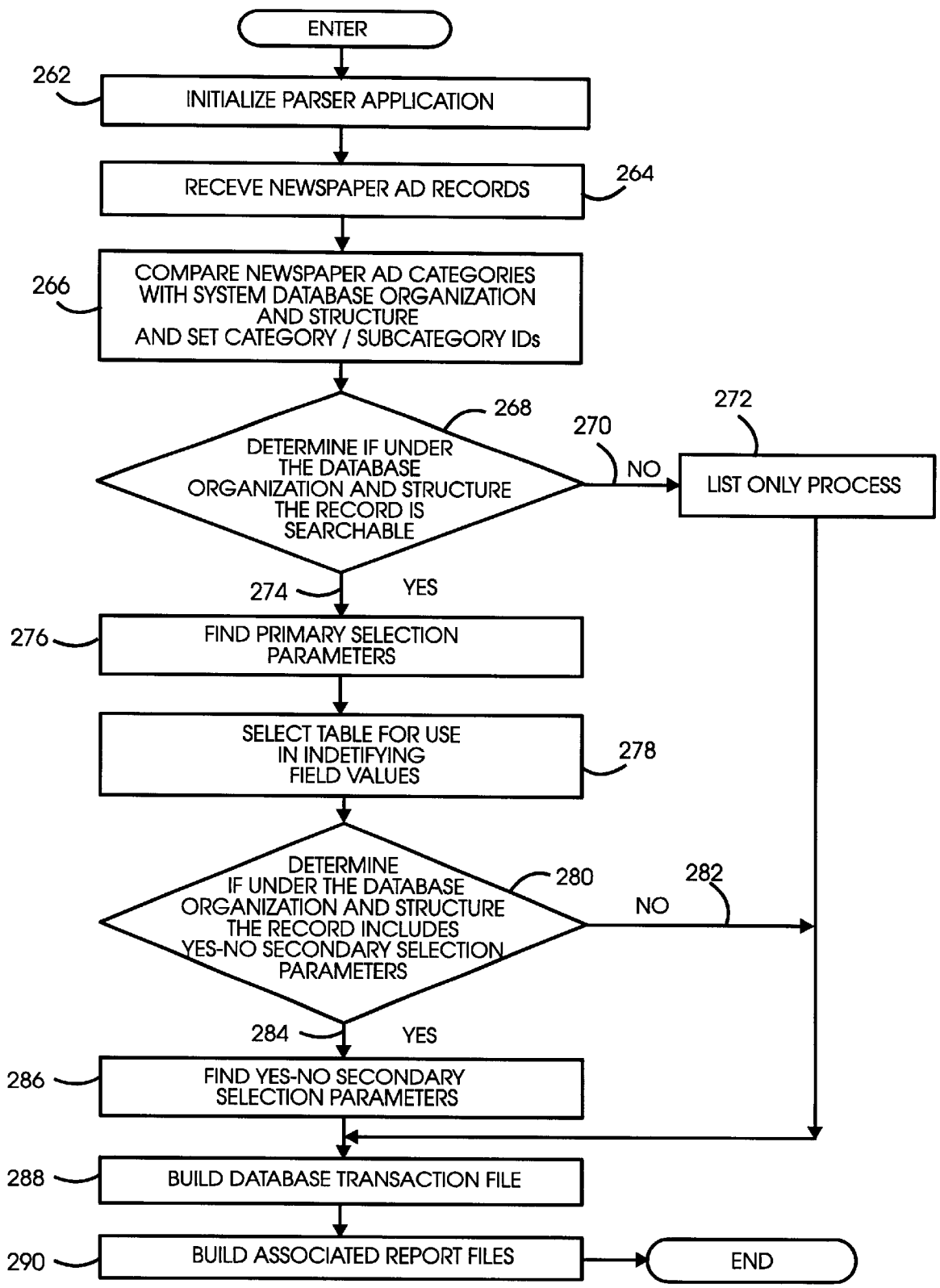
FIG. 15 is a flow diagram of the steps associated with operation of the parser used for creating ad database records for the classified ad system in accordance with this invention.

Operation of parser application 240 is illustrated in the process flow diagram presented in FIG. 15. As shown there, upon entry; i.e., start up, application 240 initializes at first step 262. As described above, in connection with initialization, application 240 reads configuration files 244 and search table files 246, and loads the database organization and structural information, syntax rules, search table designations and sort order text field definition for file 244, and the search-word, text-equivalence information from tables 246. And, thereafter, parser application 240 builds runtime tables 248 with the loaded information. Additionally, application 240 sets the process environment; e.g., system resources, and prepares to receive the newspaper ad record files 242 provided at feed 32. Upon completion of the initialization sequence, application 240 begins to review the respective newspaper ad records at step 264. On reading the first ad record, application 240 establishes a database identification number to ad, based on the newspaper identification code and notes the classification code ascribed to the ad by the newspaper, and following reference to runtime tables 248, converts the newspaper identification at step 266 to the category and subcategory coding setup for database 90.

Following determination of the ad category and subcategory coding, parser application 240 at step 268 determines the ad category/subcategory is one that has been defined to have selection parameters. If the category/subcategory is one that does not allow for searching with selection parameters, the ad is deemed not searchable and application 240 branches at 270 and directs the ad to a "list only" process 272 that provides for the creation of a database record at the transaction record files 250 having only the full text of the ad, together with its category and subcategory designation codes, and record identification number. Additionally also provided are the ad header text field, the sort order text field and the priority identification for the ad. As will be appreciated, while the record will not be searchable for primary secondary selection parameters, it will be available for listing of its respective subcategory when called by the user.

However, in the case where parser application 240 determines that the ad category/subcategory allows for selection parameters, application 240 advances the ad at branch 274 for identification of the primary search parameters. Particularly, at step 276, the ad text is compared against runtime tables 248, so that specific primary selection parameters may be recognized and associated syntax identified. Thereafter, at step 278, runtime tables are again referenced so that the primary selection parameter definitions, identification code numbers and associated parameter values in the ad can be identified and extracted to build the database record.

Following the identification of the primary selection parameters field values at step 278, the ad category/subcategory is again examined to determine if the ad concerns subject matter for which yes-no secondary selection parameters have been established. In the case where the category/subcategory of the ad does not allow for yes-no selection parameters, parser application 240 follows branch 282 and sends the record for inclusion in transaction files 250 with the information accumulated thus far; i.e., category/subcategory coding, primary selection parameter identification and inclusion of the ad text.

Where parser application 240 determines that yes-no secondary selection parameters are provided for the ad, application 240 follows branch 284, and at step 286, again references runtime tables 248 to identify the parameters and notes there presence for inclusion in the ad database transaction files 250.

Following completion of the analysis for the first ad of feed 32, parser application 240 undertakes sequential analysis of the ads in feed 32 that follow, until all ads have been processed. Thereafter, from the ads completed, parser application 240 builds a set of transaction files at step 288, which will be made available to subsequently update system primary database 90. Particularly, in preferred form, application 240 builds a file containing parsed ads for each of the respective categories identified for the system, which as noted above in preferred form include: Automotive/RV's; Aviation/Marine; Employment; Real Estate Sales; Real Estate Rentals; Commercial/Industrial; Announcements; Financial; Services/Directories; Merchandise; Personals; and Pets/Animals. As will be appreciated, the categories noted are exemplary only, and could be modified as desired to suit the needs of the community the classified services addresses.

In addition to the database record information files 250 organized by category, parser application 240 also outputs database profile file 252 which includes the database organizational information concerning category, subcategory and selection parameter definitions together with identification codes. In preferred form, following creation of the parser transaction files 250 and profile files 252, to save storage space and transmission times, the files are compressed; as for example, in conventional ZIP format. Still further, and as noted above, following conversion of the ad records of feed 32 to database records, exceptions reports 254 and summary reports 256 are provide to the system administrator for review.

Accordingly, and as will be appreciated by those skilled in the art, system 10 is able to simply and quickly generate ad records for its database from the existing ad data stream maintained by the newspaper; thus making support of system 10 unobtrusive and readily intergratable with the newspaper's conventional print systems. Yet, additionally, system has the further marked advantage of standardizing ad classification through use of the subject matter coding set up for the database organization.

Continuing, in accord with the invention, ad generator 26 also includes a server 30 for accepting the transaction and profile files 250, 252, respectively, from parser processor 230, and for making those files available over the Internet to the rest of system 10. As noted, ad generator 26 may be located anyplace in the world where Internet access can be provided. In accordance with the invention, server 30 is connected to ad generator processor 28 in conventional fashion; as for example, with local area network provided at the offices or production site of the newspaper, and thus may function as a "drop box" for parser processor output files. Additionally, ad generator server 30 is also connected in conventional fashion to Internet 14; for example, with dedicated telecommunication data lines or with dial-up lines, and, need only be able to support the Internet file transport protocol; i.e., FTP/IP, ad generator server 30 not being available to the public for browsing and not part of the Web. To this end, ad generator 26 also includes a fire wall 34, to prevent unauthorized access to the generator and secure its environment.

Also in accord with the invention, and as previously noted, system 10 as seen in FIG. 13 additionally includes record collection and distribution elements to get the ad records produced by generator 26 to database 90 of database server 20. Particularly, and as shown in FIG. 13 system 10 features a server 36 connected to Internet 14 for the purpose of collecting the ad records from the newspaper drop box; i.e., ad generator server 30. Collection server 36 is again connected to Internet 14 in conventional fashion, but, not available to the public for browsing, and as a result, need not be a part of the Web. Rather, server 36 is intended to be dedicated to the collection of classified ad database record files by means of Internet 14, and need only support the TCP/IP protocol used to communicate files from ad generator servers 30 to collection server 36. Accordingly, collection server 36 is also provided with a fire wall 38 to prevent unauthorized access from Internet 14, thereby providing security for the collection environment.

In preferred form, server 36 supports a collection process for polling ad generator server 30 on a predetermined, scheduled basis to determine if ad generator processor 28 has produced database record information for updating the system database 90. Also in preferred form, the collection process employs a conventional "mirroring" routine in the course of which server 36 interrogates ad generator 30 to determine if the files stored at ad generator server 30; i.e., ad record files from generator 28 at the drop box, have changed since the last occasion on which collection server 36 interrogated the drop box. In the case where the collection process finds new ad record information files at the drop box, those files are copied to the collection server for further processing. As will be appreciated by those skilled in the art, while in the preferred embodiment system 10 uses a "get", process to go out to the newspaper ad generator to retrieve new ad records for database 90, system could equally use a "put" process in which the new ad files are immediately sent to collection server 36 as soon as they as they are available from the ad generator 26. This approach has the advantage of eliminating collection server 36's interrogation of the newspaper server 30, which on occasion may be found objectional for security reasons.

Continuing, in accordance with the invention, system 10 as illustrated in FIG. 13 is seen to yet further include a system distribution processor 40 which manages supply of the collected ad database records. As shown, distribution processor 40 is connected to system collection server 36 and the newspaper database sever 20. In accord with system design, distribution processor 40's primary function is to act as a clearing house and depository for ad database information, and to supervise timely transfer of that information between the subsystems of system 10 in order to maintain the currency of database 90. Yet additionally, distribution server 40 also functions to provide report information concerning database usage and error experience. Finally, distribution server 40 still further acts as a conduit to direct ad introduced by users at application server 16 back to the newspaper and ad generator 26.

More specifically, and as shown in FIG. 13, to accomplish these ends, distribution processor 40 features a distribution application 270 for managing preparation and flow of ad record update information to database server 20, and usage-error-experience information and placement information back from database server to distribution processor 40. Further, distribution processor 40 includes a depository structure 272 for maintaining a multi-day depository of ad records for supply to database server 20, and ad record usage, error and placement information. Finally, distribution processor includes an ad statistical manager 274 to prepare report concerning ad usage.

With regard to depository structure 272, in preferred form, distribution processor maintains a system of file directories and subdirectories to facilitate management of Newspaper specific database record information as well as related usage information. Particularly, depository structure 272 includes three primary directories organized according to the subject matter they contain. Specifically, the three depository directory structures include a first entitled "Transfer" which is used for transferring data between the Distribution Processor 40 and the Newspaper's Ad Generation system 26; a second entitled "Sort" in which database record information is collected, sorted and prepared for supply to database sever 20; and a third entitled "Reports" in which, daily message log files (recordings of all user request messages) and event log files (recordings of error occurrences, their corresponding recovery events and significant process events, such as a Database 90 update occurrence) are collected for use by the Ad Statistical Manager 274 in generating usage and service reports.

The "Transfer" primary directory contains, per Newspaper, two subdirectories for input and output directional exchange of data with the Newspaper's Ad Generation system 26. Informational report files and daily files containing ads submitted by users of system are stored by the distribution process in the subdirectory entitled "output". It is expected that these files will subsequently be transferred to the Collection server 36 by a "mirroring" routine which executes on that server. From there storage location on the Collection Server 26, the Newspaper, through use of its Newspaper Ad Generator Server 38, can transfer these system 10 "output" files for review and processing, as appropriate. As described below, the subdirectory entitled "input" is used as the disk storage space for obtaining new ad database update records from the Collection server 36.

In accordance with the invention, the distribution application maintains the flow of information into and through the noted "Transfer" directory system and serves to prepare the information for use. Particularly, distribution processor application 270 includes a scheduler which requires application 270 to look for ad database update records at a prescribed time during the day, predetermined to be a suitable amount of time following creation of new ads by ad generator 26. In preferred form, at a predetermined, appointed hour, distribution processor interrogated collection server 36 in a fashion comparable to that described in connection with explanation of collection server 36's interrogation of ad generator server 30. Once again, in preferred form, a "mirroring" routine is used to examine the storage at server 36. In the event the mirroring process is unable to find any new records, since the interrogation was based on predetermined, fixed scheduled, an error is presumed and the system activates a reporting facility for identifying that the ad updates are missing. Thereafter, distribution application continues to query collection server 36 at timed intervals; for example, every ten minutes, until the update ad records from ad generator 26 appear. In a second preferred form, a predetermined schedule of when to look for new ads may not be used, and rather new ads would be continually looked for, in regular time intervals (e.g., every ten minutes), so as to initiate ad update processing whenever new data is present.

In the case where distribution application 270 finds the update ad record information file from ad generator 26, through collection server 36, the "mirroring" routine first copies the ad update records to the "Transfer" directory structure's "input" subdirectory. The distribution application 270 then copies the ad record information file to the main directory of the "Sort" directory structure for the subject Newspaper. Once at the main directory, distribution application 270 decompresses the previously compressed ad update files, it being recalled the full set of update files including some 12 categories files, and sorts the files by category and subcategory in anticipation of sending the prepared files to database server 20 for the update of database 90. In accordance with the invention, to effect the sort, distribution processor 270 opens the information files and, for each ad, extracts the category and subcategory designation assigned by parser 20, the sort order text field created by parser 20, and the list priority code assigned to the ad by the Newspaper and fed to system 10 through the Ad Feed source 32. Thereafter, processor 270 undertakes sort of the record information based on the ad category, subcategory, list priority and sort order text information. As will be recalled, the list priority information identifies priority placement of the ad in the database base on; for example, payment of special fees by the party who placed the ad as described above. Further, during the sort process, the sort order text field and list priority code is dropped for the ad database record information and the information converted in to the ad database records that will be provided to database 90 for updating.

Also in accord with the invention, upon completion of this sort process, the ad records are arranged in the order that they will appear in database 90, and accordingly, the order in which the ads will be listed to user 1 when selected. As a result, by effecting a pre-sort of the ad records in this fashion, system 10 substantially enhances the speed with which it can return search result in response to user record request, it not being necessary to sort the search result before presenting them, as noted, the sort having been undertaken in the pre-sort process. Subsequently, distribution application 270 sends the sorted, ad update records to database processor 88 to enable update of database 90.

Yet additionally, a Newspaper's primary "Sort" directory is further divided to include a main directory and a series of four subdirectories which apportion the directories and subdirectories in time. Particularly, the main directory for each of the noted primary directories is allocated for current activity; a subdirectory entitled "TODAY" is used as storage for data processed earlier in the current day; the subdirectory entitled "DAY1" for storing of data processed 1 day earlier; the subdirectory "DAY2" for data processed 2 days earlier; and lastly a subdirectory entitled "DAY3" for storage of data processed 3 days earlier. Thus, each of these respective subdirectories includes files being date stamped with a date defined by the directory date relative to the main directory. For example, day 1 begin one day before "today"; day 2 being two days before "today" and day 3 being three days before "today".

Continuing, at the start of each day, the database processor 88 prepares to close three files it has been maintaining for collection by distribution processor 270. Particularly, in preferred form, database processor 88 maintains daily log files at server 20 for all the request messages that were submitted to database 90 for ads. Additionally, database processor 88 additionally maintains an event log file that includes details of error events and their complementary recovery events, as well as, significant process events, such as a Database update occurrence; these events being subsequently monitored by the system administrator. Finally, database processor maintains daily ad placement files for all requests submitted by users seeking to place ads in the system. Accordingly at the appointed time for update, preferably at approximately 12 o'clock midnight, the noted three files are closed, date stamped and left for distribution application 270 to distribute to the Newspaper's "output" subdirectory under the "Transfer" directory structure and the Newspaper's appropriate subdirectory under the "Report" directory structure.

Thereafter, distribution application 270 undertakes to update the depository structure of distribution processor 40. Particularly, for each of the primary directories, at the initiation of distribution application 270, the day 3 subdirectory of the "Sort" directories is cleared and the information in the day 2 subdirectory is moved to the day 3 subdirectories; the information in the day 1 subdirectory moved to the day 2 subdirectory and the information in the main directory moved to the day 1 subdirectory and the "today" directory cleared in anticipation of a new day's processing and subsequent ad updates. Additionally, the removed information is archived for reference purposes.

As will be appreciated, the effect of the noted distribution application and depository structure is to assure a supply of ad records for database 90 in the event ad update records for some reason should be unavailable.

Yet additionally, a Newspaper's primary "Report" directory is further divided to include a main directory and a series of twelve subdirectories which apportion the directories and subdirectories in time periods of one month each. Particularly, the main directory for each of the noted primary directories is not used for file storage; but each of the twelve subdirectory are entitled in the format of "MONTHnn" where "nn" is a two digit ASCII value which identifies a month of the year; values "01" to "12". Each of these respective subdirectories are to contain message log files and event log files which have been date stamped with a date which coincides with the subdirectory's subject month. These files which are collected and distributed, by the distribution application 270, to these "Report" depository structure subdirectories are to be sufficient for use by the statistical manager 274 to generate system 10's necessary reports. The "Report" directory structure.

In preferred form, statistical manager 274 relies on the usage messages forwarded to distribution depository to create database usage reports of varying detail. Further, in preferred form, statistical manager 274 produces reports concerning the frequency of requests for ads in the various categories and subcategory of subject matter included in the system.

Figure 16A:
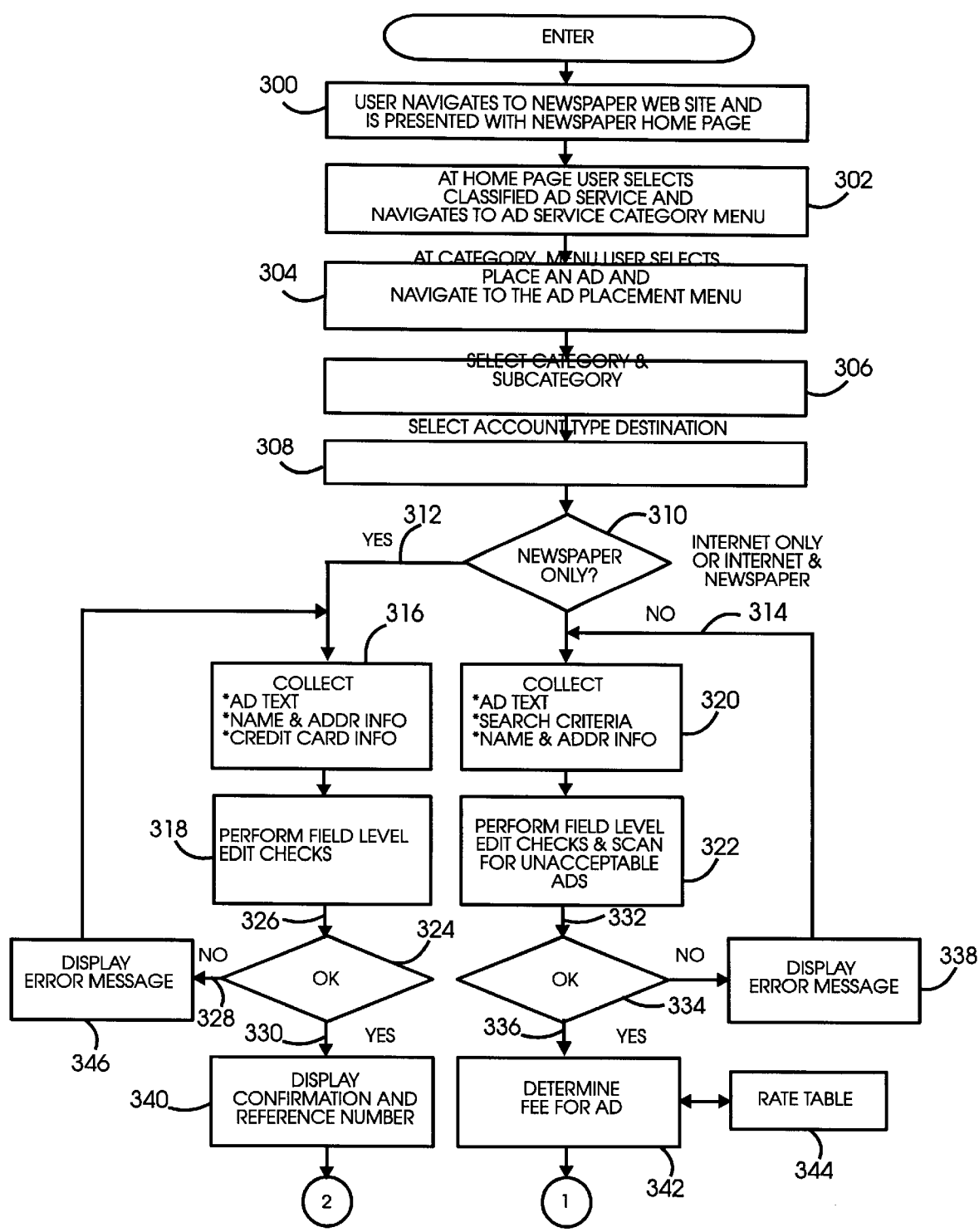
FIG. 16a is a flow diagram of a first series of steps in the process by which a user can place an ad in the classified ad system in accordance with this invention.
Figure 16B:
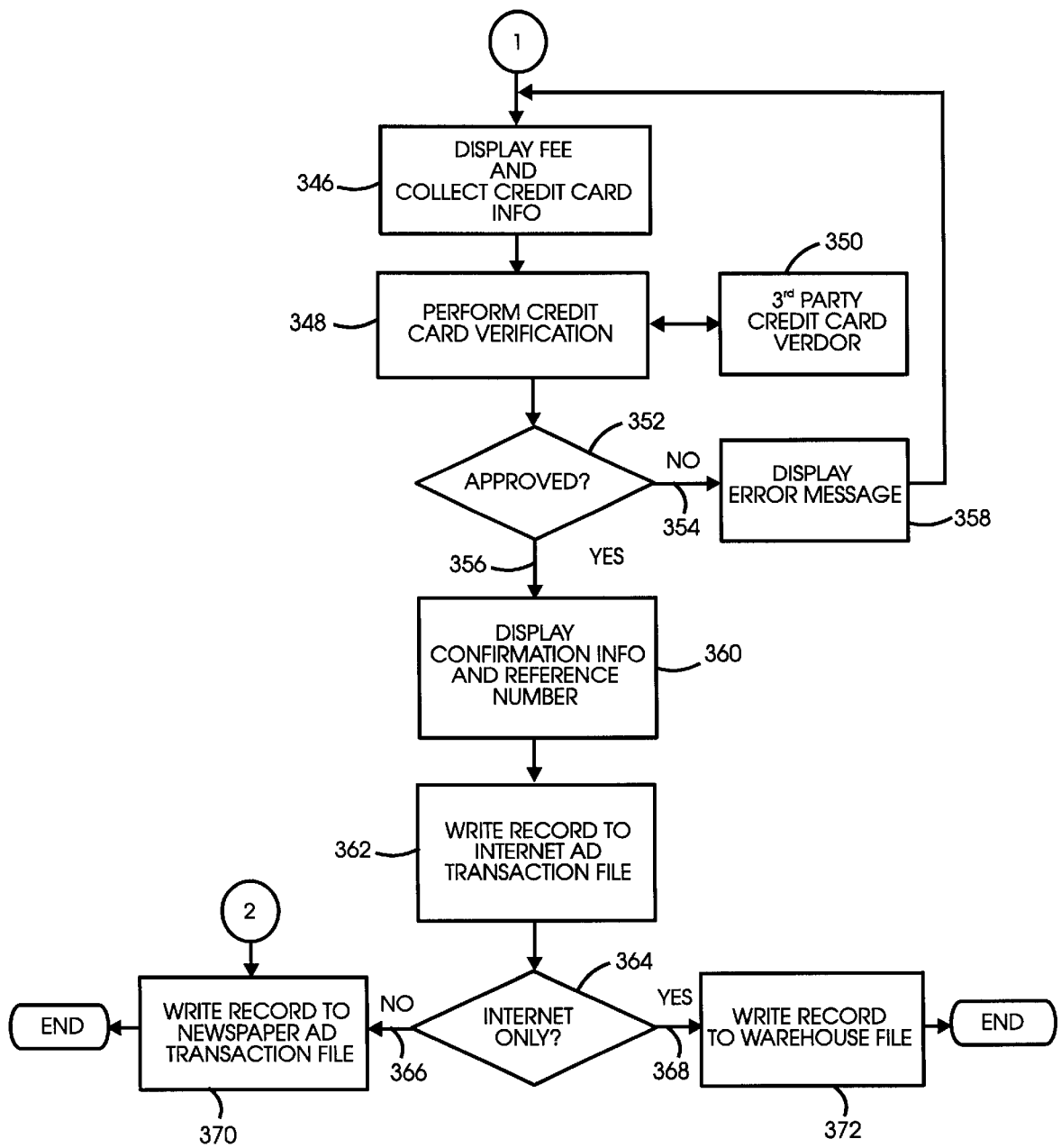
FIG. 16b is a flow diagram of a second series of steps in the process by which a user can place an ad in the classified ad system in accordance with this invention.

Continuing, as noted above, in accordance with the invention, system 10 in preferred form also includes procedures for accepting ads submitted by the user on line. Particularly, and with reference to FIGS. 16*a* and 16*b*, which illustrate the procedure, undertaken when user 1 seeks to enter an ad in system 11, as in the case of browsing, before the user can accomplish anything he must first initialize his terminal and point it to newspaper Web site of his choosing and navigate to the newspapers' home page as noted at step 300. At the newspaper home page, user 1 selects the classified ad service and at step 302 navigates to the classified ad menu of the service provided at the newspaper Web site. As noted at step 304, on arrival at the service menu, user 1 is presented with the option of placing an ad and makes the appropriate choice to effect his selection. Thereafter at step 306, user 1 is navigated to the category and subcategory menus for the subject matter to be advertised.

Thereafter, at step 310, user 1 must elect whether he wishes to have the ad placed only in the newspaper print classified, or in the on-line service. In the case where the user desires to place the ad in print form only, the place-an-ad application branch at 312 and the user is navigated to the ad submission sequence defined by background information entry step 316 and edit check step 318. Thereafter, the ad information is checked and in the event the message is correct the user passes at branch 330 to the system confirmation step at 340 and the procedure passes to step 370 shown in FIG. 16*b* where the ad is entered to the print system.

In the case where user 1 at step 310 elects to present the ad in both the print system and the on-line system, the place-an-ad application moves to background and text checking steps 320 and 324 respectively. In the case where the ad is found acceptable for inclusion in Internet version of the newspaper's classified ad system, the user at step 342 is presented with rate information to determine the cost of the proposed ad. Thereafter, at step 348, system advises user 1 how much the ad will cost and if user 1 finds the price acceptable, he enters credit card information to enable payment.

Thereafter, user 1's credit is checked on line, and in the case where his credit is found acceptable, the user is provided a confirmation at step 360 and the text is written to suitable Internet transaction file at step 362. Subsequently, depending on whether the ad is to appear in print only or print and Internet, the record is written to a suitable file to assure its publication.

WHILE this invention has been described in its preferred form, it will be appreciated that changes may be made in the form, construction, procedure and arrangement of its various elements, and steps without departing from its spirit or scope.

What we claim is:

1. A classified ad system provided in an interactive computer network, the computer network including one or more servers and a plurality of client terminals capable of communicating with the servers, the classified ad system for presenting classified ads to a user at a client terminal, the classified ad system comprising:

An application server including means for receiving a request for classified ads from a user at a client terminal, and means for generating request messages concerning the user' request for ads; and A database server including a database having classified ad information, the database server further including means for receiving the request messages of the application server; means for comparing the request messages of the application server to the database classified ad information and identifying the results of the comparison, and means for generating response messages in reply to the request messages, the response messages including the results of the comparison of the request message with the database classified ad information.

2. The classified ad system of claim 1 wherein the database server includes means for sending the response messages generated in reply to the requests messages to the application server, and wherein the application server includes means for presenting a report to the user at the client terminal based on a response message received from the database server in reply to a request message.

3. The classified ad system of claim 2 wherein the application server includes means for enabling the user to submits a request for ads in multiple stages, and wherein the application server generates a request message at each stage of the request, each request message generated successively narrowing the range of ads that would satisfy the user's request for ads.

4. The classified ad system of claim 3 wherein the application server includes means for receiving requests to place classified ad information in the database of the database server.

5. The classified ad system of 3 wherein the ad information included in the ad server database is substantially numerically coded.

6. The classified ad system of claim 5 wherein the application server means for generating request messages includes a common gateway interface process.

7. The classified ad system of claim 6 wherein the classified ad system includes a plurality of different sources of classified ad information and wherein the database server includes a plurality of ad databases each having classified ad information provided by one of the classified ad sources.

8. The classified ad system of claim 7 wherein the classified ad system includes one or more application servers.

9. The classified ad system of claim 8 wherein the classified ad system includes one or more backup ad databases.

10. The classified ad system of claim 7 wherein the application server is common to all of the ad sources, and wherein each ad source includes means for enabling a user to initiate the request for ads.

11. The classified ad system of claim 3 wherein the system includes means for automatically generating classified ad information to be included in the database server.

12. The classified ad system of claim 11 wherein the system includes means for automatically collecting classified ad information to be included in the database server from the means for automatically generating the classified ad information.

13. The classified ad system of claim 12 wherein the system includes means for automatically distributing the classified ad information to the database server on a predetermined scheduled basis.

14. The classified ad system of claim 13 wherein the system includes means for pre-sorting the classified ad information included in the database server.

15. The classified ad system of claim 4 wherein the system includes means for automatically generating classified ad information from received request to place classified ad information in the database of the database server.

16. A method for presenting classified ads to users in an interactive network, the computer network including one or more servers and a plurality of client terminals capable of communicating with the servers, the users accessing the network from respective terminals, the method comprising the steps of:

Providing an application server;
Establishing communication over the network between a user at a client terminal and the application server;
Receiving requests for ads at the application server from the user at a client terminal and generating request messages at the application server concerning the user's requests for ads;
Providing a database server having a database including classified ad information, and establishing communication between the application server and the database server so that the application server may send request messages to database serve and so that the request messages may be compared with the database classified ad information;
Generating response messages at the database server in reply to the request messages and forward them to the application server;
Generating reports for presentation to the user at a client terminal based on the response messages.

17. The method of claim 16 wherein receiving a request for ads from the user includes receiving the request in multiple stages and wherein the application server generates a request message at each stage of the request, each request message generated successively narrowing the range of ads that would satisfy the user's request for ads.

18. The method of claim 17 wherein providing a database server having a database including classified ad information includes providing the classified ad information in substantially numerical form.

19. The method of claim 18 wherein generating the request messages includes use of a common gateway interface process.

20. A classified ad system provided in an interactive computer network, the classified ad system for presenting classified ads to a user, the classified ad system comprising:

An application server including means for receiving a request for classified ads from a user, and means for generating a search request concerning the user's request for ads;
A database server including a database having classified ad information, the database server further including means for receiving the application server search request; means for comparing the search request of the application server to the database classified ad information, and means for generating a search request response in reply to the search request;
A classified ad source for supplying classified ad text; and
Means for automatically generating the classified ad information to be included at the database server; the means for generating the classified ad information including a parser for interrogating the classified ad text and building substantially numerically coded classified ad information from the ad text.

21. The classified ad system of claim 20 wherein the parser includes means for introducing information for pre-sorting the classified ad information into the classified ad information.

22. The classified ad system of claim 21 wherein the parser includes means for defining the organizational structure of the database classified ad information, and means for identifying the ad text wording to enable encoding of the ad text; the means for identifying ad text wording being dependent on the structure and organization of the database classified ad information.

23. The classified ad system of claim 22 wherein the organizational structure of the database classified ad information includes multiple divisions, and the parser means for identifying ad text wording includes multiple elements referenced to the multiple divisions of the database classified ad information organizational structure, some of which elements are common to some of the divisions.

24. A classified ad system provided in an interactive computer network, the classified ad system for presenting classified ads to a user, the classified ad system comprising:

An application server including means for receiving a request for classified ads from a user, and means for generating a search request concerning the use request for ads;

A database server including a database having classified ad information, the database server further including means for receiving the search request of the application server; means for comparing the search request of the application server to the database classified ad information, and means for generating a search request response in reply to the search request;

A classified ad source for supplying classified ad text; and

Means for generating the classified ad information included at the database server from the ad text supplied by the classified ad source; and Means for automatically distributing the generated classified ad information to the ad database server on a scheduled basis.

25. The classified ad system of claim 24 wherein the means for automatically distributing the classified ad information further includes means for pre-sorting the classified ad information.

26. The classified ad system of claim 25 wherein the means for pre-sorting the classified ad information includes elements for pre-sorting the ad information based on sorting data introduced into classified ad information.

27. The classified ad system of claim 26 wherein the means for generating the classified ad information is automated and includes elements for introducing pre-sorting information into the classified ad information.

28. The classified ad system of claim 24 wherein the means for automatically distributing the classified ad information to the database server includes a distribution processor having an ad information depository means for storing database classified ad information, and means for managing movement of ad information between the means for generating the ad information, the depository means and the database server.

29. The classified ad system of claim 28 wherein the distribution processor further includes means for generating statistical reports concerning usage of the database classified ad information.

30. The classified ad system of claim 28 wherein the information depository means is subdivided into multiple partitions, each partition including classified ad information having a different time reference, and wherein the means for managing movement of the classified ad information also manages movement of the ad information between the multiple partitions.

* * * * *